(12) United States Patent
Wang et al.

(10) Patent No.: US 9,352,963 B2
(45) Date of Patent: May 31, 2016

(54) NANOMOTOR-BASED PATTERNING OF SURFACE MICROSTRUCTURES

(75) Inventors: Joseph Wang, San Diego, CA (US); Kalayil Manian Manesh, San Diego, CA (US); Shankar Balasubramanian, Westmont, IL (US)

(73) Assignee: The Regents of the University of California, Oakland, CA (US)

( * ) Notice: Subject to any disclaimer, the term of this patent is extended or adjusted under 35 U.S.C. 154(b) by 849 days.

(21) Appl. No.: 13/392,521

(22) PCT Filed: Aug. 24, 2010

(86) PCT No.: PCT/US2010/046558
§ 371 (c)(1),
(2), (4) Date: May 9, 2012

(87) PCT Pub. No.: WO2011/031463
PCT Pub. Date: Mar. 17, 2011

(65) Prior Publication Data
US 2012/0211467 A1    Aug. 23, 2012

Related U.S. Application Data

(60) Provisional application No. 61/236,785, filed on Aug. 25, 2009.

(51) Int. Cl.
| | | |
|---|---|---|
| *B82B 3/00* | (2006.01) | |
| *B05D 1/18* | (2006.01) | |
| *B05D 3/10* | (2006.01) | |
| *B05D 5/00* | (2006.01) | |
| *B82Y 30/00* | (2011.01) | |
| *B82Y 40/00* | (2011.01) | |

(52) U.S. Cl.
CPC ... *B82B 3/00* (2013.01); *B05D 1/18* (2013.01); *B05D 3/10* (2013.01); *B05D 3/107* (2013.01); *B05D 5/00* (2013.01); *B82Y 30/00* (2013.01); *B82Y 40/00* (2013.01); *B05D 2202/00* (2013.01); *B05D 2350/60* (2013.01); *B05D 2401/00* (2013.01)

(58) Field of Classification Search
None
See application file for complete search history.

(56) References Cited

U.S. PATENT DOCUMENTS

| | | |
|---|---|---|
| 3,363,983 A | 1/1968 | Roberts |
| 7,357,018 B2 | 4/2008 | Curry et al. |

(Continued)

FOREIGN PATENT DOCUMENTS

| | | |
|---|---|---|
| WO | 03099112 | 12/2003 |
| WO | 2011031463 | 3/2011 |

OTHER PUBLICATIONS

Burdick J., et al. "Synthetic Nanomotors in Microchannel Networks: Directional Microchip Motion and Controlled Manipulations of Cargo", JACS Communications, 2008, 130(26), p. 8164-8165.*

(Continued)

*Primary Examiner* — William Phillip Fletcher, III
(74) *Attorney, Agent, or Firm* — Perkins Coie LLP

(57) ABSTRACT

Among other things, methods, systems and apparatus are described for implementing nanomotor-based micro- and nanofabrication. In one aspect, a method of fabricating nanoobjects comprises functionalizing a nanomotor with a reagent. The method also includes controlling a movement of the functionalized nanomotor in a solution containing material to react with the reagent to induce a localized deposition or precipitation of a product onto a surface of a substrate or etching of the substrate.

20 Claims, 51 Drawing Sheets

(56) References Cited

U.S. PATENT DOCUMENTS

| | | | |
|---|---|---|---|
| 7,516,759 | B2 | 4/2009 | Paxton et al. |
| 2004/0209376 | A1 | 10/2004 | Natan et al. |
| 2005/0176029 | A1 | 8/2005 | Heller et al. |
| 2005/0266416 | A1 | 12/2005 | Guo |
| 2005/0281682 | A1 | 12/2005 | Paxton |
| 2008/0156654 | A1 | 7/2008 | Wang et al. |
| 2008/0187764 | A1 | 8/2008 | Jung et al. |
| 2009/0212275 | A1 | 8/2009 | Park et al. |
| 2010/0129656 | A1 | 5/2010 | Zussman et al. |

OTHER PUBLICATIONS

Jaber et al., "Actomyosin-Driven Motility on Patterned Polyelectrolyte Mono- and Multilayers," Nanoletters, 2003, vol. 3, No. 11, 1505-1509.*

Manesh et al., "Nanomotor-based 'writing' of surface microstructures," Chem. Commun., 2010, 46, 5704-5706.*

Adhikari, B. et al., "Polymers in sensor applications", Progress in Polymer Science, 2004, vol. 29, pp. 699-766.

Alon, U. et al., "Robustness in bacterial chemotaxis", Nature, 1999, vol. 397, pp. 168-171.

Anderson, J., "Colloid Transport by Interfacial Forces", Annu. Rev. Fluid Mec. 1989, vol. 21, pp. 61-99.

Balasubramanian, S, et al., "Thermal Modulation of Nanomotor Movement," Small, 5(13):1569-1574, Mar. 2009.

Beckmann, A. et al., "Modeling Hot Wire Electrochemistry. Coupled Heat and Mass Transport at a Directly and Continuously Heated Wire", J. Phys. Chem B 2000, 104, pp. 764-769.

Behkam, B. et al., "Bacterial Flagella-Based Propulsion and On/Off Motion Control of Microscale Objects", Appl. Phys. Lett. 2007, 90, 023902.

Berg, H.C. et al., "The Rotary Motor of Bacterial Flagella", Annu. Rev. Biochem, 2003, 72, pp. 19-54.

Burdick, J., et al., "Synthetic Nanomotors in Microchannel Networks: Directional Microchip Motion and Controlled Manipulation of Cargo," Journal of the American Chemical Society, 130(26):8164-8165, Jun. 2008.

Byun, S. C., Authorized Officer, Korean Intellectual Property Office, Interntational Search Report and Written Opinion, PCT Application No. PCT/US2012/000269, Nov. 23, 2012, 10 pages.

Calvo-Marzal, P., et al., "Electrochemically-triggered motion of catalytic nanomotors," The Royal Society of Chemistry: Chemical Communications, 14(30):4509-4511, Jun. 2009.

Campuzano, S. et al., "Bacterial Isolation by Lectin-Modified Microengines", Nano Lett. 12, 2012, 396-401.

Cao, Y. W. C., Jin, R. C. & Mirkin, C. A. Nanoparticles with Raman spectroscopic fingerprints for DNA and RNA detection. Science 297, 1536-1540 (2002).

Cartwright, J., "Nanomotors detect trace silver," Royal Society of Chemistry, published Aug. 14, 2009, obtained online Apr. 2015 <http://www.rsc.org/chemistryworld/News/2009/August/14080901.asp>.

Catchmark, J. M., et al., "Directed Rotational Motion of Microscale Objects Using Interfacial Tension Gradients continually Generated via Catalytic Reactions", Small 2005, 1, No. 2, pp. 202-206.

Chang, T. S. et al., "Remotely powered self-propelling particles and micropumps based on miniature diodes", Nature Mat. 2007, vol. 6, pp. 235-240.

Choi, J. W., Authorized Officer, Korean Intellectual Property Office, Interntational Search Report and Written Opinion, PCT Application No. PCT/US2012/023410, Sep. 21, 2012, 9 pages.

Choi, S., Authorized Officer, Korean Intellectual Property Office, Interntational Search Report and Written Opinion, PCT Application No. PCT/US2011/053783, May 4, 2012, 8 pages.

Demirok, U.K., et al., "Ultrafast Catalytic Alloy Nanomotors," Angewandte Chemie International Edition, 47(48):9349-9351, Oct. 2008.

Fischer, T., Agarwal, A. & Hess, H. "A smart dust biosensor powered by kinesin motors", Nature Nanotech. 4, 2009, pp. 162-166.

Flechsig, G.-U. et al., Investigation of Deposition and Stripping Phenomena at the Heated Gold Wire Electrode in Comparison to the Rotating Disk Electrode: Copper(II), Mercury(II), and Arsenic(III), Electroanalysis 2001, 13, 786.

Fournier-Bidoz, S. et al., "Synthetic self-propelled nanorotors", Chem. Commun. 2005, pp. 441-443.

Frischmuth, K. et al., "On Modelling Heat Transfer in Chemical Microsensors", Int. J. Eng. Sci. vol. 34, No. 5, pp. 523-530.

Gao, W. et al., "Highly Efficient Catalytic Microengines: Template Electrosynthesis of Polyaniline/Platinum Microtubes", J. Am. Chem. Soc., Jul. 2011, vol. 133, No. 31, pp. 11862-11864.

Gao, W. et al., "Magnetically Powered Flexible Metal Nanowire Motors", J. Am. Chem. Soc., 2010, 132, pp. 14403-14405.

Ghosh, A. et al., "Controlled Propulsion of Artificial Magnetic Nanostructured Propellers", Nano Lett. 2009, vol. 9, No. 6, pp. 2243-2245.

Gibbs, J. G. et al., "Autonomously motile catalytic nanomotors by bubble propulsion", Appl. Phys. Lett. 2009, 94, 163104.

Gibbs, J. G. et al., "Design and Characterization of Rotational Multicomponents Catalytic Nanomotors", Small 2009, 5, No. 20, pp. 2304-2308.

Goel, A. et al., "Harnessing biological motors to engineer systems for nanoscale transport and assembly", Nature Nanotechnology 2008, vol. 3, pp. 465-475.

Gooding, J.J., "Electrochemical DNA hybridization biosensors", Electroanalysis 2002, 14, No. 17, pp. 1149-1156.

Goszner K. et al., "The Decomposition of Hydrogen Peroxide on Silver-Gold Alloys", J. Catal. 32, 1974, pp. 175-182.

Gründler, P. et al., Hot-wire Electrodes: Voltammetry Above the Boiling Point, Analyst, 1996, vol. 121, pp. 1805-1810.

Gründler, P. et al., "The Technology of Hot-Wire Electrochemistry", Electroanalysis 1999, 11, No. 4, pp. 223-228.

Gründler, P. et al., "Principles and Analytical Applications of Heated Electrodes", Microchim. Acta 154, 2006, pp. 175-189.

Hall, S.B. et al., "Electrochemical oxidation of hydrogen peroxide at platinum electrodes. Part III: Effect of temperature", Electrochim. Acta 44, 1999, pp. 2455-2462.

He, Y. et al., "Designing Catalytic Nanomotors by Dynamic Shadowing Growth", Nano Lett. 2007, vol. 7, No. 5, 1369-1375.

Herr, J.K. et al., "Aptamer-conjugated nanoparticles for selective collection and detection of cancer cells", Anal. Chem. 2006, 78, pp. 2918-2924.

Hess, H. et al., "Light-Controlled Molecular Shuttles Made from Motor Proteins Carrying Cargo on engineered Surfaces", Nano. Letters, 2001, vol. 1, No. 5, pp. 235-239.

Hess, H. et al., "Biomolecular motors", nanotoday, 2005, pp. 22-29.

Hianik, T. et al., "Influence of ionic strength, pH and aptamer configuration for binding affinity to thrombin" Bioelectrochemistry 70, 2007, pp. 127-133.

Hill, H.D. et al., "The bio-barcode assay for the detection of protein and nucleic acid targets using DTT-induced ligand exchange" Nature Protocols 1, 2006, pp. 324-336.

Honda et al., "Electrochemical Behavior of $H_2O_2$ AT Ag In $HCIO_4$ Aqueous Solution", Electrochim. Acta, vol. 31, No. 3, 1986, pp. 377-383.

Hong, S. R., Authorized Officer, Korean Intellectual Property Office, Interntational Search Report and Written Opinion, PCT Application No. PCT/US2013/026757, Jul. 25, 2013, 14 pages.

Hong, Y. et al., "Chemotaxis of Nonbiological Colloidol Rods", Phys. Rev. Lett. 2007, 99, 178103.

Howse, J. R. et al., "Self-Motile Colloidal Particles: From Directed Propulsion to Random Walk", Phys. Rev. Lett 2007, 99, 048102.

Huang, S. L. et al., "Acoustically active liposomes for drug encapsulation and ultrasound-triggered release", Biochimia et Biophysica Acta., Aug. 12, 2004, vol. 1665, pp. 134-141.

Ibele, M. et al., "Schooling Behavior of Light-Powered Autonomous Micromotors in Water", Angew. Chem. Int. Ed. 2009, 48, pp. 3308-3312.

Ibsen, S. et al., "A Novel Nested Liposome Drug Delivery Vehicle Capable of Ultrasound Triggered Release of its Payload", J Control Release, Nov. 7, 2011, vol. 155, No. 3, pp. 358-366.

Zhang, L. et al., Controlled propulsion and cargo transport of rotating nick el nanowires near a patterned solid surface, ACS Nano vol. 4, No. 10, pp. 6228-6234.

Ismagilov, R. F. et al., "Autonomous Movement and Self-Assembly", Angew. Chem. Int. Ed. 2002, 41, No. 4, pp. 652-654.

Kagan, D., et al., "Chemical Sensing Based on Catalytic Nanomotors: Motion-Based Detection of Trace Silver, "*Journal of the American Chemical Society*, Aug. 2009, 131(34):12082-12083.

Keating, C.D. et al., "Striped metal nanowires as building blocks and optical tags", Adv. Materials, 2003, 15, pp. 451-454.

Klibanov, A. L. et al., "Ultrasound-triggered release of materials entrapped in microbubble-liposome constructs: a tool for targeted drug delivery", J Control Release, Nov. 20, 2010, vol. 148, No. 1, pp. 13-17.

Kline, T. R. et al., "Catalytic nanomotors: remote-controlled autonomous movement of striped metallic nanorods", Angew. Chem. Int., 2005, Ed 44, pp. 744-746.

Lahav, M. et al., "Core-Shell and Segmented Polymer-Metal Composite Nanostructures", Nano Letters, 2006, vol. 6, No. 9, pp. 2166-2171.

Laocharoensuk, R., et al., "Carbon-Nanotube-Induced Acceleration of Catalytic Nanomotors," *ACS Nano*, 2008, 2(5):1069-1075.

Lee, D.-W., Authorized Officer, Korean Intellectual Property Office, Interntational Search Report and Written Opinion, PCT Application No. PCT/US2011/030211, Jan. 2, 2012, 8 pages.

Lee, J. S. et al., "Silver Nanoparticle-oligonucleotide conjugates based on DNA with triple cyclic disulfide moieties", Nano Letters 2007, 7, pp. 2112-2115.

Liao, J. C. et al., "Use of electrochemical DNA biosensors for rapid molecular identification of uropathogens in clinical urine specimens", J. Clin. Microbiol., 2006, 44, pp. 561-570.

Liu, W., et al., "Enzymatically Synthesized Conducting Polyaniline," *Journal of the American Chemical Society*, 1998, 121(1):71-78.

Luo, X., et al., "Enzymatic Nanolithography of Polyaniline Nanopatterns by Using Peroxidase-Modified Atomic Force Microscopy Tips," *Chemistry—A European Journal*, 2009, 15(21):5191-5194.

Manesh, K. et al., "Motion control at the nanoscale", Small 2010, 6, pp. 338-345.

Manesh, K. M., et al., "Nanomotor-based writing of surface microstructures," *The Royal Society of Chemistry: Chemical Communications*, 2010, 46(31):5704-5706.

Mano, N. et al., "Bioelectrichemical Propulsion", J. Am. Chem. Soc. 2005, 127, pp. 11574-11575.

Mascaro, L.H. et al., "Underpotential deposition of silver on polycrystalline platinum studied by cyclic voltammetry and rotating ring-disc techniques", J. Chem. Soc., Faraday Trans., 1997, 93(22), pp. 3999-4003.

Mei, Y. et al., "Versatile Approach for Integrative and Functionalized Tubes by Strain Engineering of Nanomembranes on Polymers", Adv. Mater., Oct. 15, 2008, vol. 20, No. 21, pp. 4085-4090.

Mihajlovic, G. et al., "All-electrical switching and control mechanism for actomyosin-powered nanoactuators", Appl. Physics Lett. 2004, 85, 1060.

Mirkovic, T. et al., "Nanolocomotion: catalytic nanomotors and nanorotors", Small 2010, 6, No. 2, 159-167.

Miyamoto, Y. et al., "Direct Inhibition of Microtubule-Based Kinesin Motility by Local Anesthetics", Biophys. J. 2000, 78, pp. 940-949.

Niidome, Y. et al., "Characterization of silver ions adsorbed on gold nanorods: surface analysis by using surface-assisted laser desorption/ionization time-of-flight mass spectrometry", Chem. Commun, 2009, pp. 1754-1756.

Okahata, Y. et al., "Hybridization of nucleic-acids immobilized on a quartz crystal microbalance", J. Am. Chem. Soc., 1992, 114, pp. 8299-8300.

Orendorff, C. J. et al., "Quantitation of Metal Content in the Silver-Assisted Growth of Gold Nanorods", J. Phys. Chem. B, 2006, 110, pp. 3990-3994.

Orozco, J. et al., "Dynamic Isolation and Unloading of Target Proteins by Aptamer-Modified Microtransporters", Anal. Chem., 83, 2011, pp. 7962-7969.

Ozin, G.A., et al., "Dream Nanomachines," *Advanced Materials*, Dec. 2005, 17(24):3011-3018.

Pal, S., et al., "Stable silver nanoparticle-DNA conjugates for directed self-assembly of core-satellite silver-gold nanoclusters", Chem. Commun., 2009, 40, pp. 6059-6061.

Palecek, E. et al., "Detecting DNA hybridization and damage", Anal. Chem. 2001, 73, pp. 74A-83A.

Park, Jong Chul, Authorized Officer, Korean Intellectual Property Office, International Search Report and Written Opinion mailed on Jun. 3, 2011 for International Application No. PCT/US2010/046558, 8 pages.

Parsons et al., "The oxidation of small organic molecules", J. Electroanal. Chem., 1988, 257, pp. 9-45.

Paxton, W. F. et al., "Catalytically Induced Electrokinetics for Motors and Micropumps", J. Am. Chem. Soc. 2006, 128, pp. 14881-14888.

Paxton et al., "Chemical Locomotion", Angew. Chemie. Int. Ed. 2006, 45, pp. 5420-5429.

Paxton, W.F. et al., "Motility of Catalytic Nanoparticles through Self-Generated Forces", Chem. Eur. J. 2005, 11, pp. 6462-6470.

Paxton, W.F. et al., "Catalytic Nanomotors: Autonomous Movement of Striped Nanorods", J. Am Chem. Soc. 2004, 126, pp. 13424-13431.

Piner, R.D., et al., "'Dip-Pen Nanolithography", *Science*, 1999, 283(5402):661-663.

Piunno, P. A. E. et al., "Fiber optic DNA sensor for fluorometric nuclei acid determination", Anal. Chem. 1995, 67, pp. 2635-2643.

Prieve, D. C., "Changes in zeta potential caused by a dc electric current for thin double layers", Colloids Surf. A: Physicochem. Eng. Aspects, 2004, 250, pp. 67-77.

Rosi, N. L. et al., "Nanostructures in biodiagnostics", Chem. Rev. 2005, 105, pp. 1547-1562.

Salaita, K., et al., "Applications of dip-pen nanolithography," *Nature Nanotechnology*, Feb. 2007, 2(3):145-155.

Solovev, A. A. et al., Catalytic Microtubular Jet Engines Self-Propelled by Accumulated Gas Bubbles, Small, Jul. 17, 2009, vol. 5, No. 14, pp. 1688-1692.

Strohmeier, R. et al., "Control of Cell Shape and Locomotion by External Calcium", Exp. Cell Res. 1984, 154, pp. 412-420.

Sundararajan, S., et al., "Catalytic Motors for Transport of Colloidal Cargo", Apr. 2008, *Nano Letters*, 8(5):1271-1276.

Suwansa-Ard, S. et al., "Prussian blue dispersed sphere catalytic labels for amplified electronic detection of DNA", Electroanalysis, 2008, 20, pp. 308-312.

Takeda, S., et al., "Lithographing of Biomolecules on a Substrate Surface Using an Enzyme-Immobilized AFM Tip," *Nano Letters*, Oct. 2003, 3(11):1471-1474.

Taton, T. A. et al., "Scanometric DNA Array Detection with Nanoparticle Probes", Science 2000, 289, pp. 1757-1759.

Thompson, D. G. et al., "Ultrasensitive DNA detection using oligonucleotide-silver nanoparticle conjugates", Anal. Chem., 2008, 80, 2805-2810 (2008).

Tokareva, I. et al., "Hybridization of oligonucleotide-modified silver and gold nanoparticles in aqueous dispersions and on gold films", J. Am. Chem. Soc. 2004, 126, pp. 15784-15789.

Tseng, A. A. et al., Nanofabrication by scanning probe microscope lithography: A review, J. Vac. Sci. Technol., 2005, B, 23, pp. 877-894.

Van Den Heuvel, M.G.L et al., "Motor Proteins at Work for Nanotechnology", Science 2007, 317, pp. 333-336.

Wachholz, F. et al., "Temperature pulse modulated amperometry at compact electrochemical sensors", Electrochem. Commun. 2007, 9, pp. 2346-2352.

Wang, J., "From DNA biosensors to gene chips", Nucl. Acids Res., 2000, 28, pp. 3011-3016.

Wang, J. et al., "Motion Control at the Nanoscale", Small, 2010, 6, No. 3, pp. 338-345.

Wang, J., "Nanomaterial-based amplified transduction of biomolecular interactions", Small 2005, 1, pp. 1036-1043.

Wang, J., "Can man-made nanomachines compete with nature biomotors?" *ACS Nano*, Jan. 2009, 3(1):4-9.

Wang, J. et al., "Silver-enhanced colloidal gold electrochemical stripping detection of DNA hybridization", Langmuir 2001, 17, pp. 5739-5741.

Wang, Y. et al., "Bipolar Electrochemical Mechanism for the Propulsion of Catalytic Nanomotors in Hydrogen Peroxide Solutions", Langmuir 2006, 22, pp. 10451-10456.

Watanabe, M. et al., "Electronic detection of DNA mutation based on strand exchange reaction", Biorg. Medicinal Chemistry, 2009, 17, pp. 1494-1497.

Whitesides, G.M., "The Once and Future Nanomachine," *Scientific American,* Sep. 2001, 285(3):70-75.

Wildgoose, G.G. et al., "High-Temperature Electrochemistry: A Review", Electroanalysis 2004, 16, No. 16, pp. 421-432.

Wouters, D., et al., "Nanolithography and Nanochemistry: Probe-Related Patterning Techniques and Chemical Modification for Nanometer-Sized Devices," *Angewandte Chemie International Edition,* May 2004, 43(19):2480-2495.

Yamazaki, S. et al., "A fuel cell with selective electrocatalysts using hydrogen peroxide as both an electron acceptor and a fuel", J. Power Sources 2008, 178, pp. 20-25.

York, J. et al., "Single-molecule detection of DNA via sequence-specific links between F1-ATPase motors and gold nanorod sensors", Lab on Chip 8, 2008, pp. 415-419.

Zacharia, N. S. et al., "Enhanced speed of bimetallic nanorod motors by surface roughening", Chem. Commun., 2009, pp. 5856-5858.

Zerihun, T. et al., "Oxidation of formaldehyde, methanol, formic acid and glucose at ac heated cylindrical Pt microelectrodes", J. Electroanal. Chem. 1998, 441, pp. 57-63.

Zhang, L. et al., "Artificial bacterial flagella: Fabrication and magnetic control", Appl. Phys. Lett. 2009, 94, 064107.

* cited by examiner

Figure 1 CNT-induced high speed catalytic nanomotors.

| Electrode | Electrochemical Methods | | |
|---|---|---|---|
| | Tafel Plot | | Open Circuit Potential[b] (mV) |
| | Mixed Potential[a] (mV) | Current Density (mA/cm$^2$) | |
| Gold | 316 ± 5 | $0.48 \times 10^{-3}$ | 347 ± 3 |
| Platinum | 297 ± 3 | $1.05 \times 10^{-2}$ | 289 ± 2 |
| Platinum-CNT | 244 ± 1 | $4.71 \times 10^{-2}$ | 242 ± 3 |

FIG. 19

*Figure 4 Hydrazine addition effects on CNT nanomotors.*

| Fuel₁ / Fuel₂ | Nanomotor₁ / Nanomotor₂ | Output Power Ratio[a] |
|---|---|---|
| $\dfrac{2.5\,wt\%\,H_2O_2}{2.5\,wt\%\,H_2O_2}$ | $\dfrac{Au/Ni/Au/Pt-CNT}{Au/Ni/Au/Pt}$ | 12.0 |
| $\dfrac{2.5\,wt\%\,H_2O_2 - 0.15\,wt\%\,hydrazine}{2.5\,wt\%\,H_2O_2 - 0.15\,wt\%\,hydrazine}$ | $\dfrac{Au/Ni/Au/Pt-CNT}{Au/Ni/Au/Pt}$ | 27.3 |
| $\dfrac{2.5\,wt\%\,H_2O_2 - 0.15\,wt\%\,hydrazine}{2.5\,wt\%\,H_2O_2}$ | $\dfrac{Au/Ni/Au/Pt-CNT}{Au/Ni/Au/Pt}$ | 353.4 |

[a] The output power ratio = $\dfrac{P_{o(1)}}{P_{o(2)}}$

FIG. 24

Free energy changes of biological redox reactions

| Reaction | $\Delta G^0$ (kJ/mole) |
|---|---|
| $2H_2O_2 \to 2H_2O + O_2$  (hydrogen peroxide decomposition) | -234 |
| $Cd^{2+} + 4CH_3NH_2 \to Cd(CH_3NH_2)_4^{2+}$ | -37.41 |
| $Cd^{2+} + 2en \to Cd(en)_2^{2+}$  (* en = ethylenediamine) | -60.67 |
| Glucose + $ATP^{4-} \leftrightarrow$ glucose-6-phosphate$^{2-}$ + $ADP^{3-}$ + $H^+$ | -22.59 |
| Glucose-6-phosphate$^{2-}$ + $H_2O \leftrightarrow$ glucose + $HPO_4^{2-}$ | -12.56 |
| $ATP^{4-} + H_2O \leftrightarrow ADP^{3-} + HPO_4^{2-} + H^+$  (ATP hydrolysis) | -35.15 |
| $ADP^{3-} + HPO_4^{2-} + 2H^+ \to ATP^{4-} + H_2O$ | +30.5 |
| $NADH \to NAD^+ + H^+ + 2e^-$ | -158.2 |
| $\frac{1}{2} O_2 + 2H^+ + 2e^- \to H_2O$ | -61.9 |
| $ADP^{3-} + HPO_4^{2-} + NADH + \frac{1}{2} O_2 + 2H^+ \to ATP^{4-} + NAD^+ + 2 H_2O$  (Oxidative phosphorylation) | -189.6 |

FIG. 27

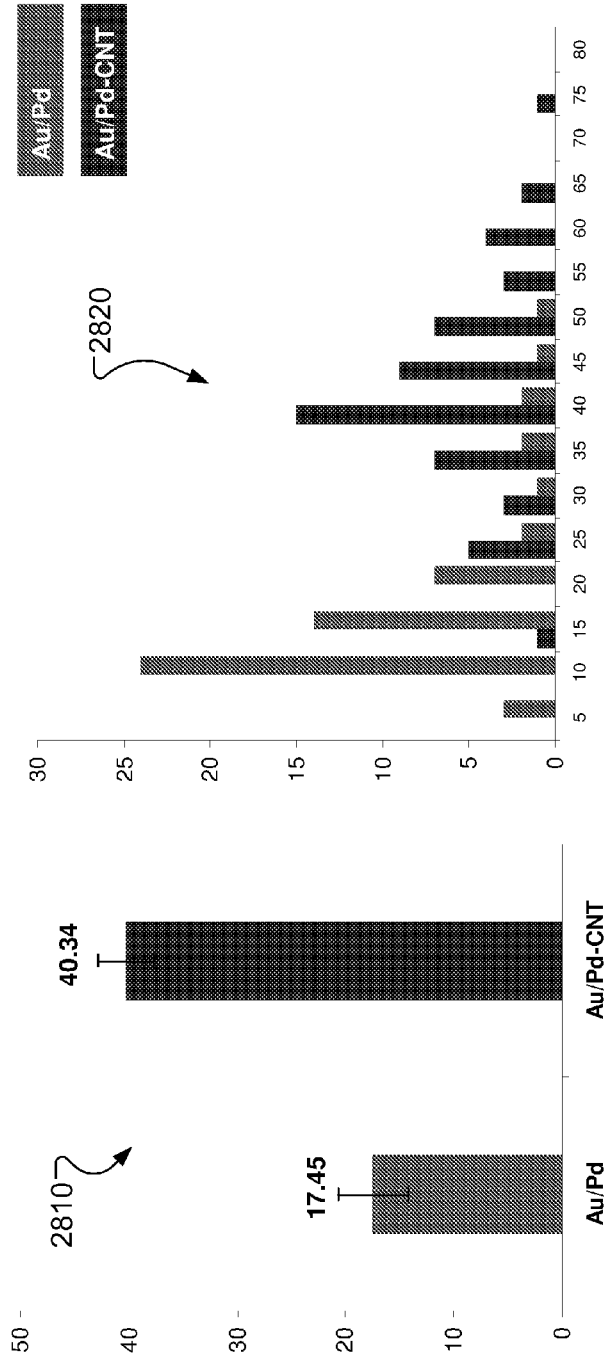
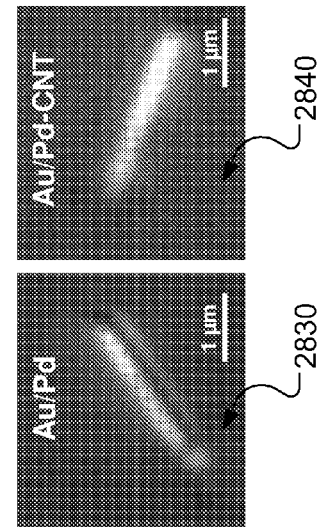
FIG. 28

| Au/Pt Nanomotors | | | |
|---|---|---|---|
| Conc | Ave | Error Limit | N |
| No Salt | 8.79 | 0.60 | 113 |
| 5nM | 6.28 | 0.73 | 26 |
| 50nM | 5.43 | 0.69 | 28 |
| 500nM | 7.57 | 1.02 | 41 |
| 5μM | 5.92 | 0.52 | 66 |
| 50μM | 4.40 | 0.25 | 60 |
| 500μM | 3.35 | 0.07 | 69 |
| 5mM | 2.94 | 0.06 | 98 |

| | Au/Pt-CNT Nanomotors | | |
|---|---|---|---|
| Conc | Ave | Error Limit | N |
| No Salt | 40.59 | 2.54 | 59 |
| 5nM | 54.90 | 2.50 | 61 |
| 50nM | 35.07 | 2.34 | 62 |
| 500nM | 23.71 | 3.22 | 48 |
| 5μM | 22.33 | 1.76 | 68 |
| 50μM | 12.17 | 0.67 | 84 |
| 500μM | 4.71 | 0.13 | 116 |
| 5mM | 3.64 | 0.07 | 99 |

…

NANOMOTOR-BASED PATTERNING OF SURFACE MICROSTRUCTURES

CROSS-REFERENCE TO RELATED APPLICATIONS

This document is a 35 U.S.C. 371 National Stage application of International Application No. PCT/US2010/046558 filed Aug. 24, 2010, which claims the benefit of U.S. Provisional Patent Application No. 61/236,785, filed Aug. 25, 2009, the entire disclosure of which is incorporated by reference as part of the disclosure of this application.

STATEMENT REGARDING FEDERALLY SPONSORED RESEARCH OR DEVELOPMENT

This invention was made with government support under grant no. CHE-0840684 awarded by National Science Foundation (NSF). The government has certain rights in the invention.

BACKGROUND

This application relates to nanomachines. Synthetic nanoscale motors, converting chemical energy into autonomous motion, represent a major step towards the development of practical nanomachines. There are several types of synthetic nanomotors. For example, a self-powered gold (Au)/platinum (Pt) or Au/nickel (Ni) bimetal nanowire motor can be powered by the catalytic decomposition of hydrogen peroxide fuel to oxygen and water. Such electrochemically-grown nanowires can effect autonomous movements in the axial direction with speeds near 10 µm/s.

SUMMARY

Techniques, systems and apparatus are disclosed for implementing functionalized nanomotors for patterning surface microstructures through a localized material deposition during a predefined motion of the motor.

In one aspect, a method of fabricating nanoobjects comprises functionalizing a nanomotor with a reagent. The method also includes controlling a movement of the functionalized nanomotor in a solution containing material to react with the reagent to induce a localized deposition or precipitation of a product onto a surface of a substrate.

Implementations can optionally include one or more of the following features. The reagent and a specific reaction can be selectively chosen to fabricate different microstructures made of different materials. The nanomotor can include a self-propelled nanomotor. The nanomotor can include a non-fuel based nanomotor. The nanomotor can include a fuel based nanomotor. The nanomotor can be selected from different nanomotors having different shapes comprising a sphere or a cylinder. The nanomotor motion can be accomplished using magnetic or electrical fields.

In another aspect, fabricating nanoobjects can include functionalizing a nanomotor with a catalytic reagent. The nanomotor can include an anode component that includes a metallic oxidizing catalyst to oxidize at least one electron donor substance in a solution. The nanomotor can include a ferromagnetic component connected to the anode component to magnetically control movement of the nanomachine. The nanomotor can include a cathode component connected to the ferromagnetic component that includes a metallic reducing catalyst to reduce at least one electron acceptor substance in the solution. The nanomotor can include a non-metallic redox catalyst functionalized to at least one of the anode component and the cathode component to increase a rate of a redox reaction in the solution. Fabricating nanoobjects can include magnetically controlling a motion of the functionalized motor along a predetermined path to fabricate nanoobjects in the solution that includes a reaction precursor for creating a conducting-polymer or metal structure. The controlled motion of the functionalized nanomotor causes a given localized reaction in select locations along the path of the nanomotor in motion to write a predetermined nanofeature.

Implementations can optionally include one or more of the following features. The reaction precursor can include a monomer or metal ions. The catalytic reagent can include an enzyme. The localized reaction induced by the moving functionalized nanomotor can include polymerization, metal deposition, or precipitation. Also, multiple nanomotors can be functionalized, and the movement of the multiple functionalized nanomotors can be controlled to simultaneously pattern multiple nanoobjects. The movement or speed of the multiple functionalized nanomotors can be controlled and regulated to pattern nanoobjects of different heights.

In another aspect, a system for fabricating nanoobjects can include a substrate holding mechanism for holding a substrate to receive fabricated nanoobjects. The system can include a catalytic nanomotor functionalized with a catalytic reagent. The nanomotor is disposed on a surface of the substrate and can include an anode component comprising a metallic oxidizing catalyst to oxidize at least one electron donor substance in a solution. The nanomotor can include a ferromagnetic component connected to the anode component to magnetically control movement of the nanomachine. The nanomotor can include a cathode component connected to the ferromagnetic component and comprising a metallic reducing catalyst to reduce at least one electron acceptor substance in the solution. The nanomotor can include a non-metallic redox catalyst functionalized to at least one of the anode component and the cathode component to increase a rate of a redox reaction in the solution. The system also includes a magnetic controller to magnetically control a motion of the functionalized motor along a predetermined path to fabricate nanoobjects in the solution comprising a reaction precursor for creating a conducting-polymer or metal structure. The controlled motion of the functionalized nanomotor causes a given localized reaction in select locations along the path of the nanomotor in motion to write a predetermined nanofeature.

In another aspect, a system for fabricating nanoobjects can include functionalizing a magnetically-guided fuel-free nanomotor with an enzyme, propelling it in a solution containing a metal ion and the corresponding enzyme. The localized enzymatic reaction generates a reducing agent that reduces the metal ions into a metal structure deposit over the predetermined path of the motor.

In another aspect, a system for fabricating nanoobjects can include a reagent-functional nanomotor whose reaction over a predetermined path leads to localized etching of the surface.

In another aspect, a nanomachine includes an anode component that includes a metallic oxidizing catalyst to oxidize at least one electron donor substance in a solution. The nanomachine can include a ferromagnetic component connected to the anode component to magnetically control movement of the nanomachine. The nanomachine can include a cathode component connected to the ferromagnetic component and include a metallic reducing catalyst to reduce at least one electron acceptor substance in the solution. The nanomachine can include a non-metallic redox catalyst functionalized to at least one of the anode component and the cathode component to increase a rate of a redox reaction in the solution. The anode component, the cathode component and the non-metallic redox catalyst can be configured to generate motion in response to the redox reaction in the solution.

Implementations can optionally include one or more of the following features. The cathode component can include a metal alloy. The metal alloy can include a gold-silver alloy. The metallic oxidizing catalyst can include a peroxide decomposing catalyst. The peroxide decomposing catalyst can include at least one of platinum, palladium, nickel, ruthenium or silver. The non-metallic redox catalyst can include horseradish peroxidase. The anode component, the cathode component, the ferromagnetic component and the non-metallic redox catalyst can be configured to generate motion in response to the redox reaction in the solution that includes the at least one electron donor substance. The ferromagnetic component can include nickel.

In another aspect, a method of manufacturing a nanomachine can include electrodepositing a sacrificial layer into a branched area of a porous membrane template. An anode layer can be deposited over the copper layer. Then, a ferromagnetic layer can be electrodeposited over the anode layer. A cathode layer that includes an alloy can be electrodeposited over the ferromagnetic layer until a predetermined alloy segment length is reached. The sacrificial layer can be removed. The cathode layer can be functionalized with a reagent, and then the membrane template can be removed to reveal the functionalized nanomachine.

Implementations can optionally include one or more of the following features. Functionalizing the cathode layer with a reagent can include functionalizing the cathode layer to a solution of biotin-terminated disulfide to form a self-assembled monolayer and functionalizing the biotin functionalized cathode layer with streptavidin and biotinylated-horseradish peroxidase. Removing the membrane template can include applying a dilute NaOH solution to dissolve the membrane template.

The subject matter described in this specification potentially can provide one or more of the following advantages. Controlled motion of functionalized nanomotors can provide a versatile and powerful route to create defined nanostructures over various surfaces. Nanomotor-based nanofabrication can eliminate the need for functionalized scanning probe tip used in Dip Pen Nanolithography (DPN), for example. Also, functionalized nanomotors can offer a more versatile operation than the scanning probe, including simultaneous patterning of multiple lines (e.g., by controlling motion of several nanomotors) or the creation of patterns of different heights by controlling the speed of the nanomotors on-demand. The versatility of using controlled motion of nanomotors can be useful in patterning of a wide range of material structures in nanoscales.

The DPN technique can be slow and lead to the patterning of small areas. The current invention eliminates the need for such scanning probe while offering a more versatile operation, including simultaneous patterning of multiple lines (in connection to the motion of several nanomotors) or the creation of patterns of different heights in connection to on-demand speed control. Our ultrafast nanomotors can lead to a rapid patterning and to a patterning of large areas. Other techniques for surface patterning include microcontact printing and nanoimprint lithography lack the ability to macroscopically addressing and manipulating individual nanostructures.

Additionally, self-propelling asymmetric catalytic nanowire motors operating on locally supplied fuels can provide fast transport speed, powerful transport mechanism as catalytic nanomotors, and their motion can be controlled. Moreover, the nanowire motors can facilitate the loading, transporting and releasing of 'heavy' cargo along with directed motion within complex micro-channel networks.

Navigation of different enzyme-modified nanomotors in the presence of various monomers could lead to diverse CP microstructures. The described nanomotor-based 'writing' method can be used to generate a myriad of surface microstructures made of different materials in connection to different (bio)chemical reactions. It can provide a versatile and powerful route to create defined microstructures, including simultaneous 'writing' of multiple lines (in connection to the motion of several nano-motors) and can cover larger area. The motor-induced 'writing' concept presented here could be extended to different types of nanomotors and various propulsion mechanisms.

BRIEF DESCRIPTION OF THE DRAWINGS

FIG. 19 displays Tafel plots for Au, Pt and Pt-CNT electrodes in a 5 wt % $H_2O_2$ solution.

FIG. 24 shows a summary of the output power ratio of Au/Ni/Au/Pt-CNT to Au/Ni/Au/Pt nanomotors in a $H_2O_2$ fuel or a mixture of $H_2O_2$ and hydrazine fuel.

FIG. 27 shows example free energy changes of biological redox reactions.

FIG. 28 shows example accelerated motions of CNT-doped palladium component of Pd—Au nanomotors.

Like reference symbols and designations in the various drawings indicate like elements.

DETAILED DESCRIPTION

Figure 1:
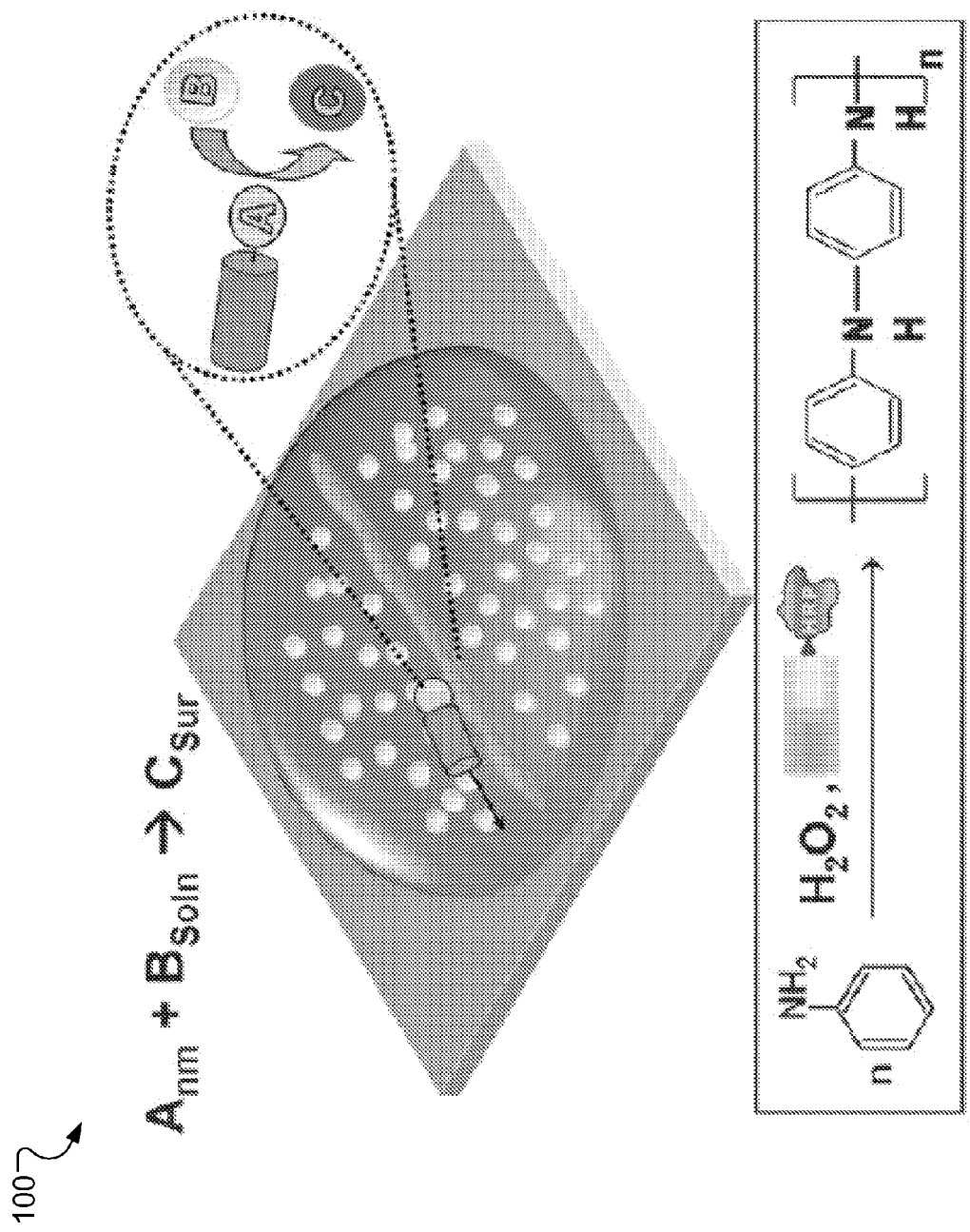
FIG. 1 is a diagram showing an overview of an example of nanomotor-induced surface patterning similar to different scanning-probe patterning techniques.

Dip Pen Nanolithography (DPN) is a labor-intensive technique that uses a scanning probe microscope tip to pick up, move, and release atoms, single molecules, and nanoscale objects in a controlled manner, one at a time. DPN has a slow patterning speed and lead to the patterning of small nanoscopic areas, such as sub-50-nm resolution.

The techniques, apparatus, materials and systems as described in this specification can be implemented to provide functionalized nanomotors for patterning surface microstructures through a localized material deposition during a predefined motion of the motor. Guided motion of the functionalized nanomotors can lead to a localized reaction involving deposition of a product along the path of the nanomotor movement and hence to the direct 'writing' of the predetermined microfeatures. For example, patterning of well-defined conducting-polymer microwire features is described through a guided motion of a horseradish-peroxidase (HRP) modified nanomotor and a localized biocatalytic growth of polyaniline in the presence of aniline and hydrogen peroxide. Such nanomotor-induced patterning can be used to fabricate a wide range of surface microstructures.

In one example, catalytic nanowire motors moving along predetermined paths can be used to fabricated nanoobjects (e.g., 'lines') in the presence of the relevant reaction precursors (e.g., a monomer or metal ions for creating a conducting-polymer or metal structures) and a catalyst (e.g., enzyme) confined to the moto-surface. Guided motion of the functionalized nanomotors can lead to a given localized reaction (e.g., electropolymerization or metal deposition) in specific locations along the nanomotor movement path and hence to the direct 'writing' of the predetermined nanofeatures. Different types of nanomotors can be used to perform deposition of a wide range of materials.

Microfabrication

The preparation of well-defined microscale structures at a surface can be useful in microfabrication. For example, tip-based scanning-probe techniques can be used to deposit chemical or biological materials onto flat substrates [see, e.g., Wouters, Angew Chemie 2004]. Such scanning-probe fabrication methods commonly rely on using the tips of scanning probe microscopes for localized surface modification.

In this specification, techniques, apparatus, materials and system are described for using artificial nanomotors to create defined patterns of microscale surface structures. Synthetic artificial nanomotors of different propulsion mechanisms may be useful in a wide range of current and future technological applications. [Whitesides, Sci. Am.] For example, self-propelling catalytic nanowire motors operating on locally supplied fuels can be especially useful for various applications [Ozin, Sci. Am. ACS Nano].

The capability of the catalytic nanomotors to navigate along predetermined complex paths and to be functionalized with a wide range of biological or chemical entities [Wang, ACS Nano, 2009, 3, 4-9] can be utilized to implement a nanomotor-based patterning protocol. Magnetically-guided motion of such catalytic nanowire motors can be controlled by using a ferromagnetic (nickel) segment to generate complex nanomotor movement patterns.

FIG. 1 is a block diagram 100 showing a general overview of nanomotor-induced surface patterning. Various types of nanomotors based on different propulsion and guidance mechanisms can be used to create localized surface microstructures similar to those performed by different scanning-probe patterning techniques. Nanomotors can be self-propelled or externally guided/navigated. For an example reaction between A and B that generates a deposit C, a nanomotor functionalized with reagent A and moving in a solution containing B can be used to induce a localized deposition/precipitation of the product C onto a target surface. A variety of microstructures, made of different materials (polymers, metals, etc), can thus be fabricated on various substrates based on the choice of the reactants and the specific reaction.

FIG. 1 also shows a conceptual scheme demonstrating the use of functionalized nanomotors for creating surface microfeatures through a localized chemical reaction and material deposition during a defined guided motion of the motor. As an example, the polymeric reaction used for writing PANI lines in the presence of the HRP-functionalized Pt/Ni/Au—Ag nanomotors and $H_2O_2$ is shown at the bottom (* nm—nanomotor, Soln—Solution and Sur—Surface).

A system can be implemented to implement the nanomotor-induced surface patterning. The system can include a substrate holding mechanism for holding a substrate onto which surface patterning is to be performed. A nanomotor is positioned on the surface of the substrate to perform the surface patterning. A magnetic controller is used to control the movement of the nanomotor to create a desired nanoobject on the surface of the substrate.

Figure 2:
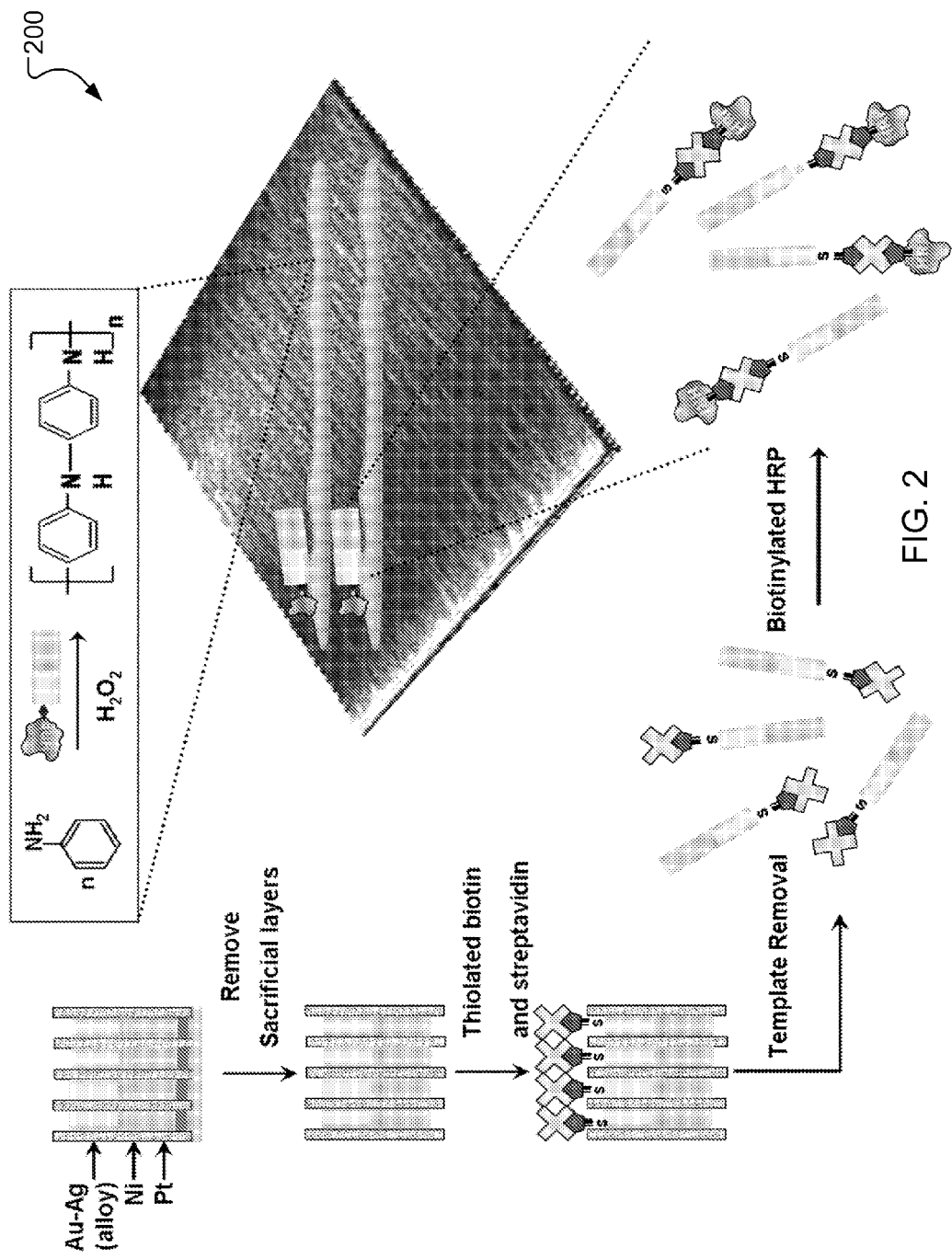
FIG. 2 is a schematic representation of nanomotor-based fabrication and patterning of defined conducting-polymer (PAn) microstructures and related functionalization of the motor.

An example nanomotor-induced surface patterning tool can be implemented using peroxide-driven nanowire motors to create predefined patterns of Polyaniline through a localized biocatalytic polymerization reaction. FIG. 2 is a diagram 200 showing an example nanometer-induced surface pattering tool. Microscale surface patterning can be implemented by functionalizing horseradish peroxidase (HRP) onto a Pt/Au—Ag nanowire motor to catalyze the oxidation and localized polymerization of the aniline monomer in the presence of hydrogen peroxide. Thus, well-defined tailored-shaped polyaniline (PANI) microstructure patterns can be created through a controlled movement and accurate positioning of the enzyme-modified nanomotor in a manner analogous to the AFM-based biocatalytic lithographic growth using enzyme-modified tips [Nano Lett., 2003, 3, 1471; Europ. J. 09]. In FIG. 2, HRP has been confined onto the Au—Ag alloy end of the nanowire motors through biotin-streptavidin interaction (in connection to a thiolated biotin.

The template synthesis of nanowire motors can allow functionalization of the nanowire end with different reagents through different surface chemistries. Also, the peroxide reagent can act as the fuel that propels the nanomotor motion. Thus, magnetically-guided motion of the enzyme-modified functionalized nanomotors can lead to a localized biocatalytic electropolymerization reaction in specific locations and hence to the direct 'writing' of conducting-polymer (CP) microfeatures along the nanomotor path.

Figure 3A:
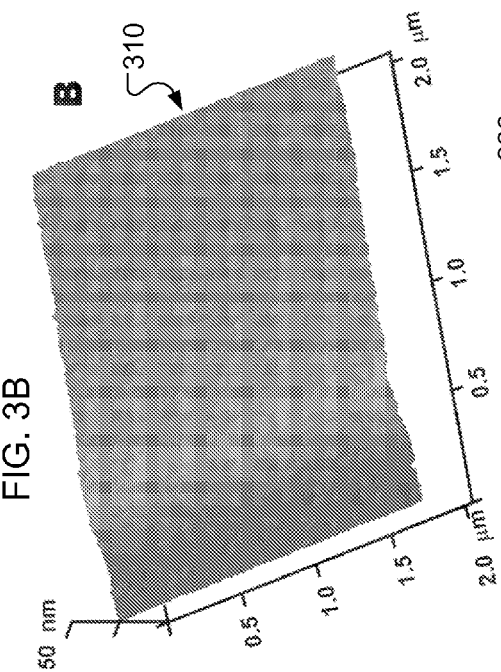
FIG. 3A is an AFM image of Polyaniline nanopatterning or of surface made by a nanomotor without an enzyme. No PAn is observed without the enzyme.
Figure 3B:
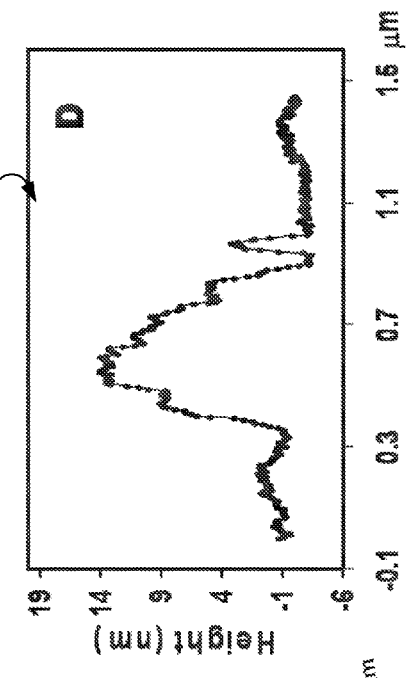
FIG. 3B is an AFM image of Polyaniline nanopatterning made by a nanomotor solution without aniline monomer. No PAn is observed without the aniline.
Figure 3C:
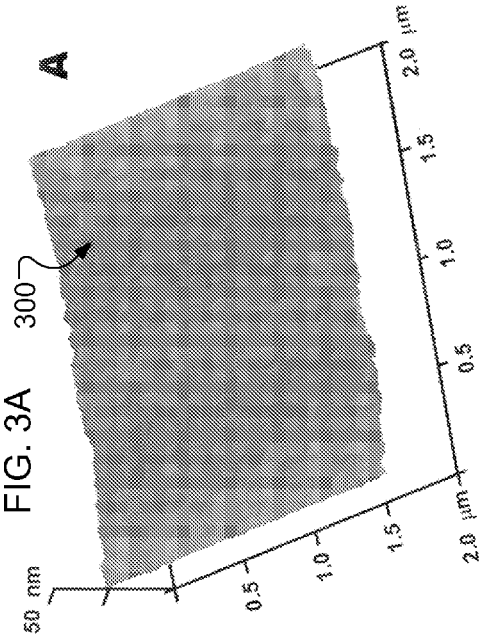
FIG. 3C is an AFM image of Polyaniline nanopatterning made by an enzyme modified nanomotor with aniline.
Figure 3D:
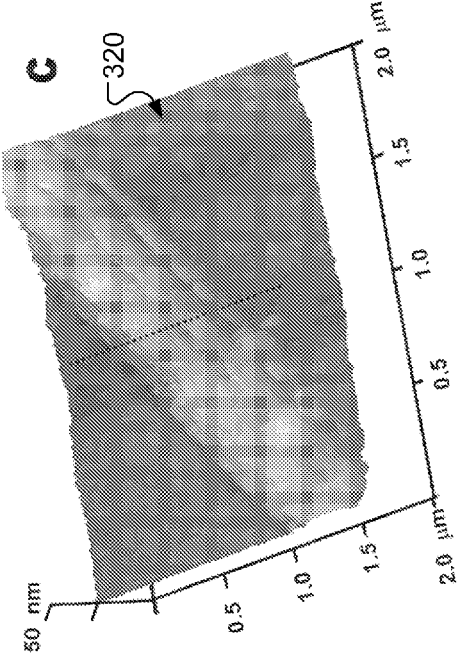
FIG. 3D is a diagram showing corresponding height profile of the dotted line in FIG. 3C.

FIGS. 3A, 3B, 3C are AFM images 300, 310 and 320 of a gold surface. FIG. 3A shows an AFM image 300 obtained using nanomotors without an enzyme. FIG. 3B shows an AFM image 310 obtained using nanomotors in a solution without an aniline monomer. FIG. 3C shows an AFM image 320 obtained using nanomotors with an enzyme and an aniline monomer. FIG. 3D shows a corresponding height profile 330 of a dotted line shown in FIG. 3C. For aniline polymerization, enzyme modified nanomotors were mixed with 5% $H_2O_2$ and 3 mM aniline in 1 mM $LiClO_4$.

Referring back to FIG. 3C, the image 320 shows an AFM image of a gold surface following the nanomotor-induced electropolymerization. The HRP-functionalized nanomotors can be used for patterning of polyaniline (PANI) from a solution mixture of 3 mM aniline in 1 mM $LiClO_4$ and 5% $H_2O_2$ onto a freshly evaporated gold slide. HRP catalyzed polymerization of aniline and its derivative can be substantially as described in [W. Liu, J. Kumar, S. Tripathy, K. J. Senecal, L. Samuelson, J. Am. Chem. Soc. 1999, 121, 71-78, X. Luo, V. A. Pedrosa, J. Wang, Chem. Eur. J. 2009, 15, 5191-5194]. FIG. 3C shows a clear patterning of PANI on to the gold slide with a line width of about 500 nm and an average height of 15 nm along the path of the nanomotor. Such polymeric microstructures are not observed in control experiments carried out under similar conditions, in the presence of nanomotor, but without the enzyme (FIG. 3A) or the aniline monomer (FIG. 3B). These data clearly indicate that HRP, hydrogen peroxide and aniline in combination may contribute to the formation of the linear microscale line feature (of FIG. 3C) and that this nanostructure is PANI (in accordance with the reaction scheme of FIG. 1).

Figure 4:
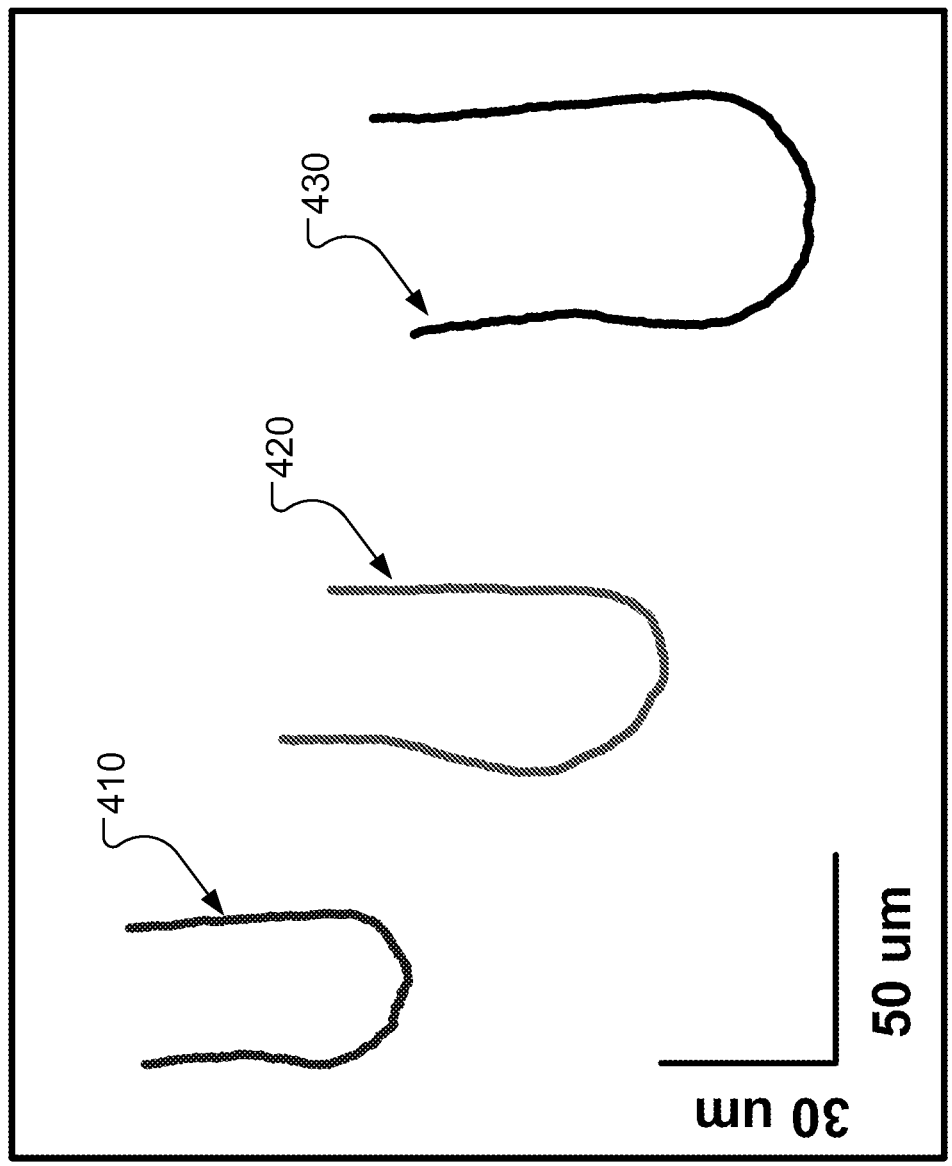
FIG. 4 is a diagram showing simultaneous magnetic motion control of three nanomotors in conditions as shown in FIGS. 3A, 3B and 3C.

FIG. 4 is a diagram 400 showing simultaneous magnetic motion control of three nanomotors in conditions as shown in FIGS. 3A, 3B and 3C. FIG. 4 demonstrates simultaneous motion control of three nanomotors using external magnetic field under the experimental conditions. Three paths 410, 420 and 430 are shown for the three nanomotors being controlled. The second and third moving nanowire motors are magnetically guided by their motion in the opposite ('clockwise') direction. Such simultaneously guided motions of several functionalized nanomotors indicate great promise for the direct patterning of multiple microstructures in a highly parallel manner including features made of different materials in connection to the use of different reagents.

Figures 5A, 5B, 5C:
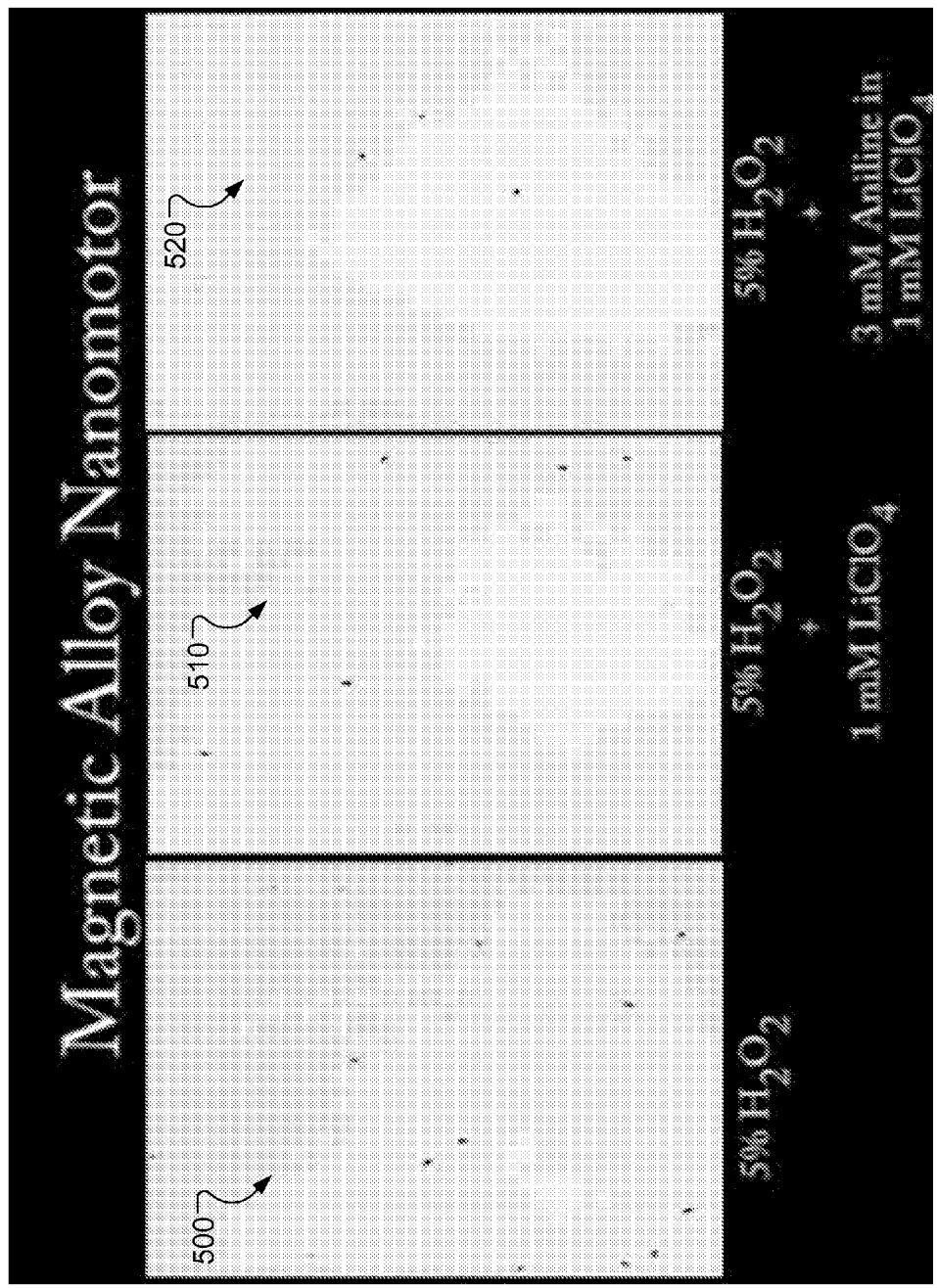
FIG. 5A is an image taken from a video showing that catalytic nanomotors can maintain their non-Brownian motion in the presence of an enzyme.
FIG. 5B is an image taken from a video showing that catalytic nanomotors can maintain their non-Brownian motion in the presence of essential $LiClO_4$ salt.
FIG. 5C is an image taken from a video showing that catalytic nanomotors can maintain their non-Brownian motion in the presence of aniline.

The presence of the corresponding reactants does not impair the nanomotor motion. FIGS. 5A, 5B and 5C are images 500, 510 and 520 showing that catalytic nanomotors can maintain their non-Brownian motion in the presence of the enzyme (5A), the aniline (5C) or the essential $LiClO_4$ salt (5B). Also, FIGS. 5A-5C show the movement of these nanomotors under the explored reaction conditions. The peroxide reagent can act as the fuel that propels the nanomotor motion. The alloy nanomotors [Angew Chemie 2008, 47, 9349)] exhibit axial motion even in high salt concentration of 1 mM $LiClO_4$. Alloy nanomotors are superior over Au—Pt nanomotors as they are able to sustain axial motion in high salt concentrations because of their increased catalytic rate overcoming the solution conductivity-imposed speed diminution.

Figure 6:
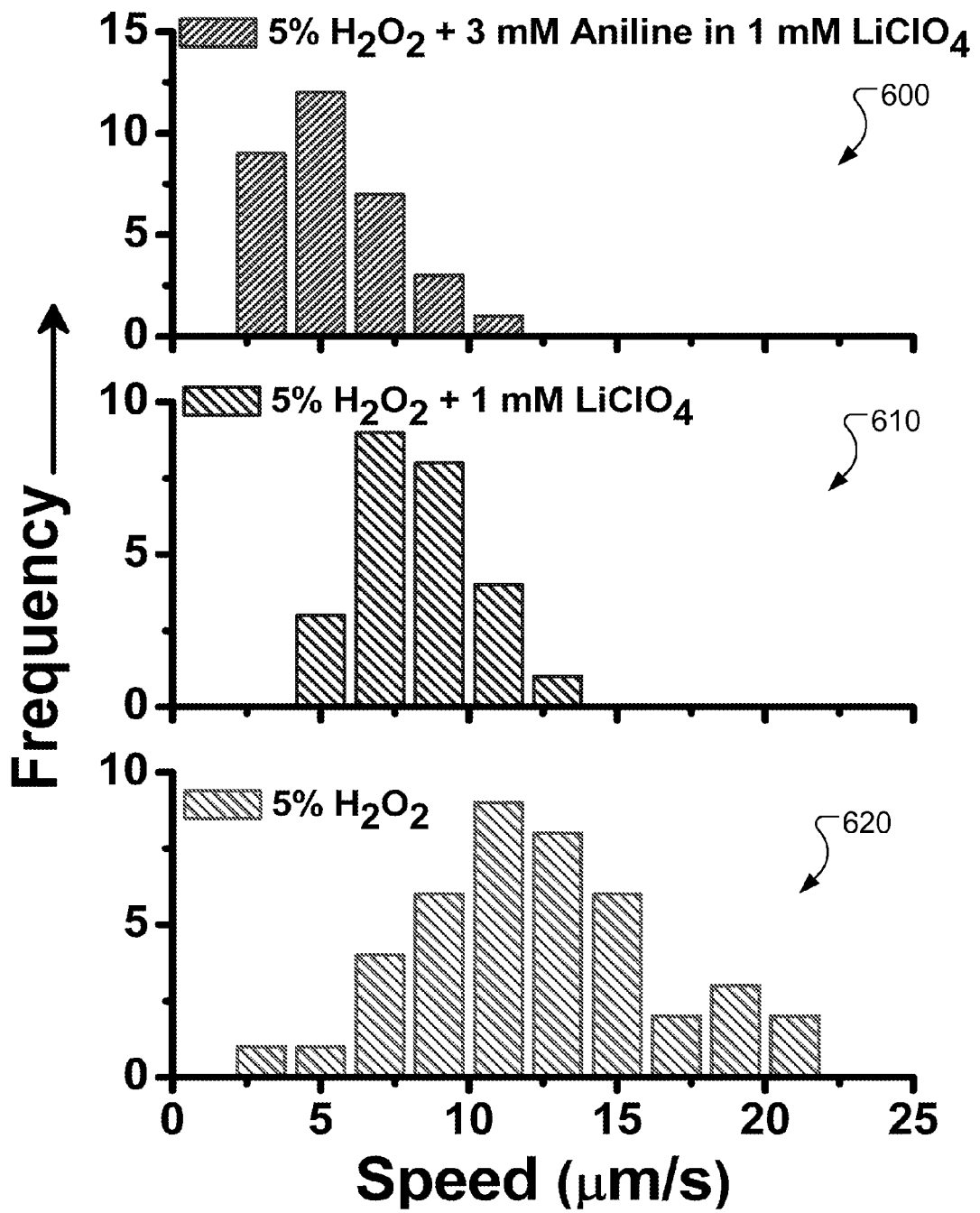
FIG. 6 shows corresponding histograms for speed distributions of Pt—Au/Ag nanomotor in different conditions.

FIG. 6 is a diagram that shows the corresponding histograms 600, 610 and 620 for the speed distributions of Pt—Au/Ag nanomotor in different conditions. The concept can be implemented using fuel-free nanomotors based on magnetically or electrically driven locomotion, thus obviating any fuel-related limitations on the reactions involved.

Figure 7:
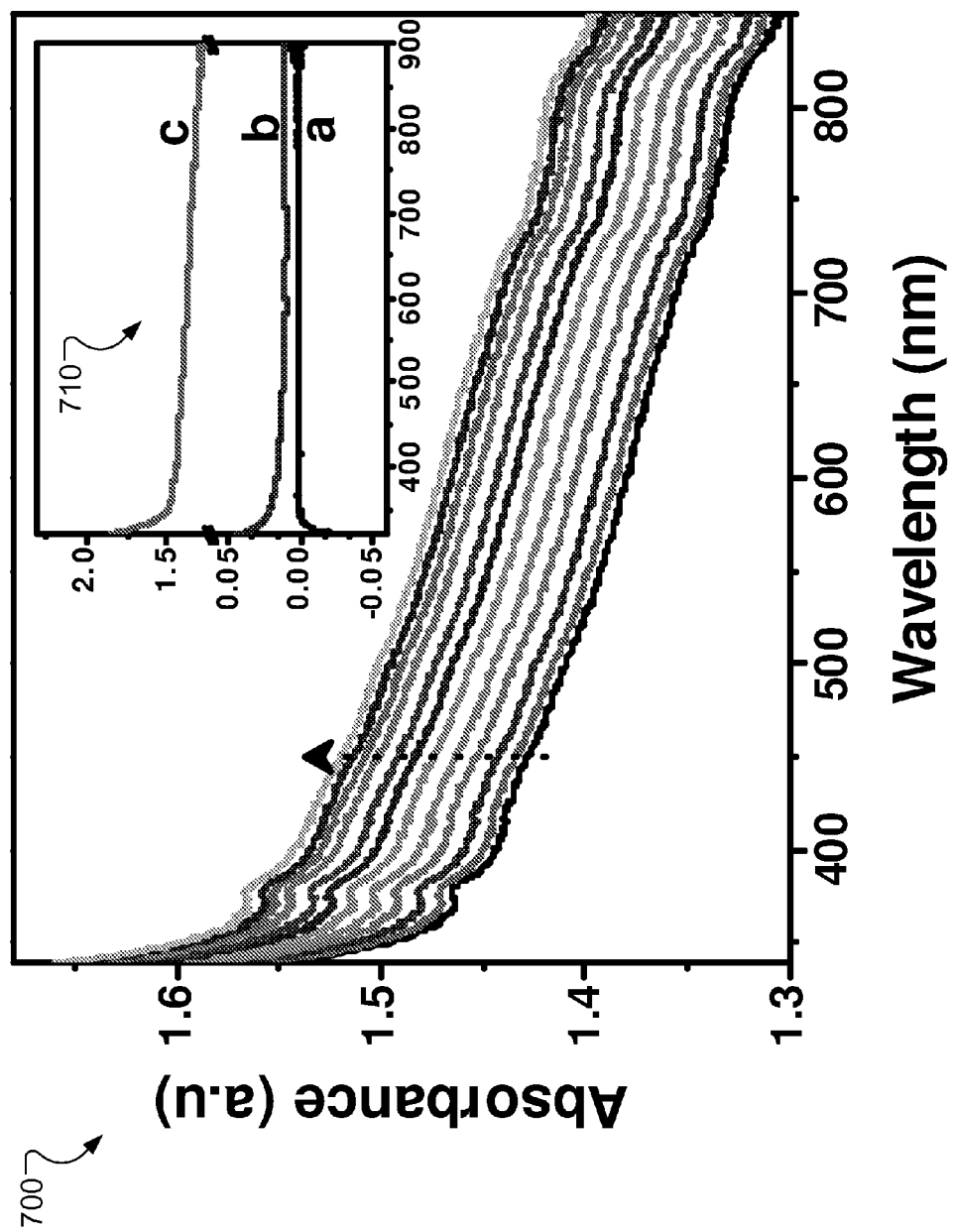
FIG. 7 shows UV-visible Spectra for a course of polymerization of Polyaniline with time. The inset in FIG. 7 shows the spectra for the aniline alone (a), with Au/Ag—Pt (b) and with Au/Ag—Pt-HRP (c).

To validate the nanomotor-based process, the polymerization reactions of aniline with HRP immobilized nanomotor can be monitored by UV-visible spectroscopy in the similar reaction medium. FIG. 7 shows the UV-visible Spectra 700 for the course of polymerization of Polyaniline with time. The inset 710 in FIG. 7 shows the spectra for the aniline alone (a), with Au/Ag—Pt (b) and with Au/Ag—Pt-HRP (c). With increasing time, the absorbance values of the spectra increases, which confirms that the molecular weight of the polymer with the course of time. Due to the small quantity of polymer generation by enzymatic reaction, the peaks corresponding to the PANI may not be observed clearly.

Figures 8A, 8B:
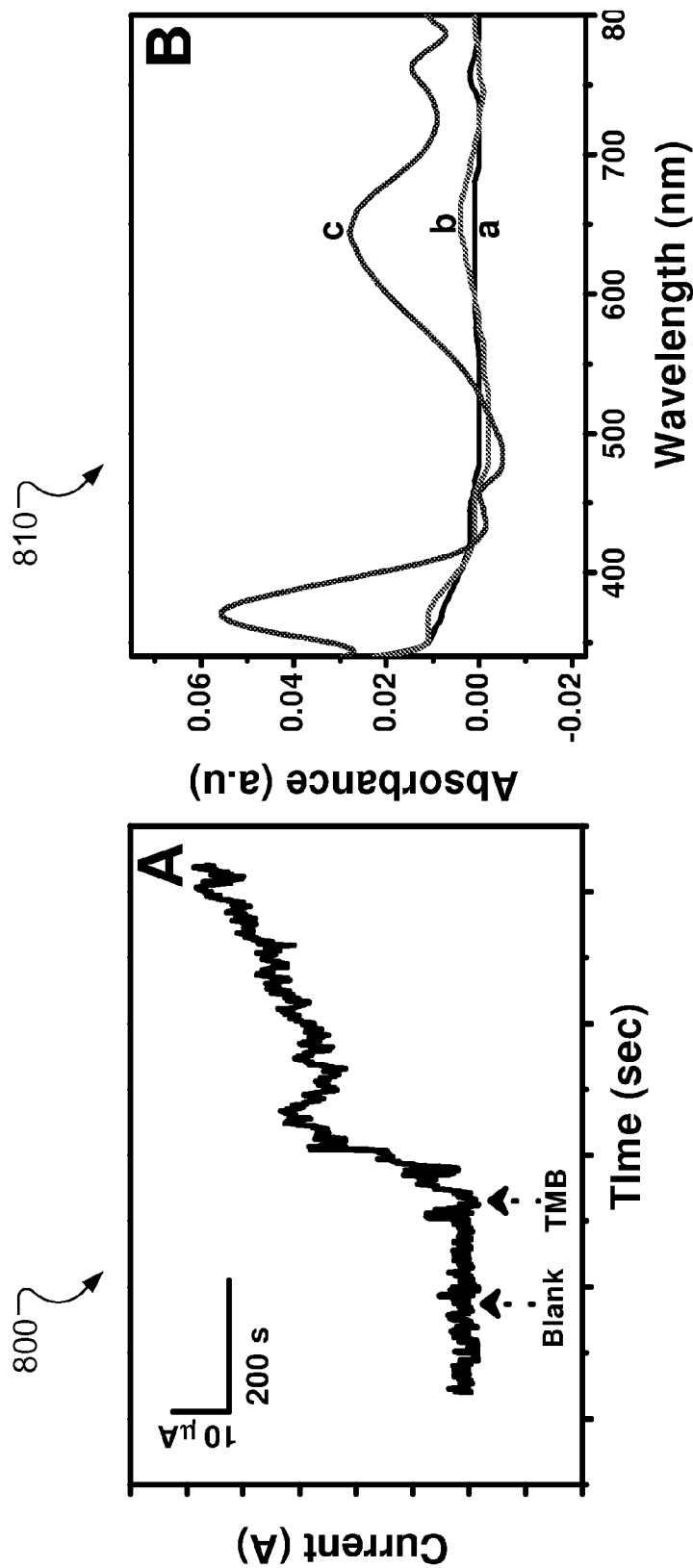
FIG. 8A shows an amperometric response of Au/Ag—Pt-HRP toward the commercial TMB (10 times diluted).
FIG. 8B shows the UV-visible spectra for (a) commercial TMB solution (1650 times diluted), (b) with Au/Ag—Pt, and (c) with Au/Ag—Pt-HRP.

FIG. 8A shows an amperometric response 800 of Au/Ag—Pt-HRP toward the commercial TMB (10 times diluted). The presence and activity of HRP on nanomotor can be confirmed using amperometric response of tetramethylbenzidine (TMB) at the potential of −0.1 V as shown in FIG. 8A. With the addition of HRP substrate solution, a clear step increase in current can be observed due to the HRP catalyzed oxidation of TMB by $H_2O_2$. In contrast to the HRP activity, no increase in current is observed for the blank (distilled water) condition.

FIG. 8B shows the UV-visible spectra 810 for the (a) commercial TMB solution (100 times diluted), (b) with Au/Ag—Pt, and (c) with Au/Ag—Pt-HRP. Similarly, UV-visible spectra of HRP substrate solution with enzyme immobilized alloy nanomotors show two apparent absorbance bands at 360 nm and 650 nm of the oxidation product of quinonediimine. The control experiment doesn't show any absorbance band at this area. These experiments clearly validates that immobilized HRP on nanomotors can survive harsh conditions such as exposure to NaOH during membrane dissolution.

Figure 9:
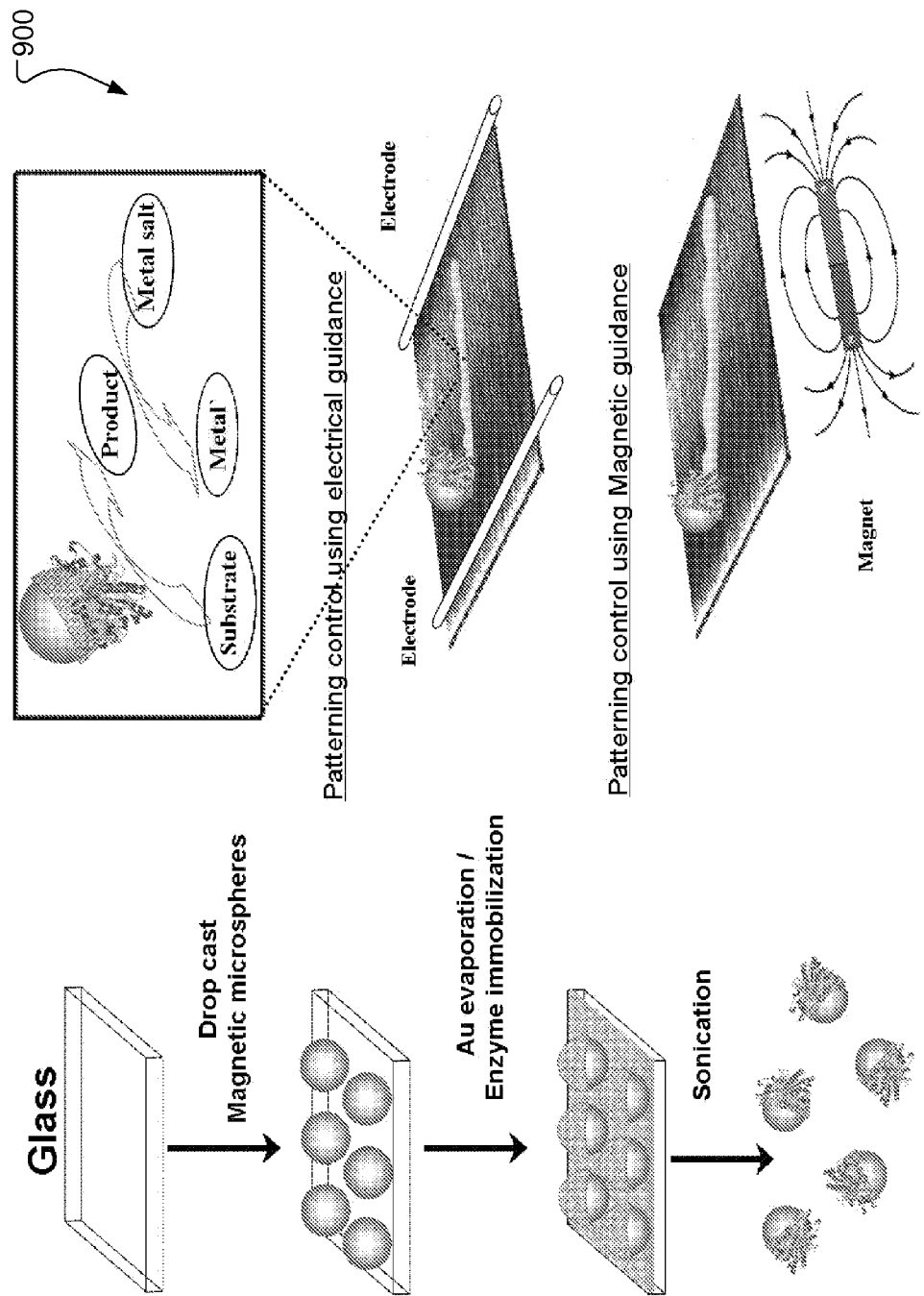
FIG. 9 is a diagram showing a U-shaped motion control of nanomotors.

Controlled nanomotor motion along predetermined paths, with a precise control over the position and direction, can be useful for reproducible surface patterning. A variety of approaches for achieving precise motion control of catalytic nanomotors, both temporally and spatially, can be implemented. FIG. 9 is a diagram 900 showing a U-shaped motion control of nanomotors. Such controlled motion of multiple functionalized nanomotors can be used for the simultaneous creation of multiple similar surface features.

Nanowire Synthesis and Enzyme Functionalization

Various types of nanomotors can be used. For example, bisegment nanomotors (e.g., Pt—Ag/Au bisegments) can be prepared by sequential electrodeposition of the silver/gold (Ag/Au) alloy segment and of the pure platinum segment into a porous alumina membrane template (Catalog no. 6809-6022; Whatman, Maidstone, U.K.). A sacrificial copper layer can be first electrodeposited into the branched area of the membrane using a 1M cupric sulfate pentahydrate solution ($CuSO_4 \cdot 5H_2O$; Sigma-Aldrich, St. Louis, Mo.) to obtain a total charge (C) of 10 Coulombs and a potential of −1.0 V (vs. Ag/AgCl; along with a platinum wire as a counter electrode). Platinum can be deposited potentiostatically at −0.3 V for 2.8 C from a platinum plating solution (hexachloroplatinic acid, boric acid mixture) followed by electrodeposition of ferromagnetic Ni segment using a nickel plating solution [20 g $L^{-1}$ $NiCl_2 \cdot 6H_2O$], 515 g $L^{-1}$ $Ni(H_2NSO_3)_2 \cdot 4H_2O$, and 20 g $L^{-1}$ $H_3BO_3$ (buffered to pH 3.4)] at −1.0 V for 2 C. Subsequently, Ag/Au alloys were electrodeposited at −1.1 V from a 1:1 composition of gold and silver plating solutions (Orotemp 24 RTU RACK and 1025 RTU@4.5 Troy/Gallon; respectively; Technic Inc., Anaheim, Calif.) until an alloy segment length of 1 μm is reached. The sputtered gold layer can be removed by mechanical polishing using alumina powder (3-4 μm particle size) and the sacrificial copper layer was removed using 0.5 M $CuCl_2$— 20% HCl mixture.

Bio-functionalization of nanowires can be performed by exposing Ag/Au alloy ends of nanowires (in membrane) to 1 mM ethanolic solution of biotin-terminated disulfide (EZ-link Biotin HPDP, Pierce Biotechnology, Rockford, Ill.) to form a self-assembled monolayer. The biotin functionalized nanowires (in membrane) can be subsequently functionalized with streptavidin (10 μg/ml in a 0.5 mM phosphate buffer) and biotinylated-HRP (25 μg/ml in 0.5 mM Phosphate buffer). A dilute NaOH solution can be used to dissolve the membrane and release enzyme functionalized nanowires washed thoroughly with ultra pure water (18.2 MΩ cm) by repeated centrifugation until a neutral pH is achieved. All enzyme-functionalized nanowires can be stored at 4° C. before testing. The presence of HRP in the nanomotor is confirmed by amperometric (−0.1 V) and optical response using HRP substrate solution containing 3,3',5,5'-Tetramethylbenzidine (TMB) and $H_2O_2$ (Enhanced K-Blue TMB substrate, Neogen Corporation, Lansing, Mich.).

Details of the procedure used for tracking nanomotor movement and of the statistical analysis of sampling data are found in the attached appendix. [Angew Chemie, 2008, 47, 9349-9351].

Nanopatterning of Polyaniline

Freshly prepared enzyme functionalized Ag/Au—Pt nanowires can be mixed with different concentrations of aniline and 5% $H_2O_2$ in 1 mM $LiClO_4$ solution. A 10 μl aliquot of the above mixture can be added to freshly evaporate gold slide for video acquisition and AFM analysis (see below). An optical microscope (Nikon Instrument Inc., Eclipse 80i, Melville, N.Y.) equipped with a 20× objective, a Photometrics CoolSnap CF camera (Roper Scientific, Duluth, Ga.) and MetaMorph 7.1 software (Molecular Devices, Sunnyvale, Calif., USA) can be used for capturing real-time movement of nanomotors at a frame rate of 10 fps. All imaging and lithography can be performed in tapping mode on a Veeco Scanning Probe Microscope. Imaging can be carried out at a 5 μm scan scale at a scan rate of 1.0 Hz. All patterning experiments can be conducted under ambient conditions at 28-30% relative humidity and 23° C.

The use of functionalized nanomotors has been described for fabricating defined patterns of microscale structures and for localized tailoring of the surface architecture. The nanomotors described in this specification can increase the resolution, throughput and 'writing' speed for patterning the surface microstructures. Such predefined navigation of different enzyme-modified nanomotors in the presence of various monomers can lead to diverse and complexed CP nanostructures. While the described concept of nanomotor-based patterning has been illustrated in connection to the creation of defined CP surface features, the techniques can be readily expanded to microstructures made of different materials in connection to different (bio)chemical reactions. Indeed, given the remarkable versatility of the nanomotors, the ultimate resolution of the described protocol for patterning surface microstructures can be controlled by the nanomotor dimensions. Because the size of the fabricated features depends on the dimension of the moving motor, smaller nanomotors can yield smaller surface objects for nanoscale fabrication.

Similar functionalization with an enzyme can generate a reducing agent that can stimulate a localized biocatalytic metallization in the presence of the corresponding metal ions.

Nanomotor-induced surface patterning can represent a versatile and powerful route for creating defined nanostructures over flat surfaces based on controlled motion of functionalized nanomotors. Nanomotor-induced surface patterning can eliminate the need for functionalized scanning probe tips and specialized inks (used in DPN; discussed below) and can offer a more versatile operation, including simultaneous patterning of multiple lines (in connection to the motion of several nanomotors) or the creation of patterns of different heights in connection to on-demand speed control. Such nanomotor-induced surface patterning can create new opportunities and facilitate the design of novel nanoscale circuits and the development of new optoelectronic devices. Owing to the great versatility of man-made nanomotors, such devices can hold a considerable promise for generating a wide range of micro- and nanoscale patterns made of different materials and using different substrates. Improved resolution and the creation of nanoscale surface objects may require smaller nanoscopic moving motors. The nanomotor-based direct-write concept is generic and can be extended to a wide range of surface structures.

Figure 10:
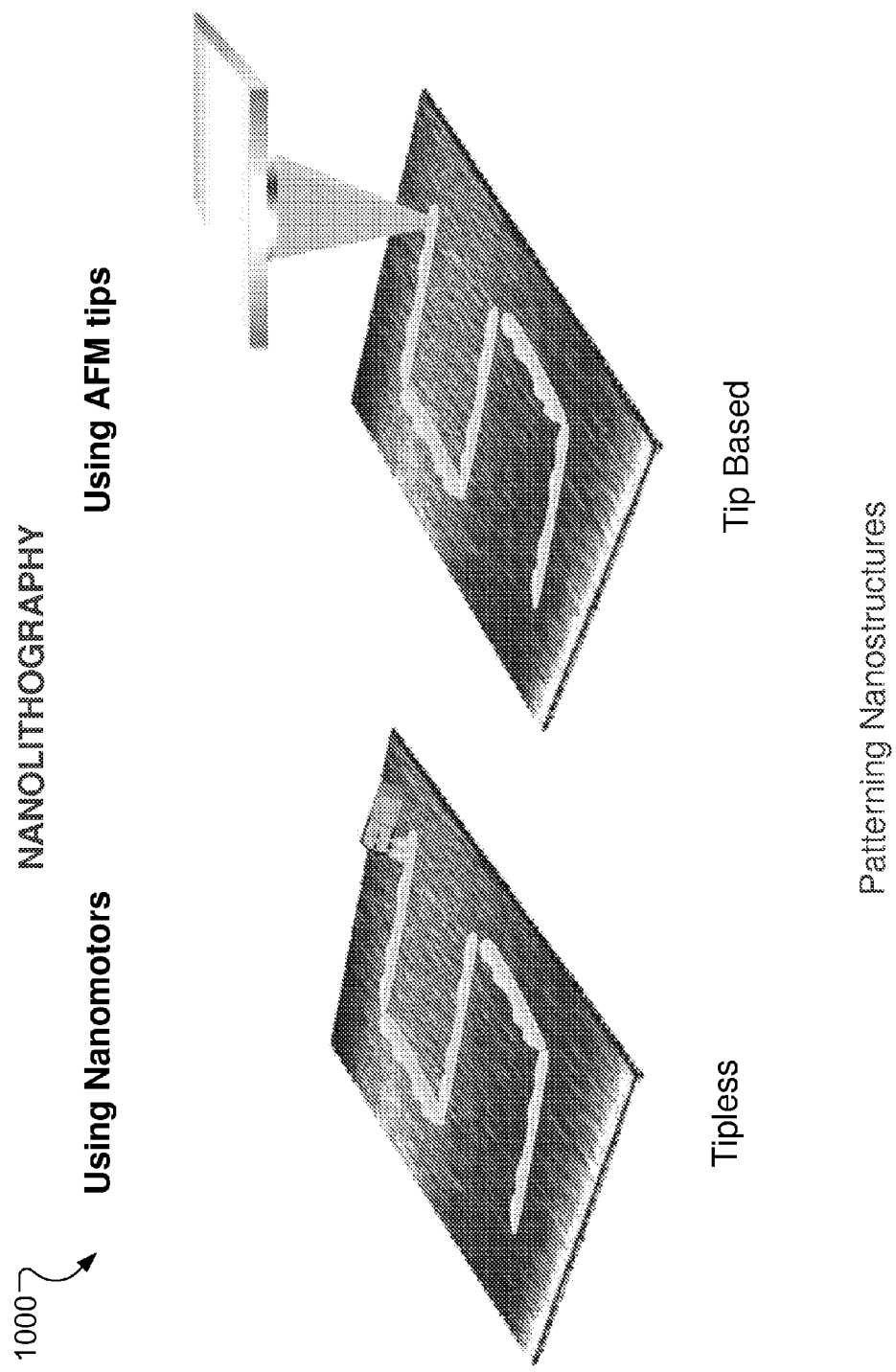
FIG. 10 is a diagram showing examples of lithography using nanomotors and scanning probe lithography.

FIG. 10 is a diagram 1000 showing examples of nanolithography using nanomotors and scanning probe lithography. On the left-hand panel, nanostructures are patterned on a surface of a substrate using nanomotors. Nanomotors allows for tipless nanolithography. On the right-hand panel, nanostructures are patterned using AFM tips.

Various Nanomachine Types and Fuel Consideration

In addition to the nanomotors described above, other synthetic nanomachines can be implemented to achieve increased efficiency and speed that are akin to their biological counterparts. For example, alloy based bisegment nanowire motors can be implemented to move at a speed of over 150 $\mu ms^{-1}$ by using a cathodic Ag—Au segment instead of a Au one [Angew Chemie, 2008, 47, 9349-9351]. Alloys can improve the catalytic activity of electrodes. For example, Ag—Au alloys can enhance the electron transfer reactions of hydrogen peroxide compared to silver or gold alone. By using alloy segments, the speed and power of fuel-driven nanomotors can be dramatically enhanced. Because the alloy segment is prepared by simultaneous electrodeposition of its metal constituents, the ultrafast speed and high efficiency of the new Ag—Au/Pt nanomotors can be achieved without compromising the simplicity of the template-guided nanowire preparation route.

Figure 11:
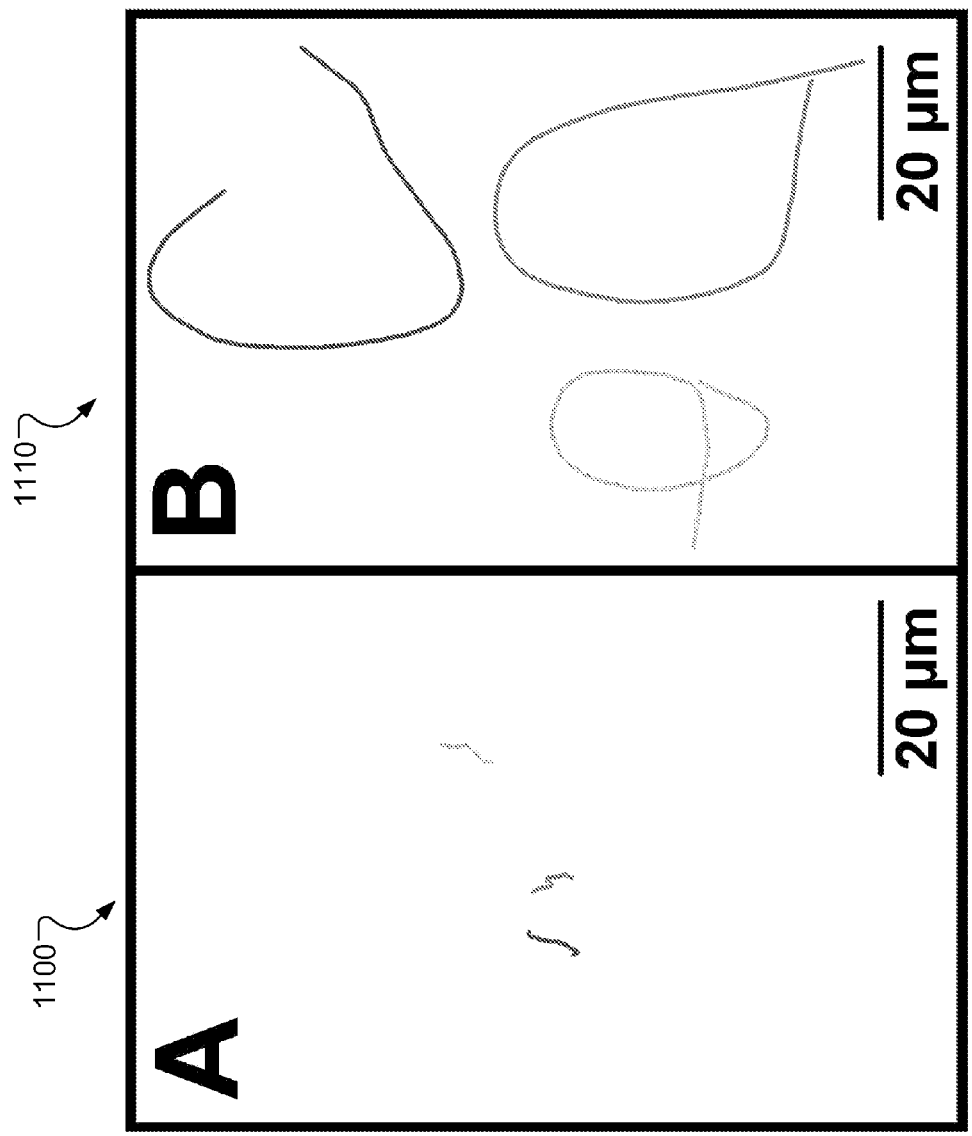
FIGS. 11A and 11B show typical tracking lines and moving distances of Au/Pt (Panel A) and Ag—Au/Pt (Panel B) nanowire motors during a 1 sec period in the presence of 15 wt % hydrogen peroxide.

FIGS. 11A and 11B show typical tracking lines 1100 and 1110 and moving distances of Au/Pt (Panel A) and Ag—Au/Pt (Panel B) nanowire motors during a 1 sec period in the presence of 15 wt % hydrogen peroxide. While the Au/Pt motors travel over ca. 10 μm distance, the Ag—Au/Pt nanowires moved over 110 μm during the same period. Thus, the alloy nanowire motors demonstrated approximately 11 times faster speed than the non-alloy nanowire motors. These alloy based nanomotors display a well-defined directional motion with their Pt end forward and maintained their speed during the entire 15 min tracking experiment.

Figure 12:
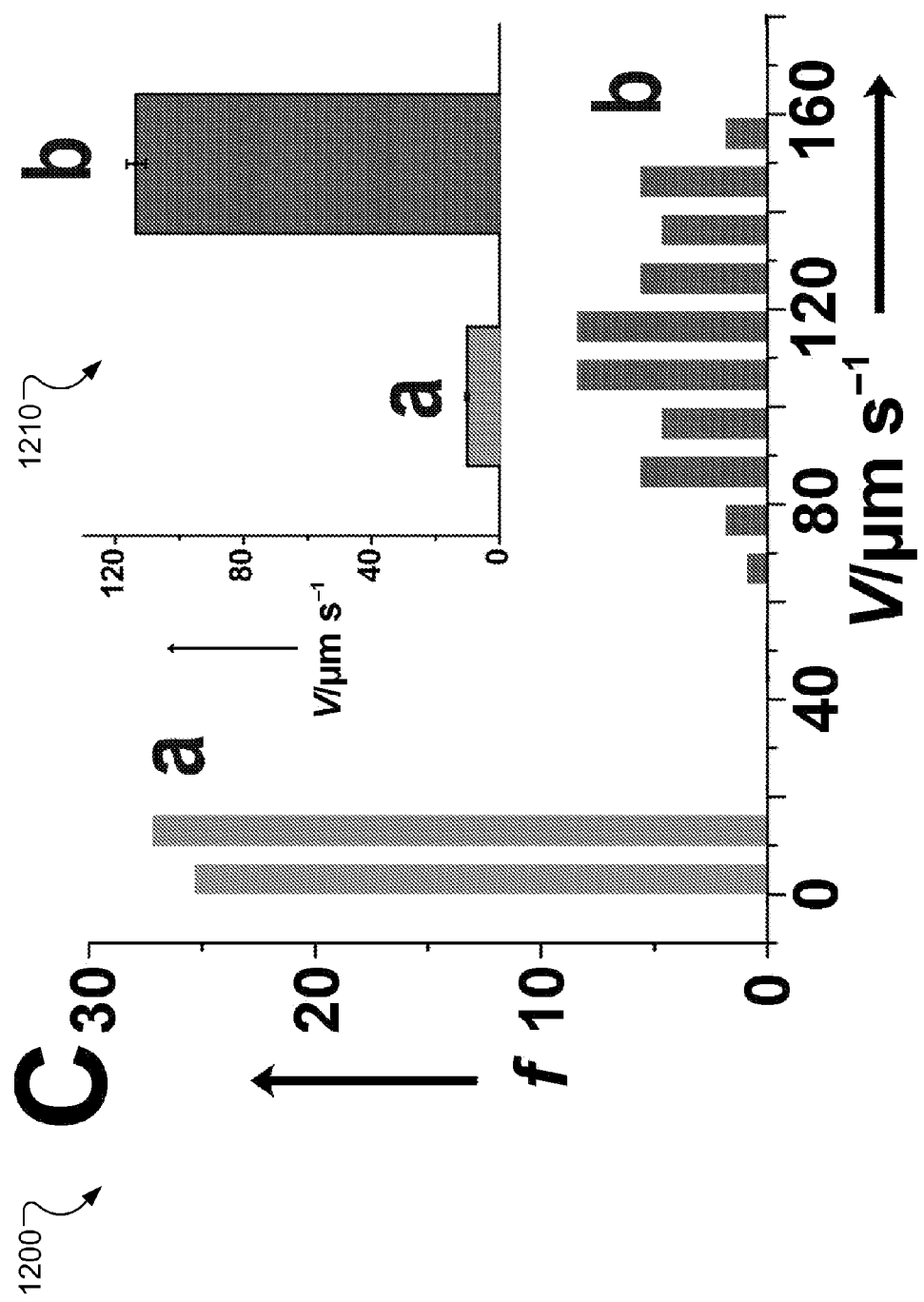
FIG. 12 shows histograms showing speed distributions of Au/Pt (a) and $Ag_{75}Au_{25}$/Pt (b) nanomotors obtained from tracking a set of over 50 nanowires during a 10 s period.

FIG. 12 shows histograms 1200 showing speed distributions of Au/Pt (a) and $Ag_{75}Au_{25}$/Pt (b) nanomotors obtained from tracking a set of over 50 nanowires during a 10 s period. The inset 1210 shows a comparison of the average speeds of the catalytic nanomotors and the corresponding error (90% confidence intervals). The speed distribution profiles shown in FIG. 12 indicate average speeds of 10.2 and 113.6 $\mu ms^{-1}$ for the Au/Pt and Ag—Au/Pt nanowires, respectively. About 5% of these alloy wires display speeds higher than 150 $\mu ms^{-1}$, corresponding to over 75 body-length/s and approaching the speed of the most efficient biomotors (e.g., flagellated bacteria). CNT-containing nanowires display an average speed of 51 $\mu ms^{-1}$ using the same fuel composition. The data shown in FIGS. 12 and 13 indicate that the energy conversion and output power of the alloy nanomotors are significantly higher than that of Au/Pt nanomotors, reflecting the substantially higher fuel decomposition rate. Considering that the output power varies as the square of velocity and the 11-fold speed enhancement, the new alloy wires offer ca. 121 times higher output power compared to conventional nanowire motors.

Figure 13:
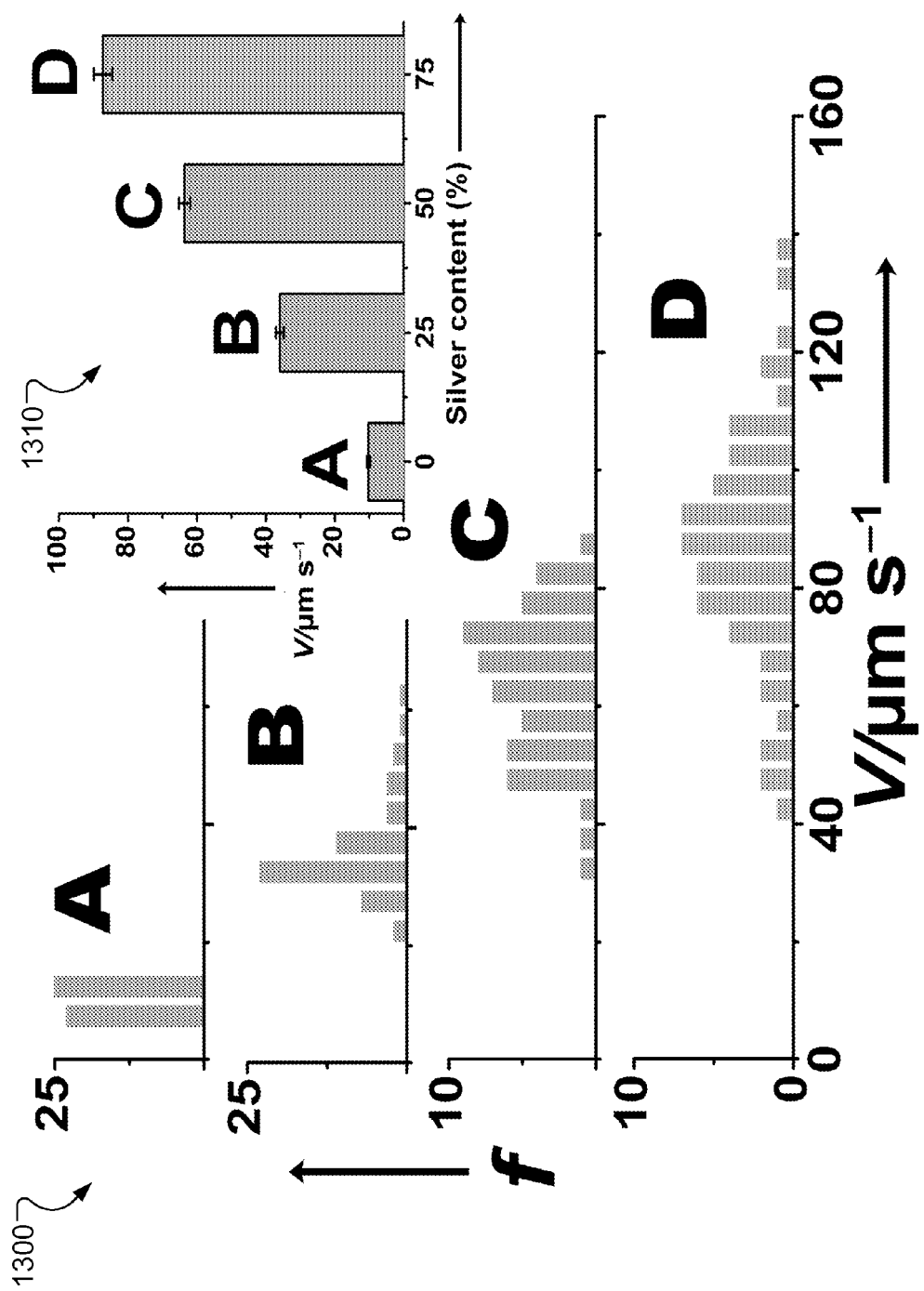
FIG. 13 shows histograms of the speed distributions of Au/Pt (Panel A) and $Ag_{25}Au_{75}$/Pt (Panel B), $Ag_{50}Au_{50}$/Pt (Panel C), $Ag_{75}Au_{25}$/Pt (Panel D) nanomotors in a 5 wt % $H_2O_2$ solution.

The speed of the new alloy nanowire motors is strongly affected by the composition of the Ag—Au segment. FIG. 13 shows histograms 1300 of the speed distributions of Au/Pt (Panel A) and $Ag_{25}Au_{75}$/Pt (Panel B), $Ag_{50}Au_{50}$/Pt (Panel C), $Ag_{75}Au_{25}$/Pt (Panel D) nanomotors in a 5 wt % $H_2O_2$ solution. The histograms are generated based on over 50 nanomotors for each nanomotor composition. The histograms and graph bars in the inset 1310 of FIG. 13 illustrate that the speed increases in a nearly linear fashion upon increasing the silver level in the growth solution from 0 to 75% (v/v) (A–D). While motors based on the pure gold segment display an average speed of 9.9 $\mu ms$-1 (A), average speeds of 35.9, 63.6, and 87.2 $\mu ms$-1 are observed in 5% $H_2O_2$ solution for alloy segments prepared in plating solutions containing 25 (B), 50 (C) and 75 (D) % (v/v) of silver, respectively (labeled here as $Ag_{25}Au_{75}$, $Ag_{50}Au_{50}$, and $Ag_{75}Au_{25}$). The motion decrease rapidly to around 7 $\mu ms^{-1}$ using a higher [85% (v/v)] silver level and nearly stopped using a pure silver segment (not shown). Such behavior is consistent with early reports on extremely high hydrogen-peroxide decomposition rates at Ag—Au alloys compared to the pure silver catalyst, with faster reaction rates upon raising the Ag content in the alloy, except when the silver content approaches unity. The EDX data indicate that alloy plating solutions containing 25 and 75% (v/v) silver lead to alloy nanowires containing 81 and 95 wt % silver, respectively (not shown). Overall, FIG. 13 indicates that the speed of alloy nanowires can be tailored by controlling the alloy composition. Such tunable speed could be exploited for designing novel nanowire barcodes based on motion as a new mode of identification (orthogonal to composition-based readout). The attractive behavior of the new catalytic alloy nanomotors reflects the marked increase in the fuel decomposition rate compared to the pure metals, associated with the formation of adsorbed $OH^-$ species and the minimization of catalyst loss. The self-electrophoresis (electrokinetic) mechanism of bisegment catalytic nanomotors suggests that the speed of such nanomotors is proportional to the mixed potential difference ($\Delta E$) of the corresponding segment materials in the fuel.

Figure 14:
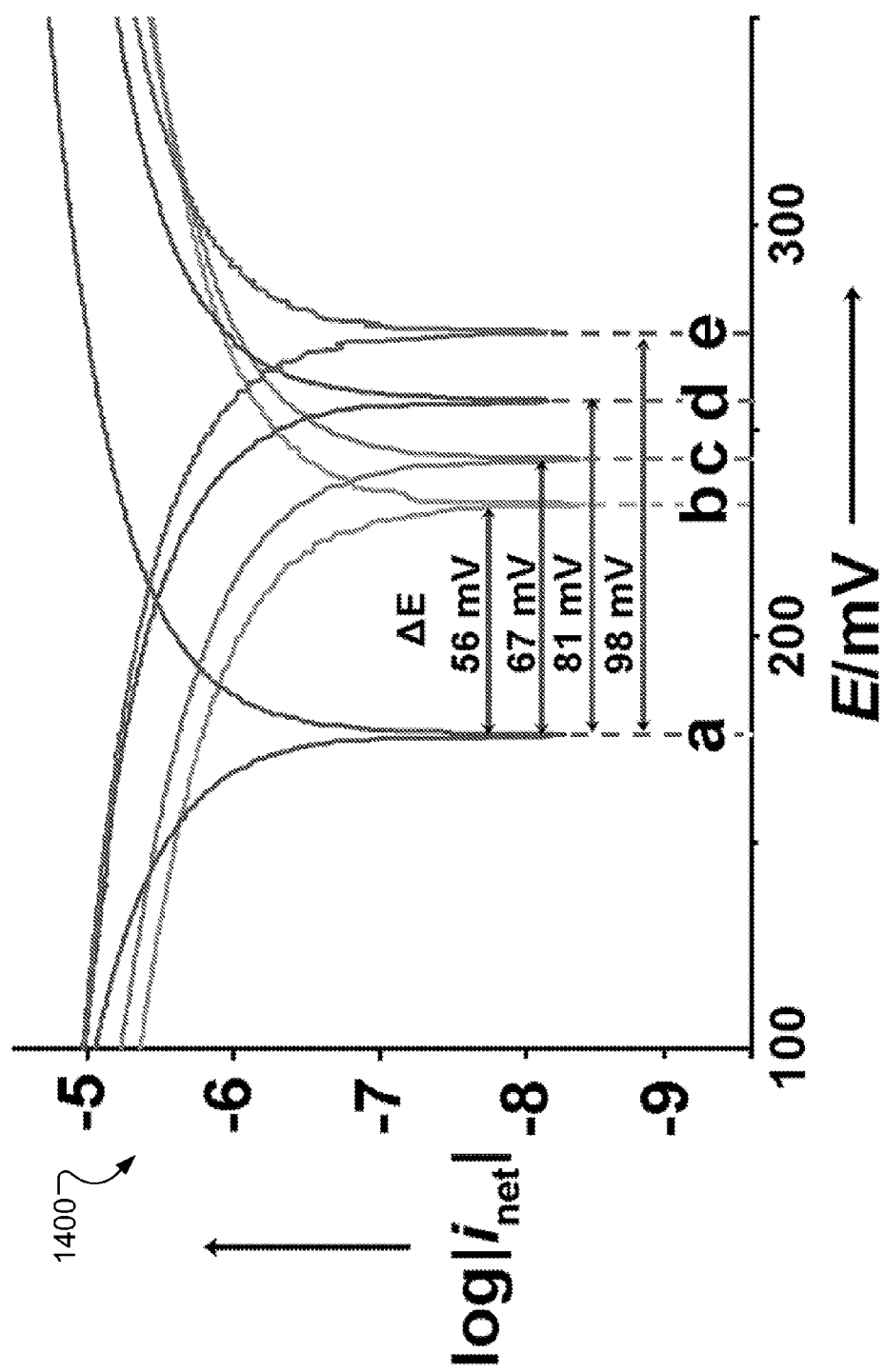
FIG. 14 shows Tafel plots of the hydrogen peroxide reaction, used for obtaining the ΔE values, using Pt (a), Au (b) and $Ag_{25}Au_{75}$ (c), $Ag_{50}Au_{50}$ (d), $Ag_{75}Au_{25}$ (e) alloys.

FIG. 14 shows Tafel plots 1400 of the hydrogen peroxide reaction, used for obtaining the $\Delta E$ values, using Pt (a), Au (b) and $Ag_{25}Au_{75}$ (c), $Ag_{50}Au_{50}$ (d), $Ag_{75}Au_{25}$ (e) alloys. A gradual potential shift from 243 to 274 mV is observed upon raising the silver content in the Ag—Au alloys. This leads to larger $\Delta E_{Ag-Au/PT}$ values (67 to 98 mV) compared to 56 mV for the pure metals. Such increase of the $\Delta E_{Ag-Au/PT}$ value with the silver content is consistent with the speed-composition data of FIG. 13.

Dramatic increase in the speed of fuel-driven nanowire motors to over 150 $\mu ms^1$ can be achieved using a cathodic Ag—Au alloy segment instead of a pure Au one. Given that such ultrafast speeds are achieved without any additives/accelerators, further acceleration of the alloy nanomotors is expected using mixed fuels (e.g., peroxide-hydrazine) or upon incorporating CNT within the Pt segment. Tailoring the alloy composition, including the spatial distribution of the metals within the cathodic segment, could also be used for optimizing the catalytic activity and efficiency of the new nanomotors. Improved understanding of the electrochemical reactivity of alloys (including potential synergistic effects), and of the role of various fuel and motor additives, would thus enable the design of energy efficient nanomotors performing complex tasks.

Also, one or more non-metallic redox catalysts can be combined with the metal anode component of an asymmetric bimetal nanowire motor to enhance its movement in a fuel solution. Alternatively, the non-metallic redox catalyst can be combined with the reduction catalyst at the cathode component. In some implementations, the non-metallic redox catalyst can be combined with both the anode metal component and the cathode metal component. For example, carbon nanotubes (CNT) can be combined with Platinum (Pt) at the anode component of the asymmetric metal nanowire motor to accelerate its movement in one or more hydrogen-peroxide based solutions. CNTs are allotropes of carbon with a nanostructure with a length-to-diameter ratio greater than 1,000,000. The nanostructure of the CNTs can include cylindrical carbon molecules with properties useful for many applications in nanotechnology, electronics, optics and other fields of materials science. CNTs exhibit extraordinary strength and unique electrical properties, and are efficient conductors of heat. Also, CNTs can be inorganic nanotubes. CNTs can be single walled or multi-walled in structure. Such CNT-enhanced metal nanowire motor can achieve an average speed in the range of 50-60 µm/s and approaching those of natural biomolecular motors. Other catalytic carbons, such as carbon$_{60}$, can be used instead of CNT.

Additional enhancement in the average speed of the CNT modified synthetic nanomotor can be achieved by using a modified fuel solution that includes hydrazine and peroxide. The increased speed of the CNT modified nanomotor in the presence of hydrazine can be in the range of 94 µm/s to above 200 µm/s. The combination of CNT loading and hydrazine based fuel provides an unexpected synergistic increase in the nanomotor speed that far exceeds simple additive effects of CNT and hydrazine.

Figure 15A:
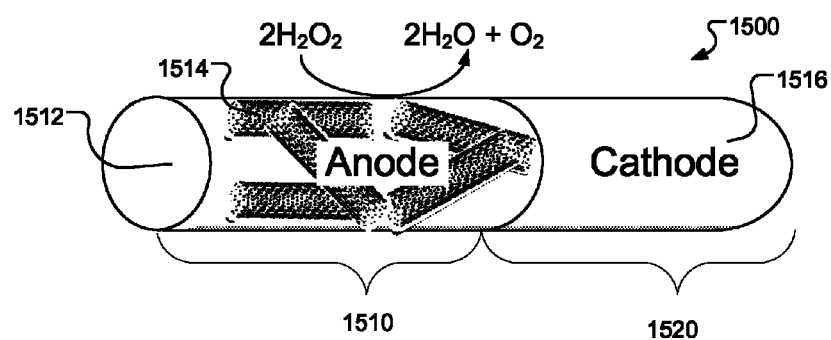
FIGS. 15A, 15B and 15C are block diagrams of the catalytic nanomotors.
Figure 15B:
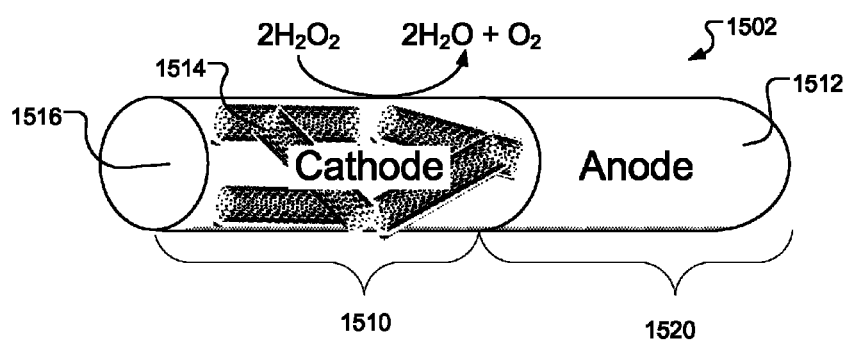
Figure 15C:
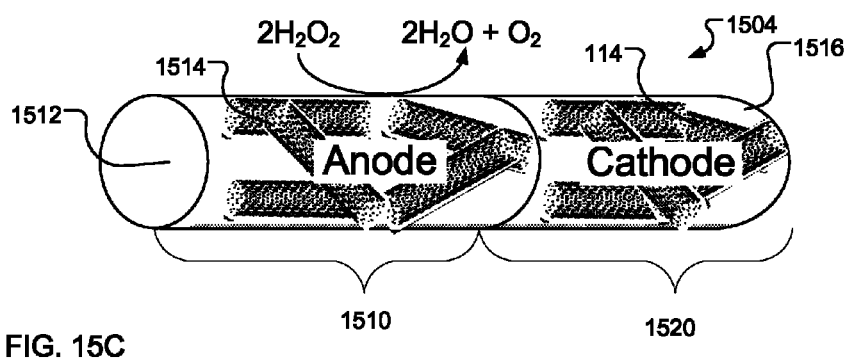

FIGS. 15A, 15B and 15C are block diagrams showing examples of a bimetal nanomachine 1500, 1502 and 1504. For example, in FIG. 15A, the nanomachine 1500 can be implemented as a bimetal nanowire that includes an anode component 1510 connected to a cathode component 1520. The anode component 1510 can include one or more oxidizing catalysts 1512, such as platinum (Pt), silver (Ag), palladium (Pd), nickel (Ni) other transition metal or a combination of them. For example, Pt, Ag and Pd are known catalysts for peroxide decomposition.

In addition, one or more non-metallic catalysts 1514 can be incorporated into the anode component 1510. The non-metallic catalysts 1514 include graphite or carbon-based catalysts such as carbon-nanotubes (CNTs), a fullerene ($C_{60}$) structures or graphite structures with edge-plane-like defects. Carbon and graphite, in various forms, can be an attractive electrode material. The surface structure of carbon-based can affect the electrochemical and chemical reactivity of electrodes based on these materials. In particular, the catalytic activity, electron transfer and chemical reactivity of graphitic carbon electrodes may be attributable to the surface defect sites, and in particular edge-plane-like defect sites. Fullerenes are a family of carbon allotropes, molecules composed entirely of carbon, in the form of a hollow sphere, ellipsoid, tube, or plane. The non-metallic catalyst can be incorporated within the anode component 1510 by combining CNTs with Pt 1512, for example. The non-metallic catalyst 1514 should be incorporated into the anode component 1510, as shown in FIG. 15A, to expose at least a portion of the non-metallic catalysts to an environment external to the surface of the anode component 1510. Alternatively, the non-metallic catalyst 1514 can be incorporated on the external surface of the anode component 1510. Further, the non-metallic catalyst can be incorporated both within the anode component 1510 and on the external surface of the anode component 1510. The cathode component 1520 can include one or more reduction catalyst or electron acceptor 1516, such as gold (Au) that catalytically reduces peroxide and oxygen. In some implementations, the non-metallic catalyst 1514 can be incorporated into the cathode component 1520. For example, CNTs can be combined with Au in the cathode component 1520. As described above, the CNTs incorporated into the cathode must be at least partially exposed to the environment external to the cathode component 1520. Alternatively, the non-metallic catalyst can be applied on the external surface of the cathode component. Further, the non-metallic catalyst 1514 can be incorporated both within the cathode component 1520 and on the external surface of the cathode component 1520. In some implementation, the non-metallic catalyst can be incorporated within (and/or on external surface) of both the anode 1510 and cathode components 1520.

The CNTs 1514 can be implemented as purified multi-walled carbon-nanotubes (from NanoLab of Newton, Mass., for example). In brief, CNTs are dispersed in a concentration of nitric acid and sonicated. For example, 100 milligram (mg) of CNTs can be dispersed in 100 milliliter (ml) of concentrated nitric acid and sonicated at 60° C. for 90 min. The CNT-nitric acid solution is then incubated at a select temperature for a select period of time. For example, the CNT-nitric acid solution can be incubated at 60° C. overnight. Following the acid treatment and sonication, the CNT suspension is centrifuged (at 3000 rpm for 30 min, for example) to separate the CNTs from the acid solution. The acid treated CNTs are washed repeatedly with nanopure water (18.2 MΩ, for example) until the solution pH reaches near neutral state. The purified CNTs are dried (at 60° C., for example) until a constant mass is obtained. All CNT containing solutions are sonicated (for 2 hours, for example) prior to use.

The bi-segment or bimetal nanomotors 1500, 1502 and 1504 can be prepared by electrodepositing the corresponding metals or hybrid metal-CNT into a porous alumina membrane template (from Whatman of Maidstone, U.K.). The length (~1 µm) of each nanomotor component (anode and cathode) can be selected by controlling the electrodeposition charge. The diameter (~220 nm) of each nanomotor component was predetermined by the pore size of the membrane.

To generate the cathode component 1520, a thin gold film is first sputtered on the branched side of the membrane to serve as a working electrode. The membrane is assembled in a plating cell with aluminum foil serving as an electrical contact for the subsequent electrodeposition. In order to synthesize well-shaped cylindrical nanomotors, a sacrificial silver layer is electrodeposited into the branched area (~1-2 µm thickness) of the membrane using a silver plating solution (1025 RTU@4.5 Troy/Gallon; Technic Inc., Anaheim, Calif.) and a total charge of 2 coulombs (C) at −0.9 V (vs. Ag/AgCl, in connection to a Pt wire counter electrode). This is followed by an electrodeposition of Au (1.5 C) from a gold plating solution (Orotemp 24 RTU RACK; Technic Inc.) at −0.9 V (vs. Ag/AgCl). Subsequently, platinum or platinum-CNT are deposited galvanostatically at −2 mA for 50 min from a platinum plating solution (Platinum RTP; Technic Inc.) or using a platinum plating solution containing various amounts (0.25-1.00 mg/ml) of CNT, along with 0.1 wt % Nafion and 2 mM 4-nitrobenzenediazonium tetrafluoroborate (NBD), respectively.

Such protocol to generate the Pt-CNT structure ensures uniform dispersion of CNT in the plating solution and hence a homogeneous loading of CNT within the Pt anode component 1510. This synthesis process results in bi-segment nanomotors with each component 1510, 1520 having a select length of approximately 1 μm for example.

To generate a control nanowire structure without the carbon-nanotubes 1514, Au/Pt—$Fe_3O_4$ nanowires can be prepared by depositing the Pt—$Fe_3O_4$ component galvanostatically using the same conditions as for the Pt and Pt-CNT components from a platinum plating solution containing a suspension of $Fe_3O_4$—$(C_9H_{19}COOH)_2$ nanoparticles (0.5 mg/ml). The bilayer surfactant-coated iron oxide [$Fe_3O_4$—$(C_9H_{19}COOH)_2$] nanoparticles are synthesized by washing the nanoparticles thoroughly with deionized water and dried at 100° C. Nickel-containing nanomotors (Au/Ni/Au/Pt and Au/Ni/Au/Pt-CNT) are synthesized for the magnetically controlled experiments described below. Following the plating of the first gold segment (0.75 C), nickel is electrodeposited from a nickel plating solution [20 g L−1 $NiCl_2.6H_2O$, 515 g L−1 $Ni(H_2NSO_3)_2.4H_2O$, and 20 g L−1 $H_3BO_3$ (buffered to pH 3.4)] at −1.0 V (vs. Ag/AgCl). A total charge of 0.5 C and 2.0 C are used for plating nickel for the 'racing' nanomotors (of FIG. 5) and the speed-controlled nanomotors (of FIG. 4), respectively.

The second gold component (0.75° C.) is then deposited, followed by the growth of the Pt or Pt-CNT component, as previously described. After depositing the nanomotors, the membrane is removed from the plating cell and rinsed thoroughly with nanopure water to remove all residues. The sputtered gold layer and the silver layer are simultaneously removed by mechanical polishing using cotton tip applicators soaked with 35% HNO3 for ca. 5 min to ensure complete silver dissolution. The bi-component nanowires are then released by immersing the membrane in 3 M NaOH for 30 min.

These nanowires are collected by centrifugation at 10,000 rpm for 5 min and washed repeatedly with nanopure water (18.2 MΩ) until a neutral pH is achieved. Between washing steps the nanowire solution is mixed and briefly sonicated (several seconds) to ensure the complete dispersion of nanowires in the washing water and hence the removal of salt residuals entrapped in the nanowire aggregate after centrifugation. Special attention is paid to the nanowires being washed directly before testing and suspended in freshly obtained nanopure water due to significant deceleration of the nanomotors speed in the presence of salt ions. All nanomotor solutions are stored in nanopure water at room temperature and their speed tested within a day of synthesis. The nanowires can be characterized using an FEI XL30 scanning electron microscope (SEM; from FEI Co., Hillsboro, Oreg.). The SEM is used to determine the length of each segment of the nanomotors.

The CNT incorporated nanomotors 1500, 1502 and 1504 are designed to move in the presence of aqueous fuel solution that includes one or more redox species or substances that undergo redox reactions. The redox species or substances can include hydrogen peroxide ($H_2O_2$) based fuels, hydrazine based fuels, etc. In some implementations, the fuel solution can include various precursors to the redox species, such as glucose or sucrose. In particular, the environment in vivo includes glucose, sucrose and other biological substances that can be converted to $H_2O_2$ in presence of other substances such as enzymes. For example, glucose can be converted to $H_2O_2$ in the presence of glucose oxidase enzyme. In such implementations, the enzyme and the precursor substance can be found in the biological system. Alternatively, the enzyme can be incorporated onto the surface of the anode component 1660 or cathode component to promote conversion of glucose into $H_2O_2$.

The CNT incorporated nanomotor catalyzes the $H_2O_2$ based fuel to generate water and oxygen, for example. This $H_2O_2$ based fuel can also include a second redox specie or substance such as hydrazine to provide a synergistic increase of the speed of the nanomotor. The resulting Au/Pt-CNT nanowires 1500, 1502 and 1504 can achieve average velocities of 94 μm/s with some nanowires traveling at speeds faster than 200 μm/s (equivalent to 100 body-lengths/second). This is several magnitudes faster than the speed achieved by CNT-free nanomachines. Further, the CNT incorporated nanowires can surpass speeds of most biological motors. The ultrafast motion of Au/Pt-CNT nanowires reflects the enhanced catalytic decomposition of the peroxide fuel on the Pt-CNT end.

Figure 16:
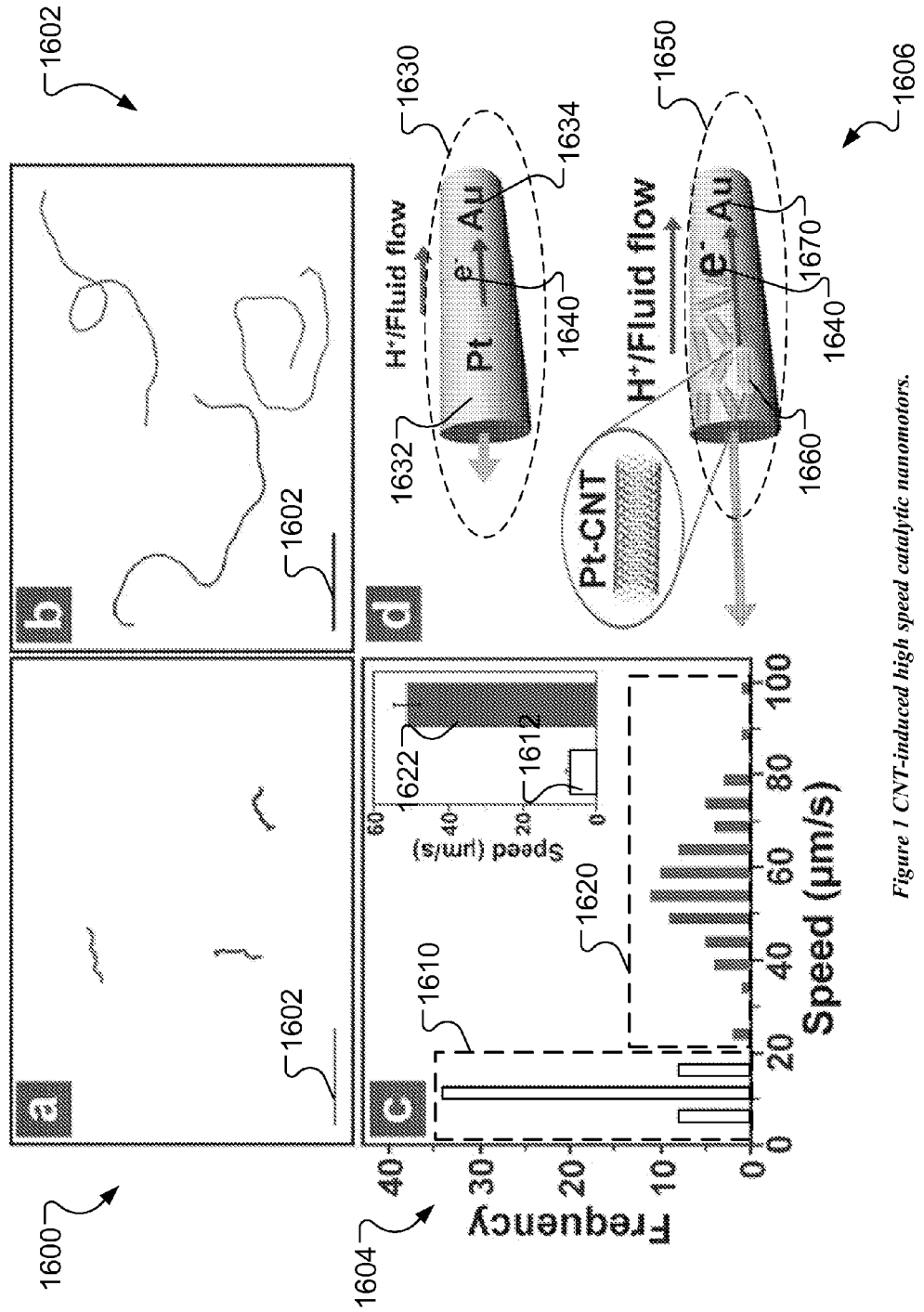
FIG. 16 shows example effect of CNT incorporation in an anode component of a nanowire.

FIG. 16 shows example effect of CNT incorporation in an anode component of a nanowire. The top left inset (a) 1600 shows traces that represent movement of three Au/Pt nanomotors. The top right inset (b) 1602 shows traces that represent movement of three Au/Pt-CNT nanomotors. The traces shown in (a) 1600 and (b) 1602 are taken from videos of the nanowires in the presence of 15 wt % aqueous $H_2O_2$ fuel over a 4 second period. The scale bar 202 is 45 μm.

The Au/Pt-CNT nanowires travel substantially longer distances (>7-fold) over the same time period as the Au/Pt nanowires. The average distance traveled for the Au/Pt-CNT nanowires is 204 μm. The average distance traveled for the Au/Pt nanowires is 29 μm. The increase in total distance traveled for the Au/Pt-CNT wires present substantial speed acceleration associated with the presence of CNT in the Pt anode component 1660. The motions of both Au/Pt-CNT and Au/Pt nanomotors are directional with the Pt or Pt-CNT side moving forward.

The lower left panel (c) 1604 of FIG. 16 shows a histogram representation of the speed distributions 1610, 1620 for the Au/Pt and Au/Pt-CNT nanowires respectively. A nearly Gaussian speed distribution is observed for both types of motors. The speed distributions 1610, 1620 are obtained from n=50 measurements of the movement of the nanomotors in a 15 wt % hydrogen-peroxide fuel over a 10 second period. In addition, mean average speeds 1612, 1622 of 7.2 μm/s and 51.0 μm/s are shown for Au/Pt and Au/Pt-CNT nanowires in the inset bar graph. The bar graphs with Y error bars (inset) represent the mean of average speeds (μm/s) and the error limit at 90% confidence interval of the corresponding nanomotors, respectively.

The right lower panel (d) 1606 shows a schematic representation of the two self-electrophoresis mechanisms of Au/Pt 1630 and Au/Pt-CNT 1650 bipolar nanomotors. The schematic representation of the Au/Pt 1630 and Au/Pt-CNT 1650 nanomotors illustrate the enhanced electron transfer and speed vectors associated with the presence of CNT in the Pt segment. The self-electrophoresis mechanism provides a good approximation of the axial autonomous movement of Au/Pt bimetallic nanomotors moving with the Pt side first. Hydrogen peroxide fuel is preferentially consumed/oxidized on the Pt 1632 or Pt-CNT 1660 ends while oxygen is catalytically reduced on the Au 1634, 1670 component. When the nanomotors are immersed in the aqueous $H_2O_2$ fuel solution these simultaneous reactions cause the nanomotors 1650, 1630 to act as galvanic cells with electrons transferring inside the nanomotors 1650, 1630 from the Pt (anodic) end to the Au (cathodic) end. The flux of electrons 1640 inside the nanomotors proceeds from one end to the other (i.e., from the anode to the cathode) generating a local electric field. The internal flux is balanced by an equal and opposite external flux of protons in the electrical double layer (EDL) surrounding the outside of the nanomotors 1650, 1630. This proton flux pushes against the surrounding fluid and results in the directional movement of the nanomotors 1650, 1630 in the opposite direction. The speed and direction of the movement of nanomotors are strongly dependent upon the potential of the galvanic reaction. Metal pairs that have greater potential differences (due to redox reactions in the peroxide fuel) create a larger flux of electrons and hence a faster nanomotor speed. The higher electrocatalytic activity of Pt-CNT compared with Pt provides a faster reaction rate, and hence a higher proton and fluid flow corresponding to an increased flux of electrons inside the nanomotors as indicated by the vectors.

CNTs possess attractive mechanical and electronic properties. These properties include enhanced electrocatalytic activity, accelerated electron-transfer reactions and lower overvoltages for several molecules including hydrogen peroxide. The coupling of CNT with Pt surfaces provides further improvements in the electron-transfer processes of hydrogen peroxide and oxygen in connection to various biosensing and fuel-cell applications. The enhanced electrochemical reactivity of CNT may reflect edge-plane effects as well as contributions of peroxidase-like metal impurities such as $Fe_2O_3$, $Fe_3O_4$. CNT can enhance both the oxidation of $H_2O_2$ and reduction of $O_2$. Further, as shown with respect to FIGS. 14-15 below, open-circuit potential and Tafel-plot measurements show that the incorporation of CNT into the oxidative Pt side of the nanomotor 1650 results in an unexpected synergistic effect upon the net oxidation of $H_2O_2$.

Figure 17:
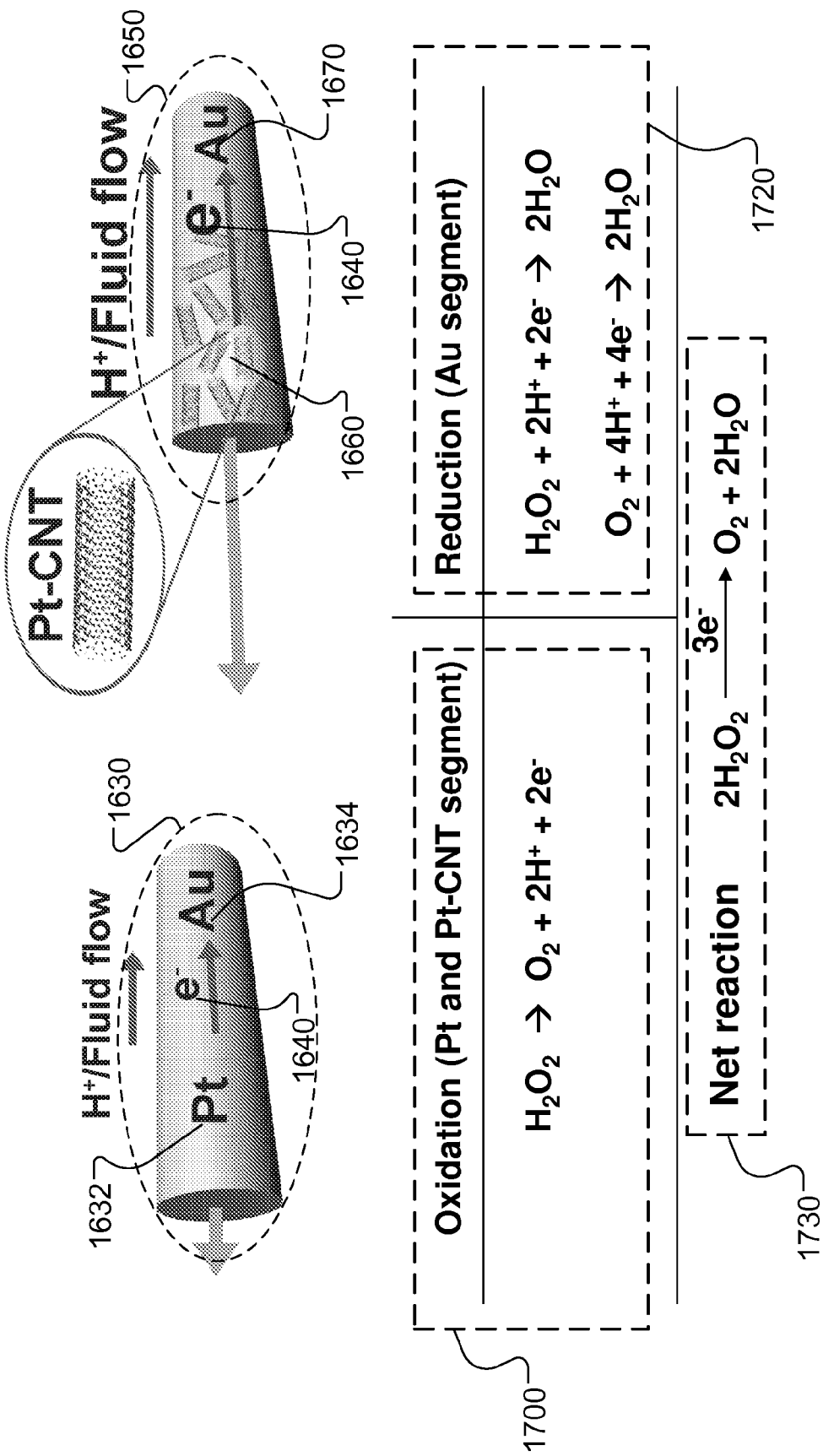
FIG. 17 shows example oxidation and reduction processes for the nanomotors.

FIG. 17 shows example oxidation and reduction processes for the nanomotors. The oxidation process 1710 for the Pt 1632 and Pt-CNT 1660 components shows decomposition of $H_2O_2$ into one molecule of oxygen, two molecules of hydrogen and two electrons. The reduction 1720 process for the Au components 1634, 1670 shows production of two water molecules by combining one molecule $H_2O_2$ with two molecules of hydrogen and two electrons. Alternatively, one molecule of oxygen can be combined with 4 molecules of hydrogen and 4 electrons to produce two molecules of water. The net reaction 1730 of the oxidation 1710/reduction 1720 processes includes production of one molecule of oxygen and 2 water molecules from 2 molecules of $H_2O_2$ (and transfer of 3 electrons.)

Figure 18:
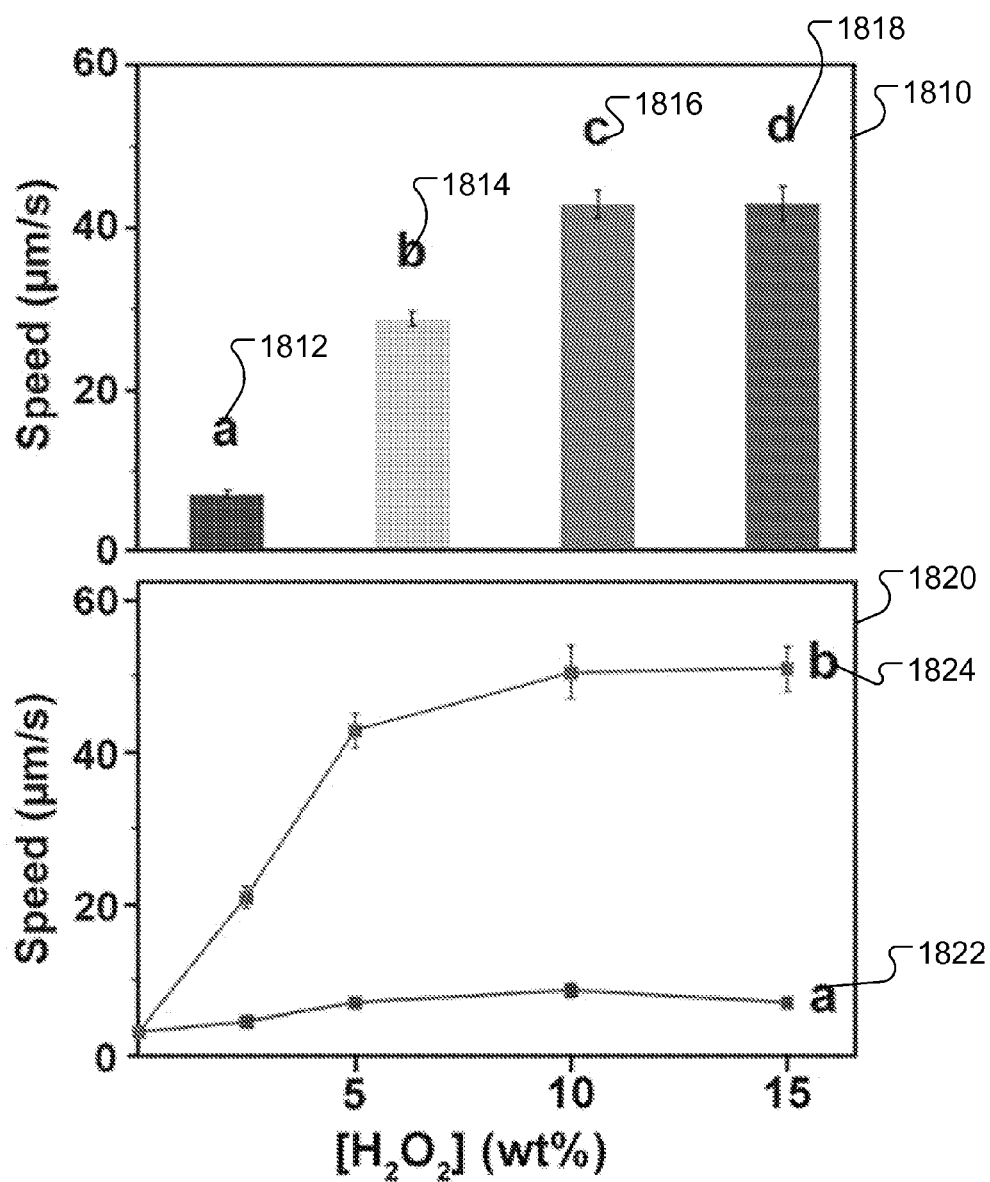
FIG. 18 shows example effects of the CNT loading and of the hydrogen peroxide fuel concentration upon the speed of catalytic nanomotors.

FIG. 18 shows example effects of the CNT loading 1810 and of the hydrogen peroxide fuel concentration 1820 upon the speed of catalytic nanomotors 1650, 1630. The bar graphs 1812, 1814, 1816 and 1818 represent the average speed of Au/Pt-CNT nanomotors 1650 in 5 wt % hydrogen peroxide as a function of the CNT loading of 0, 0.25, 0.50 and 1.00 mg/ml in the Pt plating solution respectively. The average speed 1812 of the Au/Pt nanomotor can be used as a standard value to compare the effect of the CNT loading. Y error bars show the error limit at a 90% confidence interval.

The amount of CNT loaded into the oxidative platinum end 1660 has a profound effect upon the speed of the catalytic nanomotors. The average speed (in 5 wt % $H_2O_2$) increases dramatically from 7.2 μm/s (1812) to 28.7 μm/s (1814) and 42.8 μm/s (1816) upon raising the CNT loading in the Pt-plating solution from 0 to 0.25 and 0.50 mg/ml, respectively. Higher CNT concentrations [e.g., 1.00 mg/ml (1818)] do not offer additional speed enhancement. Such high CNT loading is also more difficult to reproduce due to incomplete suspension and aggregation of CNT in the growth solution that affect the CNT loading within the Pt component 1660 during the electrodeposition.

To eliminate the possibility that factors other than the addition of CNT induced the enhanced electron transfer, various control experiments are conducted. For example, because a Nafion-NBD solution is used to disperse the CNT, the role of Nafion-NBD (in the plating solution) in the absence of CNT can be examined. Only a slight speed enhancement (from 7.2 to 12.5 μm/s) is observed in the presence of Nafion-NBD (using 5 wt % $H_2O_2$). In contrast, the speed increased from 7.2 to 42.8 μm/s in the presence of Nafion-NBD-CNT (0.5 mg/ml).

In addition, the role of $Fe_3O_4$ nanoparticles (often present as impurities in CNT) and their codeposition with Pt (at 0.50 mg/ml loading) can be obtained on the motion of the nanomotor 1650. The average velocity of the resulting Au/Pt—$Fe_3O_4$ nanomotors in 5 wt % hydrogen peroxide is 12.9 μm/s. This is slightly higher than that of Au/Pt nanomotors 1630 but substantially smaller when compared to Au/Pt-CNT nanomotors 1650 (42.8 μm/s; not shown). Thus, both Nafion-NBD and $Fe_3O_4$ have minimal effect upon the speed of the Au/Pt nanomotors 1630, and that the observed acceleration can be almost entirely attributed to the presence of CNT.

In the lower panel of FIG. 18, the effect of hydrogen peroxide fuel concentration 1820 is shown. The average speed 1822 and 1824 of the Au/Pt and Au/Pt-CNT nanomotors 1630 and 1650 respectively are dependent upon the hydrogen peroxide concentration. A CNT loading of 0.50 mg/ml is used to prepare the Pt-CNT component 1660. Y error bars show the error limit at a 90% confidence interval.

The ratio of chemical power input (fuel consumption) to mechanical power output defines the energy conversion efficiency of the catalytic engine. The chemical power input is realized by determining the rate of the hydrogen peroxide decomposition times the free energy of the reaction. This decomposition rate can be determined by measuring the oxygen generation rate or by measuring the electron transfer rate on the catalytic end in hydrogen peroxide fuel. The relative input power can then be calculated by the multiplying of the electron transfer rate with the free energy of the reaction. For a moving object in a surrounding liquid, the output power is the product of drag force overcome (Stokes's drag) and the velocity of the object. Based on these considerations, the energy conversion of Au/Pt-CNT nanomotors is over 8 times more efficient than that of Au/Pt nanomotors in 5 wt % $H_2O_2$ fuel.

The concentration of the hydrogen peroxide fuel influences the velocity of the catalytic nanomotors 1820. The average speed of the Au/Pt nanowires increases from 3.3 μm/s (in pure water) to 8.8 μm/s upon raising the $H_2O_2$ concentration to 10 wt % and decreases slightly at 15 wt % 422. In contrast, the average speed of the Au/Pt-CNT nanomotors increases rapidly from 3.3 to 42.8 μm/s upon raising the peroxide level to 5 wt % and then more slowly, reaching their highest speed of 51.0 μm/s at 15 wt % 424. Increasing the peroxide concentration from 0 to 15 wt % results in 2 and 15-fold acceleration of the Au/Pt 1630 and Au/Pt-CNT 1650 nanomotors, respectively. The increased speed of the Au/Pt-CNT nanomotors 1650 over the entire range (0-15 wt %) of $H_2O_2$ fuel indicates a substantial enhancement of the fuel consumption rate and reflects the high electrocatalytic activity of CNT toward $H_2O_2$ oxidation. The dependence of the speed of the Au/Pt-CNT nanowires upon the fuel concentration can form the basis for chemical sensing applications of catalytic nanomotors and for creating speed-controlled traffic zones.

Figure 20:
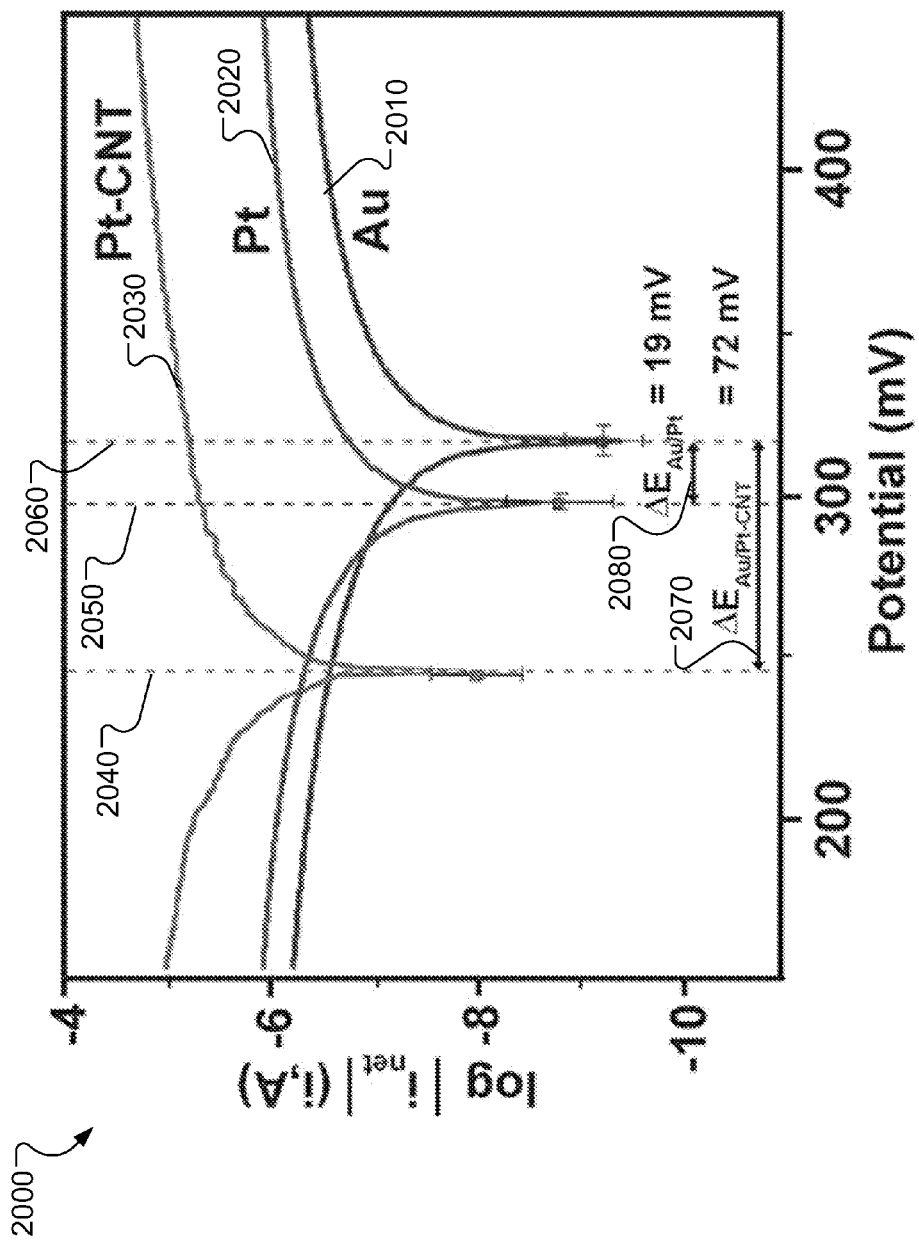
FIG. 20 shows an example summary of the mixed potential, open circuit voltage and exchange current density obtained from the electrochemical potential measurements.

FIG. 19 displays a table 1900 of Tafel plots for Au, Pt and Pt-CNT electrodes in a 5 wt % $H_2O_2$ solution. FIG. 20 shows examples of Tafel plots 2000. Dots below each Tafel plot denote the average of the mixed potential and log lined obtained from repeated scans, respectively. X and Y error bars represent the standard deviation. Differences in the mixed potentials are indicated as ΔEAu/Pt and ΔEAu/Pt-CNT. The speed of bimetallic nanowire motors 1650, 1630 is proportional to the mixed potential difference (ΔE) of the fuel at the corresponding metal segments. The ΔE can be obtained from the Tafel plots of the anodic and cathodic reactions on the corresponding electrode materials. Considering the self-electrophoresis mechanism, each metal component 1660, 1670 behaves as an electrode (anode or cathode) in the galvanic cell. Tafel plots for Au 2010, Pt 520 and Pt-CNT 2030 electrodes are obtained by plotting log $|i_{net}|$ vs. potential. The mixed potentials (dotted lines) 2040, 2050, 2060 represent the potentials at which the net current ($i_{net}$) is zero. In the case of nanomotors 1650, 1630 the redox reactive metals are connected, therefore the difference 2070, 2080 between the mixed potentials of the two metals determines the strength of the locally generated electric field and hence the rate of electron transfer and speed of the nanomotors 1630, 1650. When CNTs or other non-metallic catalysts are incorporated into the cathode component 1670, the mixed potential for Au-CNT component may be shifted to the right of the mixed potential 2010. For such implementations, the $\Delta E_{Au\text{-}CNT/Pt}$ maybe calculated as a potential difference between the mixed potential 2050 and the new mixed potential for Au-CNT. When CNTs or other non-metallic catalyst are incorporated into both the cathode component 1670 and the anode component 1660, the $\Delta E_{Au\text{-}CNT/Pt\text{-}CNT}$ will be calculated as a potential difference between mixed potential 2040 and the new mixed potential for Au-CNT.

Tafel plots can be used to obtain the potential established at each nanomotor segment (Au 1670, 1634, Pt 1632 and Pt-CNT 1660) in a hydrogen peroxide environment. Tafel plots measures the mixed potential which represents an intermediate of equilibrium potentials of an electrode on which several reactions occur simultaneously. Gold, platinum and glassy carbon (GC) disk electrodes (diameter of 2, 2 and 3 mm, respectively) are obtained from CH Instrument Inc. (Austin, Tex.). Platinum-CNT 1660 was codeposited on the GC electrode from a platinum plating solution containing 0.5 mg/ml CNT using the same conditions as those used for growing the nanowires (with the exception of a 10 min deposition). Gold, platinum and platinum-CNT coated GC disk electrodes are used as the working electrode in the electrochemical potential measurements. Cyclic voltammetry of 5 wt % aqueous hydrogen peroxide (without any electrolyte) is performed using the CH Instrument Model CHI630C at a scan rate of 50 mV/s and over a potential range of 0.2 to 0.8 V (vs. Ag/AgCl, 3 M KCl reference), along with a glassy carbon counter electrode. A summation of the anodic ($i_a$) and cathodic ($i_c$) currents at each applied potential is calculated, resulting in the net current ($i_{net}$). The mixed potential, at which the anodic and cathodic currents are equal (i.e., zero net current), is obtained by extrapolating the linear Tafel regime of the plot of log $|i_{net}|$ versus potential.

Referring back to FIG. 19, the table in FIG. 19 shows an example summary of the mixed potential, open circuit voltage and exchange current density obtained from the electrochemical potential measurements. The mixed potential is defined as potential at which the net current is zero. The open circuit voltage is reported with respect to Ag/AgCl (3 M KCl) reference electrode.

Open circuit potentials measure the electrode potential with respect to an Ag/AgCl (3 M KCl) reference electrode at zero current, which is the open circuit voltage (OCV). Zero-current potentiometry is performed using 5 wt % $H_2O_2$ as a liquid conductor. The stabilizing potential is identified as the electrode potential (vs. Ag/AgCl, 3 M KCl) in the presence of 5 wt % H2O2.

Gold has a positive mixed potential of 19 mV with respect to Pt ($\Delta E_{Au/Pt}$) in 5 wt % $H_2O_2$, while the Au and Pt-CNT electrodes display a much larger mixed potential difference of +72 mV ($\Delta E_{Au/Pt\text{-}CNT}$). The increased speed acceleration of the Au/Pt-CNT nanomotors 1650 reflects this significantly larger ΔE of the Au and Pt-CNT electrode system. Cathodic reactions are thus expected to occur on the Au end, while anodic reactions proceed on either the Pt or Pt-CNT end of nanomotors. Since the Pt-CNT electrode has a lower mixed potential (244 mV) compared to the Pt one (297 mV), $H_2O_2$ is more easily oxidized at the Pt-CNT segment 1660, leading to a faster reaction rate and an increased electron transfer inside the nanomotors 1650. The Pt-CNT surface also has a larger current density ($4.71 \times 10^{-2}$ mA/cm2) compared to the Pt surface (1.05×10-2 mA/cm2), reflecting its enhanced electron-transfer process.

To provide additional synergistic effect with the CNT incorporated nanowire, the fuel composition can be changed to add one or more additional component to $H_2O_2$. In particular, adding electron transfer enhancing agent such as hydrazine to the peroxide solution can greatly enhance the average speed of the Au/Pt-CNT nanowires to over 94 μm/s. The lifetime of the nanomotors in the aqueous $H_2O_2$ solution is greater than half an hour. During this period the Au/Pt-CNT nanomotors continue their movement without deceleration, traveling distances greater than 10 cm.

Figure 21:
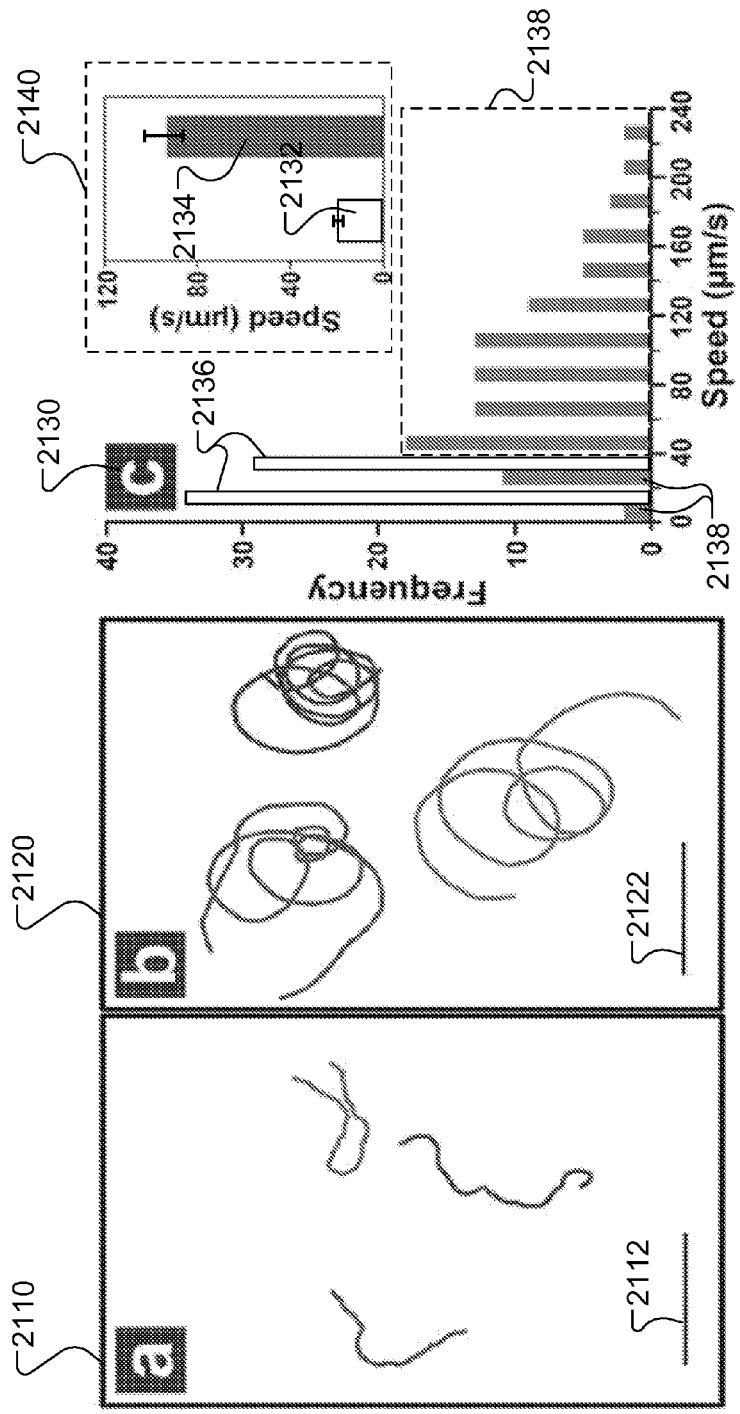
FIG. 21 also shows speed histograms of the Au/Pt-CNT nanomotors in the presence and absence of hydrazine (2.5 wt % hydrogen-peroxide fuel solution).

Changing the fuel composition through the addition of hydrazine to the peroxide solution leads to an unexpected speed acceleration of the Au/Pt-CNT nanowire motors 1650. For example, FIG. 21 illustrates example motion traces of 3 representative Au/Pt-CNT nanomotors 1650. The motion traces represent movements of Au/Pt-CNT (0.50 mg/ml) nanomotors 1650 in the presence of 2.5 wt % $H_2O_2$ 2110 and in a 2.5 wt % $H_2O_2$ solution containing 0.15 wt % hydrazine 2120. The Au/Pt-CNT nanomotors 1650 travel, during a 4 second period, substantially longer distances in the presence of hydrazine. The average distance traveled in the presence of hydrazine is 373 μm versus 77 μm without the hydrazine. The difference in the distance traveled reflects their faster movement in the mixed fuel solution. The traveling routes of Au/Pt-CNT nanomotors 1650 in this hydrazine added fuel appear to be mostly circular in nature with varying radii. Scale bars 2112, 2122 represent 50 μm.

FIG. 21 also shows speed histograms 2130 of the Au/Pt-CNT nanomotors in the presence 2136 and absence 2138 of hydrazine (2.5 wt % hydrogen-peroxide fuel solution). The histograms 2130 are measured from the movement of the Au/Pt-CNT nanomotors over a 10 second period. About 4% of the Au/Pt-CNT nanowires 1650 can achieve speeds higher than 200 μm/s in the mixed $H_2O_2$-hydrazine medium. This corresponds to over 1650 body-lengths/second and exceeds the velocity of most biomotors. The unexpected increase of speed in the mixed fuel can be attributed to a hydrazine-induced enhancement of the catalytic reductions of both oxygen and hydrogen peroxide at the cathodic gold component 120. In addition, the efficient catalytic decomposition of hydrazine in the presence of a catalytic carbon surface and hydrogen peroxide can contribute to the unexpected increase of speed.

The inset 2140 of FIG. 21 shows the resulting average speeds of 19.4 μm/s 2132 and 93.3 μm/s 2134 in the peroxide and peroxide-hydrazine media, respectively. The former is in good agreement with the speed of CNT-loaded nanomotors in 2.5% hydrogen peroxide as shown in FIG. 21. The error limit for the average speeds shown is at 90% confidence interval of the corresponding nanomotors, respectively.

Additionally, FIG. 21 shows nanomotor movement traces from an example Nanomotor race. Optical images are superimposed with tracked lines 2110, 2120, 2130 and 2140 that represent the speeds of the Au/Ni/Au/Pt 2110, 2140 and Au/Ni/Au/Pt-CNT 2120, 2130 nanomotors under an applied (weak) magnetic field and 2.5 wt % hydrogen peroxide. In addition, the images 2130 and 2140 represent movements of Au/Ni/Au/Pt-CNT and Au/Ni/Au/Pt nanomotors respectively in the presence of 0.15 wt % hydrazine and 2.5 wt % hydrogen peroxide. Images 2110 and 2120 represent movements of Au/Ni/Au/Pt and Au/Ni/Au/Pt-CNT nanomotors in 2.5 wt % hydrogen peroxide without hydrazine. A CNT loading of 0.50 mg/ml was used to prepare the Pt-CNT segment 1660.

To control the direction of the nanowires, the nanowires of the nanomotor 1650 are implemented to include magnetic materials such as nickel. A weak magnetic field is generated to magnetically align the nickel-containing nanowires and enable 'racing' of different nanomotors in a straight line.

For example, the nanomotor suspension in nanopure water is first diluted to obtain a concentration of ~$2.6 \times 10^6$ nanomotors/ml. Ten µl of the diluted nanomotor suspension is then mixed with 10 µl of different concentrations (5-30 wt %) of the hydrogen peroxide fuel solution. This mixing results in a final nanomotor/aqueous hydrogen peroxide solution where both original constituents are diluted by half. In the case of the mixed fuel, a mixture containing 5.0 wt % hydrogen peroxide and 0.3 wt % hydrazine solutions is freshly prepared and mixed with the nanowire suspension using a 1:1 volume ratio. The final solution is then transferred via capillary action to a capillary microslide (0.1 mm thickness, 2 mm width and 50 mm length; VitroCom Inc., Mountain Lakes, N.J.).

The real-time movement of the nanomotors in the hydrogen peroxide solution is observed and recorded starting from a predetermined time (e.g., ~5 min) after the preparation of the final solution. The movement is recorded at a predetermined magnification (e.g., 200× total magnification) using an optical microscope (e.g., Nikon Instrument Inc., Eclipse80i, Melville, N.Y.) equipped with a camera (e.g., Photometrics CoolSnap CF camera from Roper Scientific, Duluth, Ga.) and tracking software (e.g., MetaMorph 7 software from Molecular Devices, Sunnyvale, Calif., USA).

Movies of the movements are captured for various periods of time using various frame rates. For example, movies can be acquired over 10 seconds at a frame rate of 10 frames/second. Multiple movies can be recorded along the length of the capillary microslide to ensure accurate population sampling. The speeds of the nanomotors are measured using tracking software, such as MetaMorph 7's tracking software which determines the position of each nanomotor in each frame, calculate the displacement distances between the frames, and in turn the average velocity of each nanomotor. For each type of nanomotor, more than 50 nanomotors are tracked to obtain a reliable average speed representative of the overall sample. In addition, the error limit of at least 90% confidence interval is achieved. Grubbs' test can be used to detect outliers in a data set at 95% confidence level ($\alpha=0.05$).

For the magnetically-aligned racing nanomotors, a 9.5 mm cube-shaped Neodymium (NdFeB) magnet (1.32 Tesla from K&J Magnetics Inc., Jamison, Pa., USA) is fixed to a custom magnet holder. The magnet is attached directly to the microscope condenser stage at 10 mm below from the microcapillary tube (containing the nanowires). The magnetic pole (from north to south) of the magnet is positioned perpendicular to the optical axis of the microscope. This position of the magnet can establish a weak parallel magnetic field on the microcapillary tube.

Figure 22:
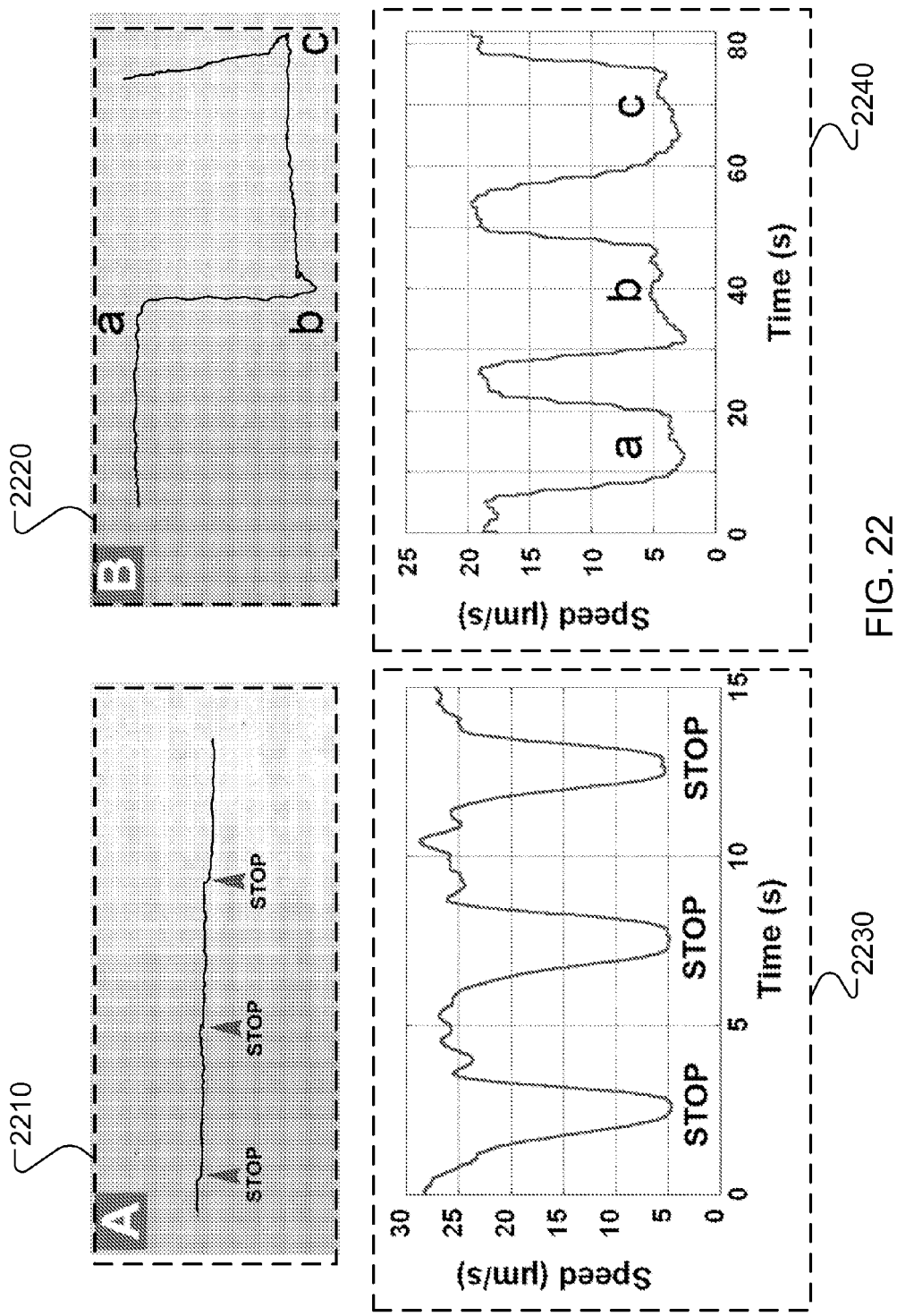
FIG. 22 shows examples of magnetically-triggered 'stop-and-go' and 'stop-turn-and-go' nanomotors.

FIG. 22 shows examples of magnetically-triggered 'stop-and-go' and 'stop-turn-and-go' nanomotors. The top left panel 2210 shows trace movement of a nanomotor with three stops in the movement. Corresponding to the movement trace is a graph 2230 that shows the speed (µm/s) of the nanomotors with corresponding three stops. The upper right panel 2220 shows a trace movement of a nanomotor with three stop-turn-and-go movements. The corresponding stop-turn-and-go movements are shown in the graph 2240 of the speeds of the nanomotor.

Figure 23:
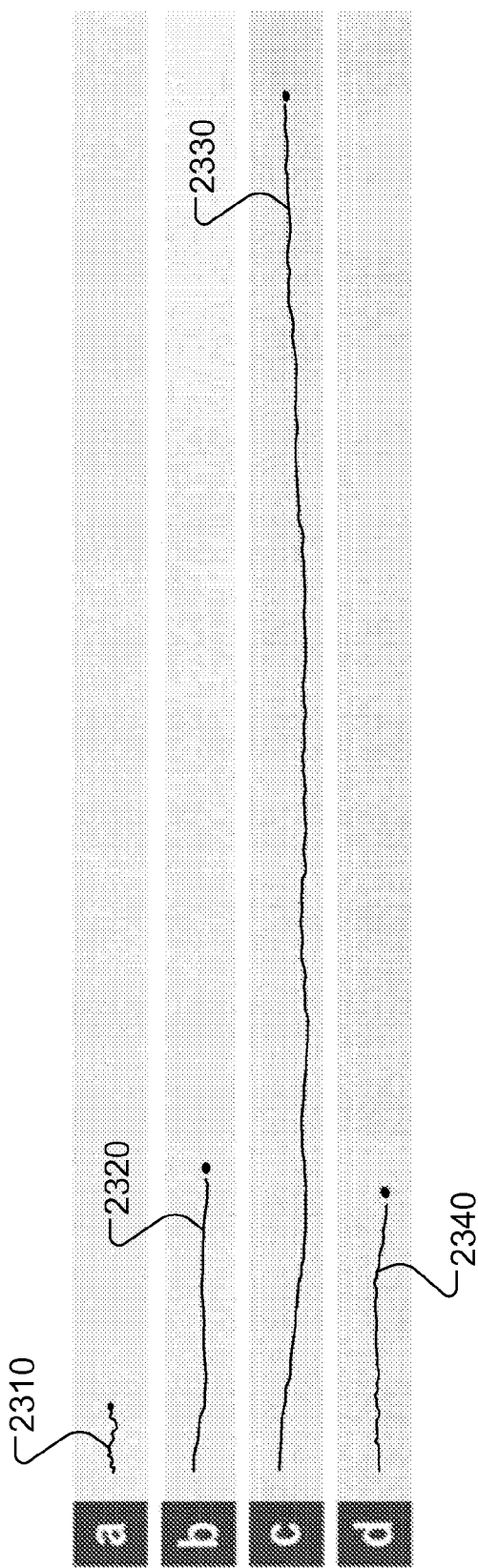
FIG. 23 shows a comparison of the displacement of different nanomotors in various fuels during a 4 second period.

FIG. 23 shows a comparison of the displacement of 4 nanomotors during a 4 second period. The captured images 2310, 2320, 2330, 2340 represent nanomotor movements of 4 nanowire/fuel compositions. Image 2310 shows movement of Au/Ni/Au/Pt nanomotor in 2.5 wt % H2O2. Image 2320 shows movement of Au/Ni/Au/Pt-CNT nanomotor in 2.5 wt % H2O2. Image 2330 shows movement of Au/Ni/Au/Pt-CNT nanomotor in a fuel mixture of H2O2 (2.5 wt %) and hydrazine (0.15 wt %). Image 2340 shows movement of Au/Ni/Au/Pt nanomotor in a fuel mixture of H2O2 (2.5 wt %) and hydrazine (0.15 wt %).

The images 2310, 2320, 2330 and 2340 are obtained from a video showing the corresponding real time side-by-side race between the Au/Ni/Au/Pt and Au/Ni/Au/Pt-CNT nanomotors in an aqueous H2O2 solution with and without hydrazine. Images 2310 and 2330 represent a remarkable ~20 fold speed acceleration from 5.0 to 94.0 µm/s by combining the effects of adding CNT to the motor and hydrazine to the fuel, respectively.

The Au/Ni/Au/Pt nanomotor shows a relatively short displacement of 72 µm 2340 in the hydrazine present mixed fuel. By comparison, the Au/Ni/Au/Pt-CNT nanomotor shows a 5-fold increased displacement of 376 µm 2330 in the same hydrazine present mixed fuel. This difference shows that the presence of CNT in the nanomotor can significantly contribute to the efficient conversion of the mixed fuel to mechanical energy.

The directionality of the nanomotors can be controlled using the weak magnetic field even at the very high speeds of the Au/Ni/Au/Pt-CNT nanomotor. Further increase in speed may be realized by fine tuning the concentration and ratio of the mixed fuel.

Such higher energy conversion of the mixed fuel to mechanical energy can be enumerated by comparing the output power of different nanomotors in different fuels. FIG. 24 is a table 2400 showing a summary of the output power ratio of Au/Ni/Au/Pt-CNT to Au/Ni/Au/Pt nanomotors in a $H_2O_2$ fuel or a mixture of $H_2O_2$ and hydrazine fuel. The ratio of the output power of Au/Ni/Au/Pt-CNT nanomotors to those of Au/Ni/Au/Pt nanomotors is shown in the same and in different fuels. In the 2.5 wt % H2O2 fuel, the output power of Au/Ni/Au/Pt-CNT nanomotors is about 12 times greater than that of Au/Ni/Au/Pt nanomotors (2320 vs. 2310.) The output power ratio of Au/Ni/Au/Pt-CNT to Au/Ni/Au/Pt nanomotors (2330 vs. 2340) is increased further to 27 in presence of the mixed fuel (2.5 wt % H2O2 and 0.15 wt % hydrazine). When CNT is added to the nanowire and hydrazine is added to the $H_2O_2$ fuel, the nanomotor system 100 exhibits an outstanding performance that is over 350 times more powerful than that of common Au/Ni/Au/Pt nanomotors in H2O2 fuel (2330 vs. 2310). The output power ratio is calculated using Equation (1)

$$\frac{P_{o1}}{P_{o2}} = \frac{\left[\frac{2\pi\mu L}{\ln(2L/R) - 0.72}\right]v_1 \cdot v_1}{\left[\frac{2\pi\mu L}{\ln(2L/R) - 0.72}\right]v_2 \cdot v_2} = \left[\frac{v_1}{v_2}\right]^2 \quad (1)$$

$P_{O1}$=output power of Au/Ni/Au/Pt-CNT nanomotors
$P_{O2}$=output power of Au/Ni/Au/Pt nanomotors
L=length of the nanomotor
R=Stokes radius of the nanomotor
μ=standard gravitational parameter=mg
$v_1$=velocity of Au/Ni/Au/Pt-CNT 1
$v_2$=velocity of Au/Ni/Au/Pt 2

In particular, the output power ratio is calculated from the output power of nanomotor-fuel system 1 to those of nanomotor-fuel system 2. As shown in Equation (2), output power ($P_O$) is the product of the nanomotor velocity (v) and drag force ($F_{drag}$) generated as the nanomotors move through the fuel solution.

$$P_o = F_{drag} \cdot v = \left[\frac{2\pi\mu L}{\ln(2L/R) - 0.72}\right]v \cdot v \quad (2)$$

L=length of the nanomotor (m)
R=Stokes radius of the nanomotor (m)
μ=fluid viscosity (Pa s)
v=speed (m/s)

The input power $P_I$ can be calculated using equating (3).

$$P_I = k \cdot I \cdot \Delta E \quad (3)$$

k=arbitrary constant representing oxygen consumption rate (mol/s)
I=current
ΔE=free energy change of reaction (J/mol)

Figure 25:
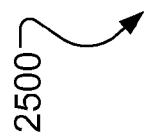
FIG. 25 shows example summary of the output power ratio of Au/Pt-CNT to Au/Pt nanomotors in a $H_2O_2$ fuel or a fuel mixture of $H_2O_2$ and hydrazine.

FIG. 25 is a table 2500 showing an example summary of the output power ratio of Au/Pt-CNT to Au/Pt nanomotors in a $H_2O_2$ fuel or a fuel mixture of $H_2O_2$ and hydrazine. Output power 1 ($P_{O1}$) represents the output power for the Au/Pt-CNT nanomotors. Output power 2 ($P_{O2}$) represents the output power for the Au/Pt nanomotors. Power ratio ($P_{O1}/P_{O2}$) can be calculated using Equation (1) above. In addition, the Efficiency ratio can be calculated using Equation (4).

$$\frac{Efficiency_1}{Efficiency_2} = \frac{\frac{P_{I1}}{P_{O1}}}{\frac{P_{I2}}{P_{O2}}} = \frac{\frac{k \cdot I_1 \Delta E}{\left[\frac{2\pi\mu L}{\ln(2L/R) - 0.72}\right]v_1^2}}{\frac{k \cdot I_1 \Delta E}{\left[\frac{2\pi\mu L}{\ln(2L/R) - 0.72}\right]v_2^2}} = \frac{I_1}{I_2} \cdot \left[\frac{v_2}{v_1}\right]^2 \quad (4)$$

Efficiency can be calculated using Equation (5).

$$Efficiency = \frac{P_I}{P_O} = \frac{k \cdot I_1 \Delta E}{\left[\frac{2\pi\mu L}{\ln(2L/R) - 0.72}\right]v^2} \quad (5)$$

As described with respect to FIGS. 10-25 above, a dramatic acceleration has been described for the self-powered bimetal nanomotors 1650 based on the incorporation of CNT into the Pt component of Au/Pt nanowires. Such CNT-induced acceleration of catalytic nanomotors reflects the enhanced oxidation of the hydrogen peroxide fuel. The accelerated speed can be further enhanced by adding hydrazine to the peroxide fuel. Also, the efficient movement of the CNT and hydrazine induced acceleration can be manipulated using magnetic fields.

Figure 26:
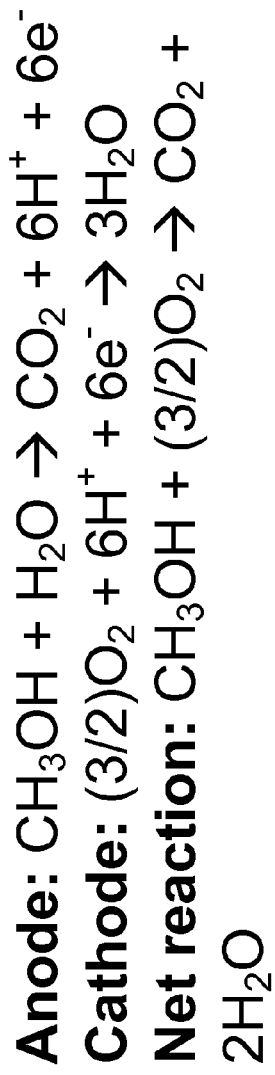
FIG. 26 shows the redox reactions for methanol.

In some implementations, alternative fuels and mixed fuels can be implemented to obtain the accelerated movement of the nanomotors and energy-rich chemical reactions. For example, self-decomposing fuels, such as hydrogen peroxide can be implemented. Also, substrates of a spontaneous redox reaction such as those that provide a negative $\Delta G^0$/free energy difference can be implemented. In addition, hypergolic propellant, such as fuels and oxidizers that ignite spontaneously on contact with each other, i.e. hydrogen peroxide (oxidizer) and hydrazine (fuel) can be implemented. Also, fuel cells such as methanol ($CH_3OH$) can be implemented. FIG. 26 shows the redox reactions 2600 for methanol. FIG. 27 is a table 2700 of reactions showing example free energy changes of biological redox reactions. The various redox reactions shown in FIG. 27 represent various fuel choices that can be used for the nanomotors.

In some implementations, compositions of the nanomotor can be modified to obtain the accelerated movement of the nanomotors and energy-rich chemical reactions. For example, a similar acceleration can be obtained by doping the CNT into a palladium (Pd) anodic component in stead of a platinum component. FIG. 28 includes diagrams and images 2800 showing examples of accelerated motions of CNT-doped palladium component of Pd—Au nanomotors. A nanomotor is implemented with an Au-based cathode component and a Pd-based anodic component. CNT is doped into the Pd component. The top left panel 2810 shows that average speed of Au/Pd nanomotors in 5 wt % $H_2O_2$ is calculated to be approximately 17.45 μm/s. The average speed of Au/Pd-CNT (0.5 mg/ml) nanomotors in 5 wt % $H_2O_2$ is calculated to be approximately 40.34 μm/s. In addition, the speed histograms 2820 of the Au/Pd and Au/Pd-CNT (0.5 mg/ml) nanomotors show that the Au/Pd-CNT nanomotors can achieve speeds faster than 20 μm/s at a higher frequency than the Au/Pd nanomotors. Images 2830 and 2840 of the Au/Pd and Au/Pd-CNT nanomotors are shown in the lower left panel.

Figure 29:
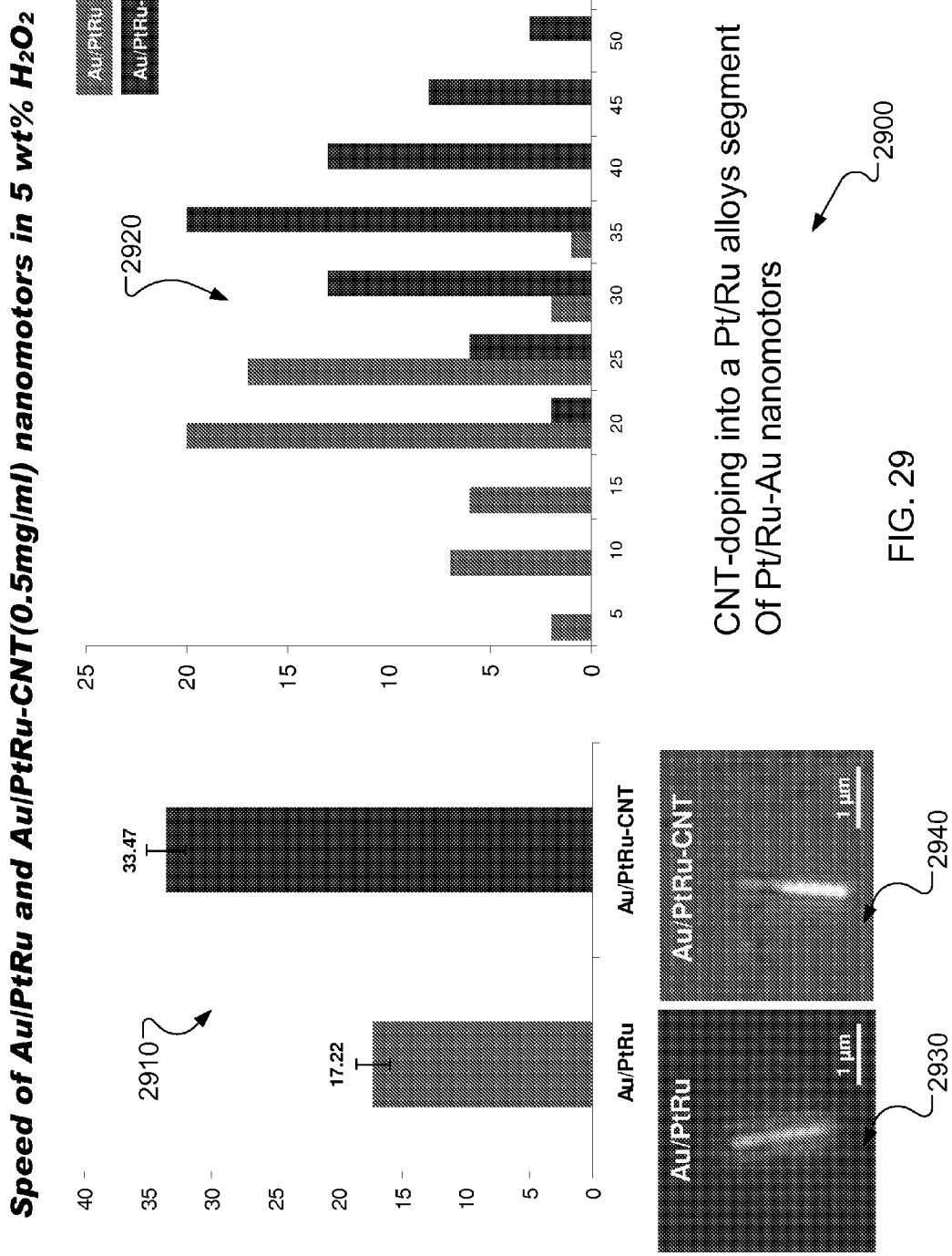
FIG. 29 shows examples of accelerated motions of CNT-doped Pt/ruthenium (Ru) alloy component of Pt/Ru alloy nanomotors.

FIG. 29 includes diagrams and images 2900 showing examples of accelerated motions of CNT-doped Pt/ruthenium (Ru) alloy component of Pt/Ru alloy nanomotors. A nanomotor is implemented with an Au-based cathode component and a Pt/Ru alloy-based anodic component. CNT is doped into the Pt/Ru alloy component. The upper left panel 2910 shows the average speed of Au/PtRu nanomotors in 5 wt % $H_2O_2$ is calculated to be approximately 17.22 μm/s. The average speed of Au/PtRu-CNT (0.5 mg/ml) nanomotors in 5 wt % $H_2O_2$ is calculated to be approximately 33.47 μm/s. In addition, the speed histograms 2920 of the Au/PtRu and Au/PtRu-CNT (0.5 mg/ml) nanomotors show that the Au/PtRu-CNT nanomotors can achieve speeds faster than 20 μm/s at a higher frequency than the Au/PtRu-CNT nanomotors. Images 2830 and 2840 of the Au/Pd and Au/Pd-CNT nanomotors are shown in the lower left panel.

In some implementations, the non-metallic redox catalyst can include materials other than CNT, such as other carbon-based catalysts (such as carbon$_{60}$). Also, fuels other than $H_2O_2$ can be used. For example glucose or sucrose can be used as the fuel for powering the nanomotors.

Figure 30:
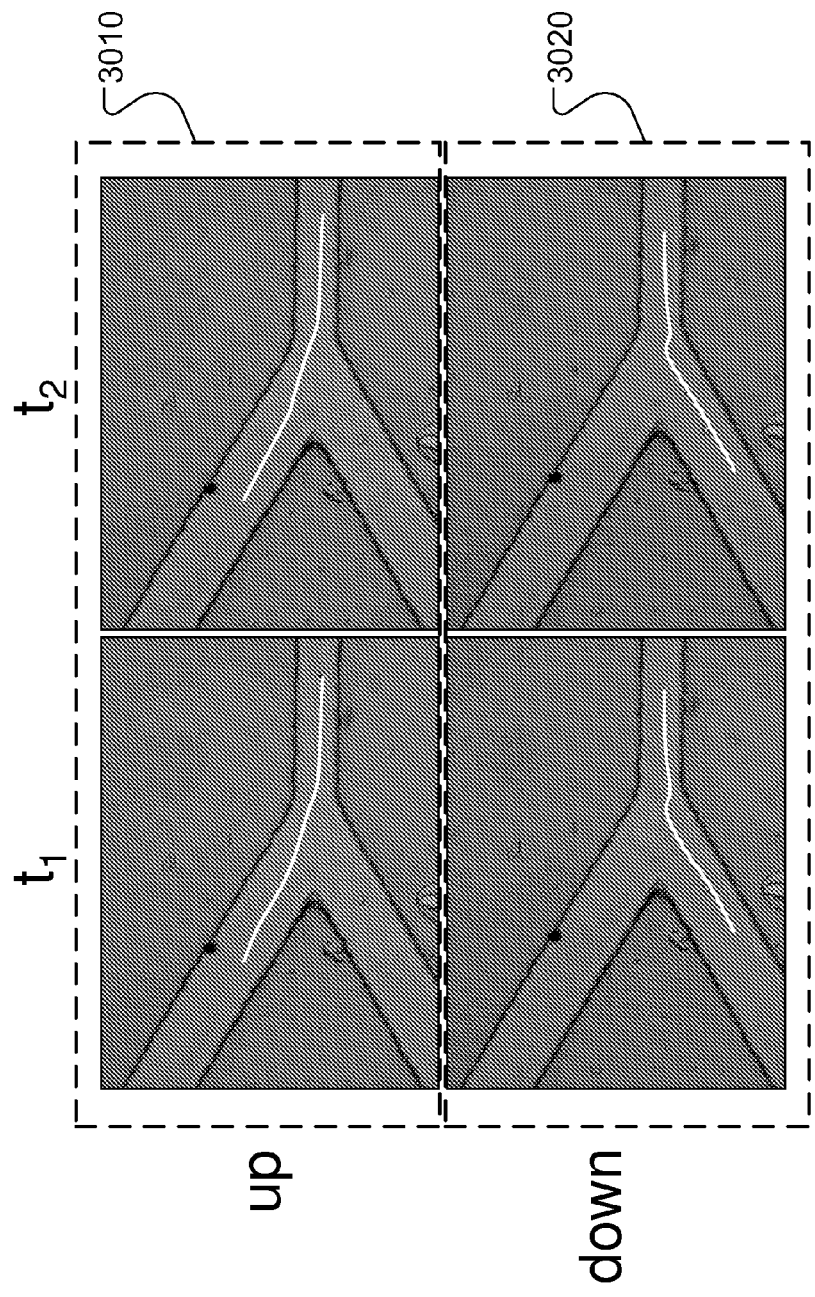
FIG. 30 shows examples of controlling motions in microfluidic channels.

FIG. 30 shows examples of controlling motions in microfluidic channels. Using magnetic fields as described above, nanomotors can be magnetically sorted to control the direction of the nanomotors in microchannels. The top panels 3010 show controlling the movement of the nanomotors to move up at a split in the microchannels. The bottom panels 3020 shows controlling the movement of the nanomotors to move down at the split in the microchannel.

Figure 31:
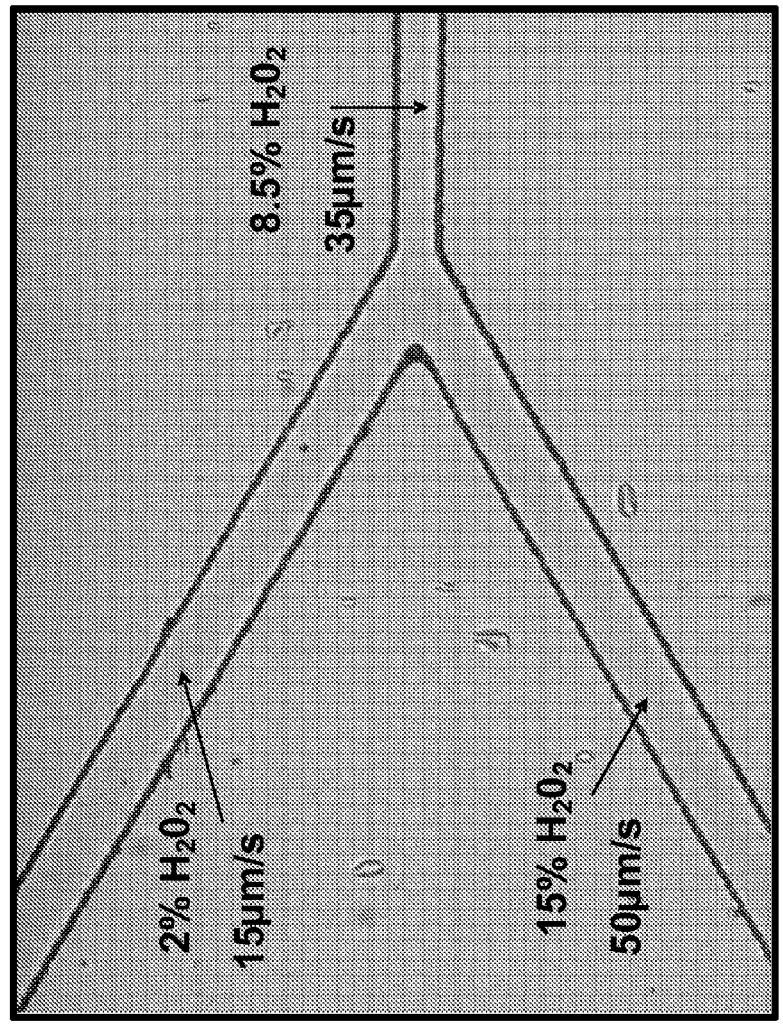
FIG. 31 shows examples of controlling motions of the nanomotors by varying the fuel concentration.

FIG. 31 is an image 3100 that shows examples of controlling motions of the nanomotors by varying the fuel concentration in selected zones. For example, various fuel concentrations are shown at different microfluidic channels. At one microfluidic channel, the fuel concentration is set at 2% $H_2O_2$, which results in the nanomotor speed of 15 µm/s. At another microfluidic channel, the fuel concentration is set at 15% $H_2O_2$, which results in the nanomotor speed of 50 µm/s. Yet another microfluidic channel, the fuel concentration is set at 8.5% $H_2O_2$, which results in the nanomotor speed of 35 µm/s.

Figure 32:
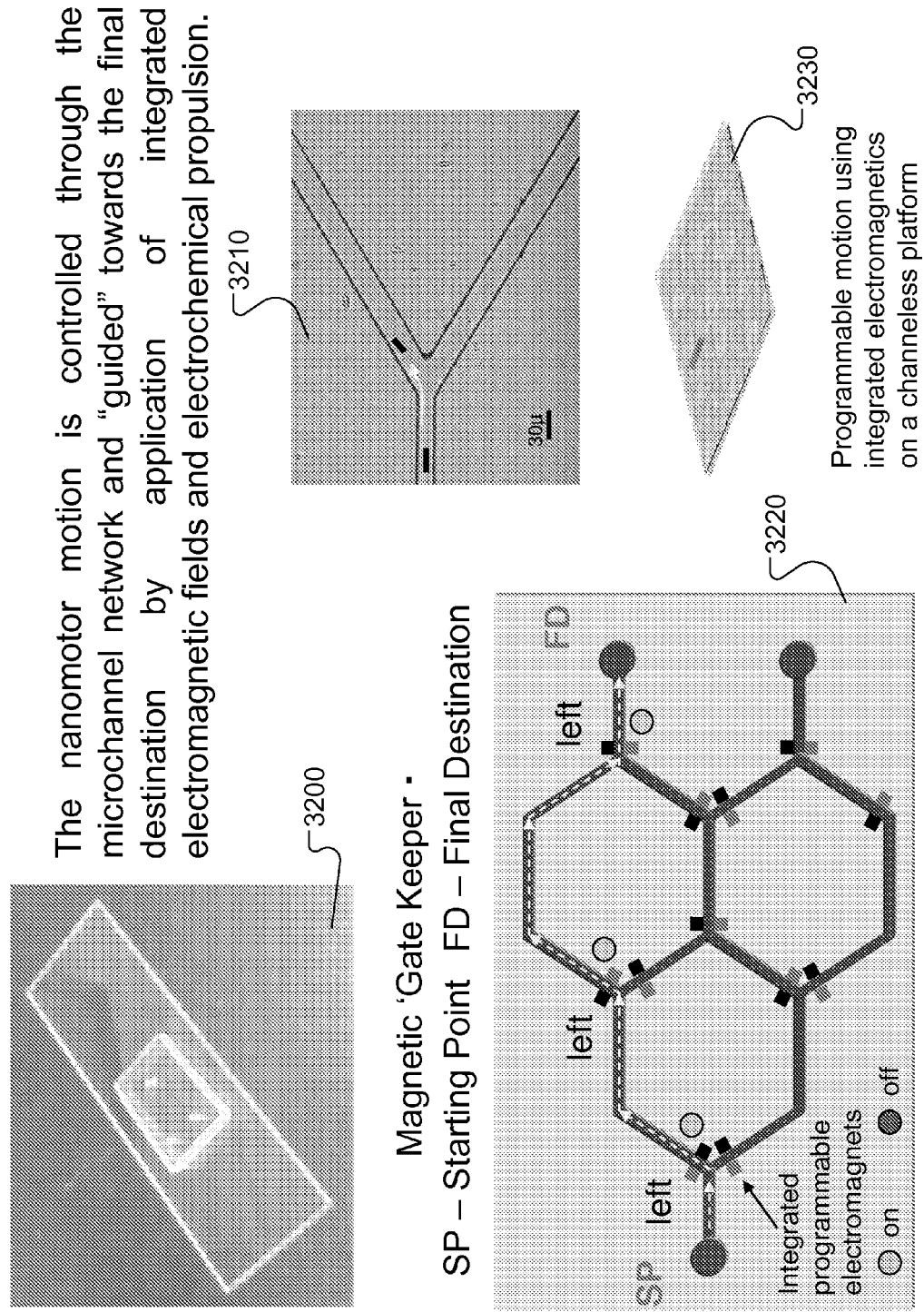
FIG. 32 shows examples of microchannel network and changeless platforms.

FIG. 32 shows examples of microfluidic network platform 3200. The microfluidic network platform 3200 can include a microchannel structure 1810 that integrates electromagnetic fields and/or electrochemical propulsions to guide the nanomotors towards their final destination through physical microchannels. For example, a magnetic gate keeper 3220 can be implemented to include integrated programmable electromagnets throughout the microchannel network to steer (move and guide) the nanomotors from the starting point (SP) to the final destination (FD). Also, electrochemical propulsions can be implemented by providing fuel solutions of varying concentrations and/or compositions (e.g., $H_2O_2$ alone or $H_2O_2$ combined with hydrazine) as described with respect to FIG. 31 above. In some implementations, a channeless structure 3230 can be implemented. Programmable motion can be accomplished using integrated electromagnets, such as the magnetic gate keeper 3220 on the channeless structure 3230. The magnetic gate keeper 3220 generates various magnetic fields that create virtual microchannels without using physical channels.

Figure 33:
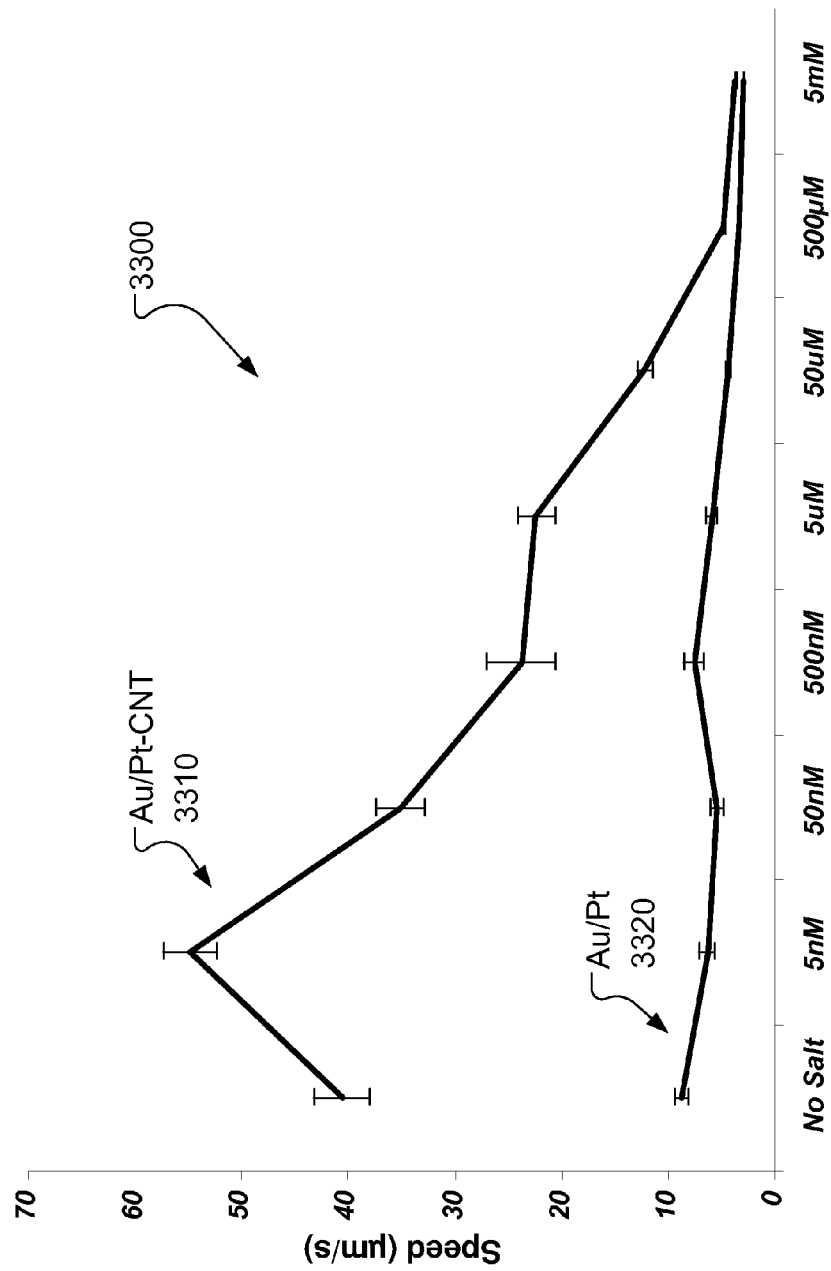
FIG. 33 shows examples of performances of different nanomotors in under different salt concentrations.

FIG. 33 is a chart 3300 that shows examples of performances of CNT-based nanomotors in physiological conditions. The CNT-doped nanomotors 1650 can move in salt solutions where common Au/Pt nanomotors 1630 are unable to move. This may be important for implementations that involve nanomotor movements in biological environments such as the blood stream. The X-axis shows the varying concentration of salt solutions. For example, the salt solution can include potassium phosphate buffer (KPB) of pH 7.6 containing 1.2 mM Cl⁻. The Y-axis shows the speed of the nanomotors (µm/s) in the varying concentration of the salt solutions. For example, in an environment of 5 mM KPB, Au/Pt nanomotors 1630 can achieve a speed of only 2.9 µm/s which is slower than a Brownian motion (3.2 µm/s) observed in DI water without hydrogen peroxide fuel (see 3320). However, the Au/Pt-CNT nanomotors 1650 can achieve a directional movement at a speed of 3.6 µm/s (see 3310). All data show the average speed of nanowires in 5 wt % hydrogen peroxide fuel.

Figure 34:
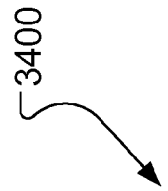
FIG. 34 shows examples of speeds obtained by the Au/Pt nanomotors in different concentrations of salt solutions.
Figure 35:
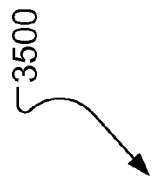
FIG. 35 shows example speeds obtained by the Au/Pt-CNT nanomotors in different concentrations of salt solutions.

FIG. 34 is a table 3400 that shows examples of speeds obtained by the Au/Pt nanomotors 1630 in different concentrations of salt solutions. FIG. 35 is a table 3500 that shows example speeds obtained by the Au/Pt-CNT nanomotors 1650 in different concentrations of salt solutions.

These variations in the composition of the nanowire and the mixture of the fuel can lead to energy-efficient nanomotors with unexpected enhancements of nanomotor speeds. Such high-performance nanomotors may enable transport and release of cargos, locomotion in physiological conditions, and the design of more sophisticated nanosystems performing multiple complex tasks.

Additional applications of CNT-doped nanomotors can include nanocollectors or nanofluidics that involved running nanowires through solution then pass that through the detector using a variety of ligands. Also, a nanodetection system, such as a single molecule detection system can be implemented to identify small "targets" in a large sample. Artificial organisms can be implemented with a long range goal of using synthetic model for cellular transport or molecular shuttle. Also, nanomotors can be implemented for body remediation to swarm activity to remove/destroy clots or tumor cells and enable chemotaxis to cells exhibiting reactive oxygen species. Nanomotors can be used in gene expression profiling to displace the motor with a bar code by sequences of mRNA. Nanomotors can enable programmable movement of nanorobotics by moving wires across a landscape in a predictable manner. Nanomotors can enable drug delivery in vivo through nanomotor enhanced diffusion or artificial chemotaxis towards target tissue. Nanomotors can enhance security systems by providing a hand held unit (2" square, for example) device to detect multiple agents, such as explosives and bioagents/chemical agents. In addition, segmentation of the wire can trigger the release of a payload due to environmental detection and assist in biodegradation of nanomaterials. In diabetes example, release of payload (e.g., insulin) can be based on localized pH change (associated with enzymatic reaction of glucose). Nanomotors can enable imaging of molecules to provide high resolution imaging such as neuroimaging with external magnetic field potential.

In some implementations, in vivo and in vitro applications for the nanomotors include a self assembling stint. In addition, nanomotors can be implemented to treat sepsis (where fuel is hydrogen peroxide)/cuts and wounds. Nanomotors can enable transport across a membrane/cell wall/biofilm. Also, nanomotors can trigger system for therapeutic delivery. Nanomotors can deliver cargos around a tumor. Nanomotors can be implemented in a binary weapon with two magnetically driven items that when combined creates a destroyer/healer/therapeutic agent. Nanomotors can be implemented as nanokidneys to pull chemicals out of a local system before the body has to deal with it. Nanomotors can be implemented as a nanotrain (complementary sequence) assembly. Nanomotors can encapsulate body trauma/disease. Nanomotors can enable single cell biopsy. Nanomotors can be implemented as nanovortices for cell lysis, stirring, mixing, etc. Further, nanomotors can be implemented as nanoink potential, nanopaper, nanoscreen development, nanotext with nanowires for nanoprinting, etc.

Figure 36:
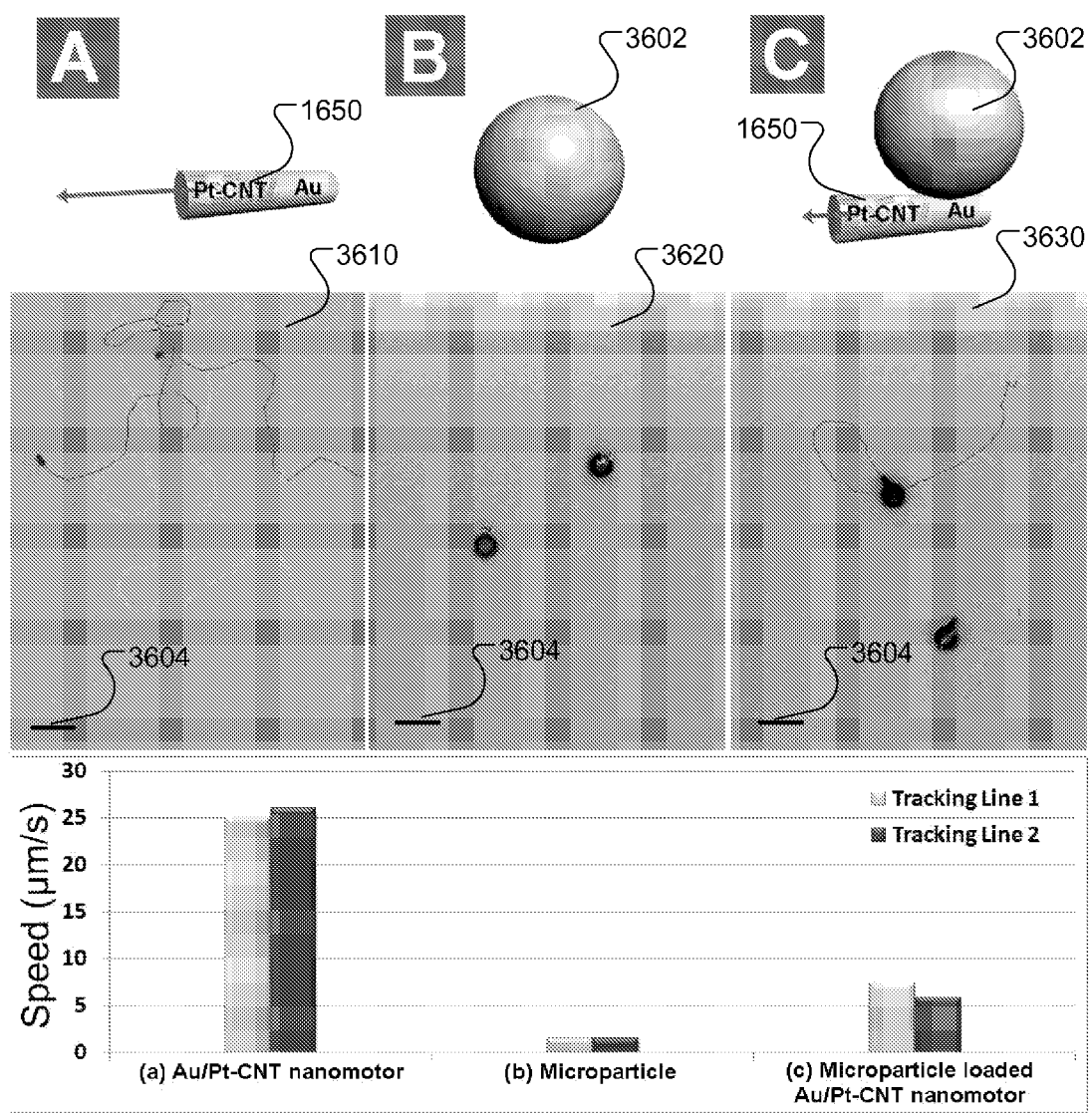
FIG. 36 shows examples of movements of Au/Pt-CNT nanomotors with a microparticle attached.

FIG. 36 shows examples of movements of Au/Pt-CNT nanomotors 1650 with a microparticle 3602 attached. The Au/Pt-CNT nanowire used in FIG. 36 measures 200 nm in diameter and has a total length of 2 µm with an equal length of each segment (anode 1660 and cathode 1670). Thiol-biotin molecules are linked to streptavidin coated magnetic microparticle 3602 for a subsequent binding to an Au segment 1670 of the nanowire 1650. The microparticles are 2.8 µm in diameter and represent an example of a 'heavy load' cargo. The left most image 3610 shows the movement of the nanomotor 1650 without the microparticle 3602 attached. The right most image 3630 shows the movement of the nanomotor 1650 with the microparticle 3602 attached. The middle image shows the movement (or lack thereof) of the microparticle 3602. The images 3610, 3620 and 3630 are captured during a period of 10 seconds in the presence of 10 wt % hydrogen peroxide fuel. The scale bar 3604 represents 5 µm in distance. The bar graphs (bottom) represent the speeds (µm/s) of the corresponding nanostructures with or without attached microparticles.

Figure 37:
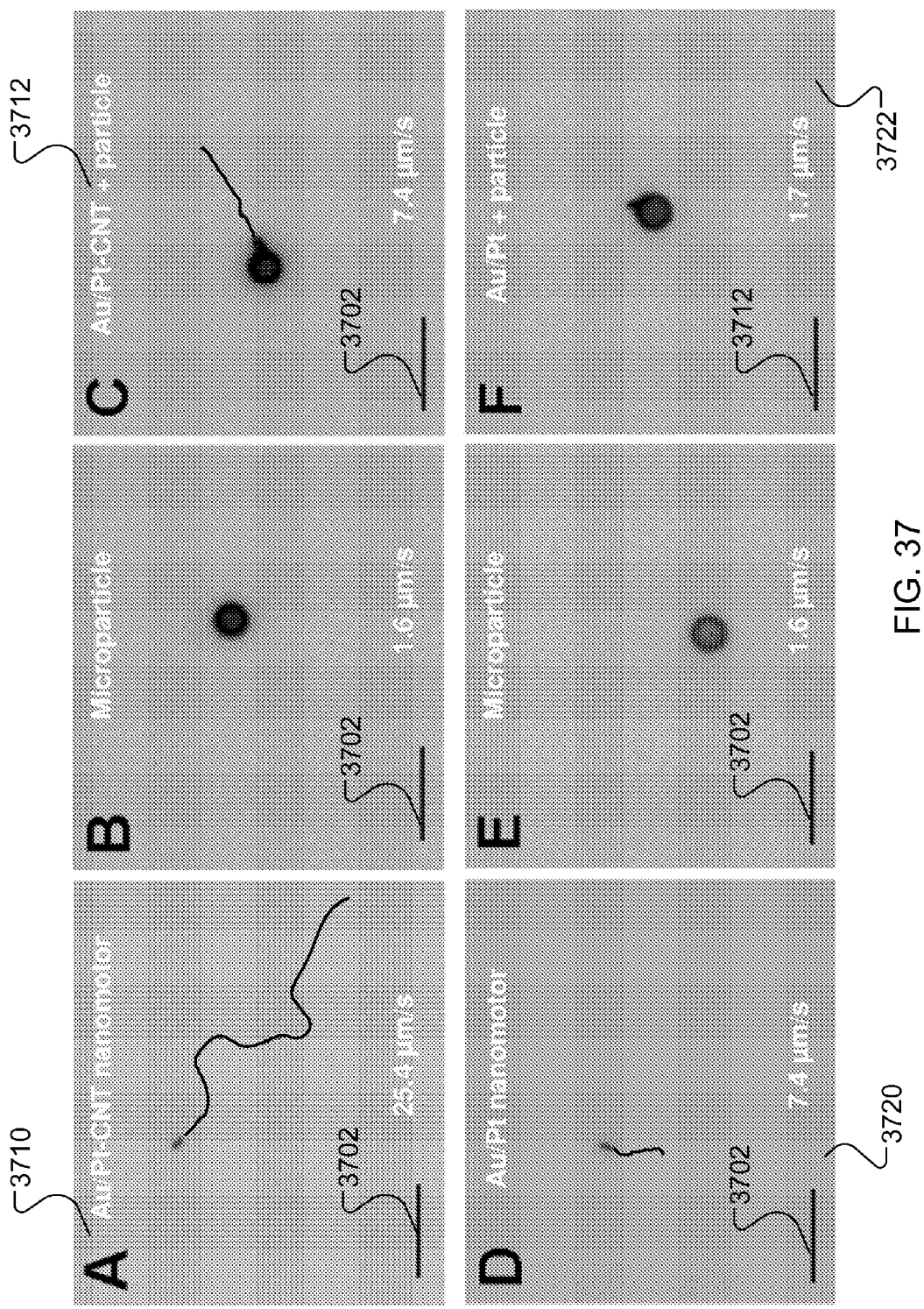
FIG. 37 shows example optical images of different nanomotors with and without sphere ('cargo') with track lines captured in presence of 10 wt % $H_2O_2$ during 2 s time period.

FIG. 37 shows example optical images with track lines captured in presence of 10 wt % $H_2O_2$ during 2 s time period.

The top right image 3710 shows the motion of the Au/Pt-CNT nanomotor 1650 at an average speed of 25.4 µm/s. The lower left image 3720 shows the motion of the Au/Pt nanomotor at an average speed of 7.4 µm/s. As described above, the average speed of the CNT-incorporated nanomotor 1650 is several magnitudes faster than the CNT-absent nanomotor. The right most image shows the ability of the CNT-incorporated nanomotor to maintain high speed (~7.4 µm/s) even when attached to a heavy microparticle 3602. In contrast, the CNT-absent nanomotor is barely moving at an average speed of 1.7 µm/s when attached to the microparticle. Thus, the "loaded" CNT-incorporated nanomotor is able to generate speeds that are at least as fast as "unloaded" CNT-absent nanomotor. The scale bar 3702 represents 10 µm.

In some implementations, the fuel solution can be purified to increase the rate of the redox reaction in the solution. Purifying the solution can remove the impurities that can slow down the redox reaction that generate nanomotor movement.

Catalytic and Biocatalytic Reagent.

In another aspect, artificial nanomotors can be used for creating micro or nanoscale surface structures. The preparation of well-defined micro or nanostructures at a surface is an important goal of nano or microfabrication. Tip-based scanning-probe (SP) techniques can be extremely useful for depositing chemical or biological materials onto flat substrates. Such SP fabrication methods can rely on the controlled movement of a functionalized tip along predetermined paths for a localized surface modification.

By taking advantage of the various features of catalytic nanomotors, a process of nanomotor-based direct 'writing' can be implemented. To implement the 'Writing' feature, the nanomotors are propelled along predetermined complex paths. Additionally, their speed can be controlled and regulated. Additionally, the nanomotors can be functionalized with different biological or chemical entities, and the nanomotors can be moved rapidly over large areas. Magnetically-guided motion of catalytic nanowire motors, accomplished through the incorporation of a ferromagnetic (nickel) segment, can be particularly useful for generating predefined nanomotor movement patterns.

The new nanomotor-induced surface 'writing' protocol can utilize the controlled movement of a functionalized nanomotor for a localized surface modification and is illustrated in FIG. 1. Similar to different SP fabrication techniques, 11 nanomotors based on different propulsion and guidance mechanisms could be employed for creating localized surface microstructures. Considering the reaction between A and B that generates a deposit C, it is possible to use a nanomotor functionalized with a reagent A, 'swimming' (in close proximity to the substrate) in a solution containing B, to induce a localized deposition/precipitation of the product C onto the surface (see, FIG. 1). A variety of microstructures, made of different materials (polymers, metals, etc.), can thus be fabricated on conducting and insulating substrates based on a judicious choice of the reactants and the specific reaction involved. In view of the 'large' (submicrometer) size of catalytic nano-motors, compared to common SP tips, the new nanomotor 'writing' method is currently limited to the creation of micro-scale surface features.

For a nanomotor-induced surface writing tool, peroxide-driven enzyme functionalized catalytic Pt/Ni/Au—Ag nanowire motors can be implemented for creating predefined patterns of polyaniline (PANI) on a gold surface through a localized biocatalytic polymerization reaction. As illustrated in FIG. 1 (bottom), the surface writing use the confinement of horseradish peroxidase (HRP) onto a Pt/Ni/Au—Ag nanowire motor to catalyze the oxidation and localized polymerization of the aniline monomer in the presence of hydrogen peroxide. Defined PANI surface microstructures can thus be created through a controlled movement and accurate positioning of the HRP-modified nanomotor, in a manner analogous to the AFM biocatalytic lithography using enzyme-modified tips, based on the HRP catalyzed polymerization of PANI. The HRP has been confined onto the end of the Au—Ag alloy segment of the motors through a biotin-streptavidin interaction (see FIG. 1). The template synthesis of nanowire motors allows functionalization of the nanowire end with different reagents through various surface chemistries. Note that the peroxide co-reagent of the polymerization reaction acts also as the fuel that propels the nanomotor motion. Magnetically-guided motion of the HRP-modified Pt/Ni/Au—Ag nanomotors thus leads to a localized biocatalytic polymerization reaction and hence to the direct 'writing' of conducting polymer (CP) microfeatures along the nanomotor path.

Figure 38:
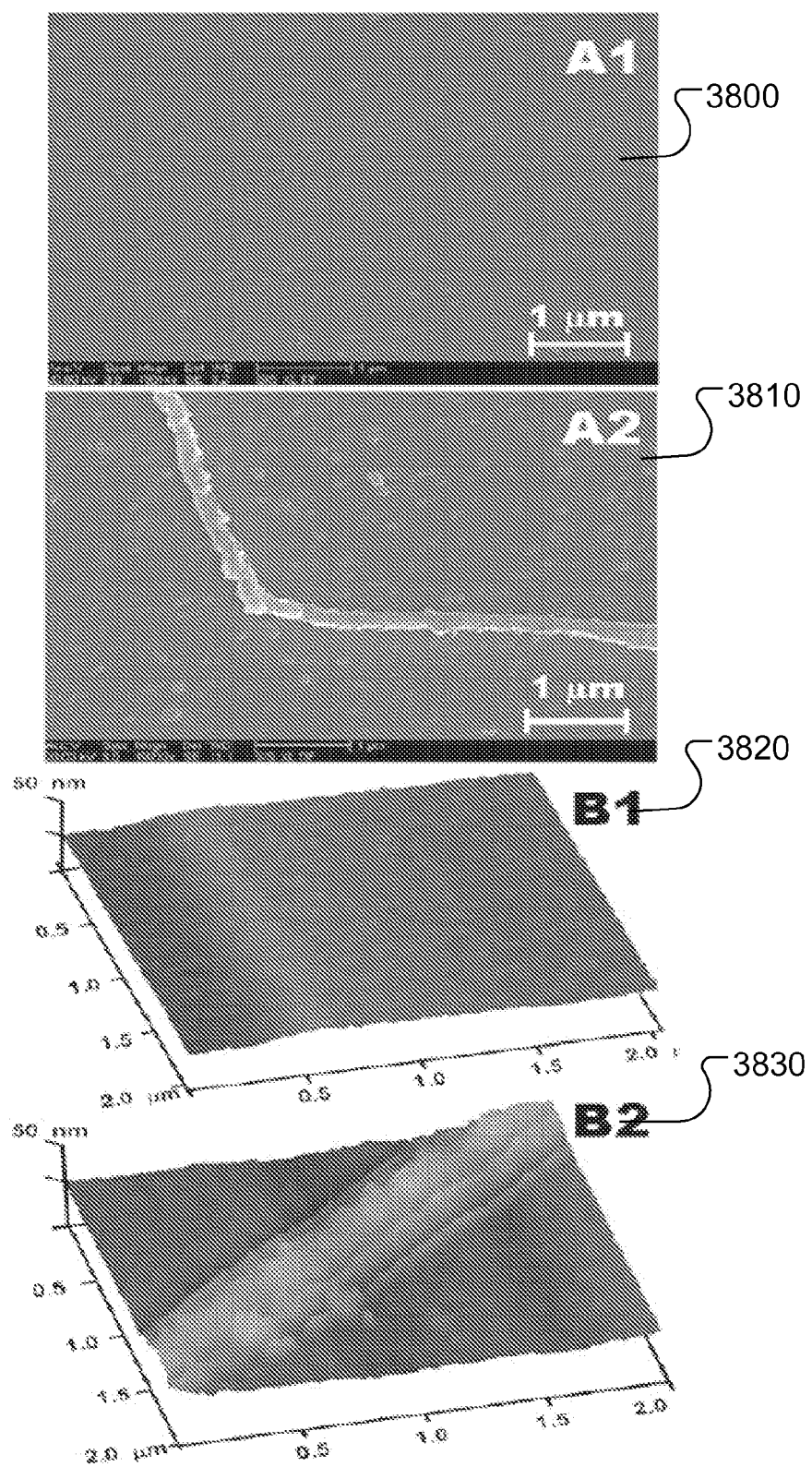
FIG. 38 demonstrates SEM and AFM images of polymeric lines written on a gold surface following the nanomotor-initiated polymerization.

FIG. 38 demonstrates SEM (3810) and AFM (3830) images of polymeric lines written on a gold surface following the nanomotor-initiated polymerization. The HRP-functionalized Pt/Ni/Au—Ag nanowire motors were used for 'writing' of PANI onto a freshly evaporated gold slide from a solution mixture of aniline and 5% H2O2. These images indicate a clear 'writing' of L-shape (FIG. 39 (3810)) and straight PANI wire microstructures (FIG. 38 (3830)) of continuous, well-confined, and nondendrite, with a line width of about 400 nm (on the gold slide), along the path of the nanomotor. An average line height of 15 nm was estimated from the corresponding height profile. The line width reflects the diameter of the nanomotor. Such polymeric structures are not observed in control experiments carried out under similar conditions in the presence of the nanomotor, but without the aniline monomer (FIG. 38 (3800 and 3820)).

The presence of the corresponding reactants does not impair the nanomotor motion. As illustrated in FIG. 38, the catalytic nanomotors maintain their non-Brownian motion in the presence of HRP (a), the necessary $LiClO_4$ salt (b), or the aniline monomer and the salt (c), along with hydrogen peroxide. The alloy nanomotors 6 exhibit axial motion in the presence of the high salt concentration (1 mM $LiClO_4$) essential for the polymerization process. The corresponding histograms for the speed distributions of HRP-modified Pt/Ni/Au—Ag nanomotors under the different conditions, shown in the FIG. 38, indicate average speeds of 8 and 5 µm/s in the presence of $LiClO_4$ and its mixture with aniline, respectively (compared to 12 µm/s with the peroxide fuel alone). While the peroxide co-reagent is acting also as the motor fuel, the concept could be implemented using fuel-free nanomotors based on magnetic 15 or electrical 16 driven locomotion. This would obviate potential fuel- or salt-related limitations on the deposition reaction or the motor motion.

UV-Visible spectroscopy and amperometric experiments confirmed the formation of PANI as well as the biocatalytic activity of HRP on the nanomotors. The latter validated that the HRP immobilized on the nanomotors survived the harsh conditions during membrane dissolution.

Figure 39:
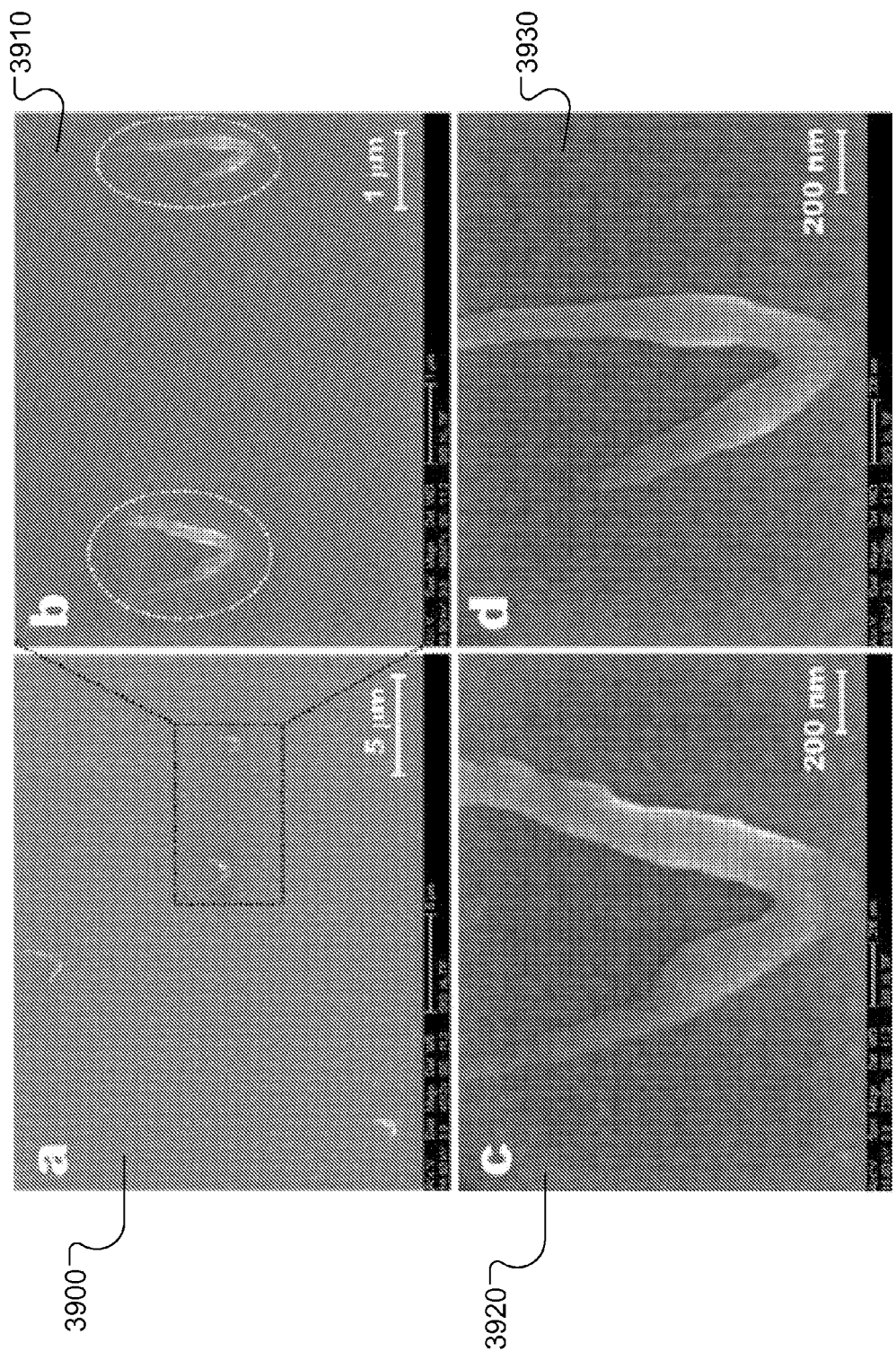
FIG. 39 shows the SEM images of four V-shape PANI microstructures obtained by surface writing which involves simultaneous magnetically-guided motion of several HRP-modified Pt/Ni/Au—Ag catalytic nanomotors.

Controlled nanomotor motion along predetermined paths is essential for generating reproducible surface microstructures. A variety of approaches for achieving precise motion control of catalytic nanomotors can be implemented. For example, precise magnetically-guided simultaneous U-shaped movement of three catalytic Pt/Ni/Au—Ag nanomotors can be achieved. Such guided motion of several functionalized nanomotors can be exploited for direct 'writing' of multiple microstructures. For example, FIG. 39 shows the SEM images 3900, 3910, 3920 and 3930 of four V-shape PANI microstructures obtained by surface writing which involves simultaneous magnetically-guided motion of several HRP-modified Pt/Ni/Au—Ag catalytic nanomotors. Image 3910 is the zoomed image of image 3900. Images 3920 and 3930 are zoomed images of the features in 3910. HRP-modified Pt/Ni/Au—Ag nanomotors were mixed with 5% H2O2 and 1 mM aniline (in a 1 mM LiClO4 solution) on a gold surface. The nearly identical features observed indicate great promise for parallel high-throughput surface 'writing'. The magnetic field is used solely for 'steering' (directing) the Ni-containing nanomotors, and not to propel or drive them. Such magnetic dragging is not feasible considering low Reynolds number and Brownian motion experienced by the nanoscale object essential for the high resolution 'writing'.

The size or width of PANI microstructure wire can be controlled by varying the monomer concentration. For example, polymeric wires prepared by varying the aniline concentration between 0.5 mM to 3 mM had increasing line widths, ranging from 250 to 400 nm (see FIGS. 39, 3900, 3910 and 3920). Apparently, the resolution of the new protocol is limited by the 250 nm diameter of the motor. The lower aniline concentration also eliminates the formation of granular PANI features, observed randomly on the surface without or independent of the nanomotors, using the 3 mM monomer solution (see FIG. 39, image 3900 vs. image 3920). Such polymerization is expected at elevated monomer concentrations (in the absence of the enzyme catalyst) by oxidative OH' radicals formed as intermediate products in the presence of metal salts.

Besides the fuel-driven bimetal nanomotors, a system for fabricating nanoobjects can include using fuel-free (e.g., electrically or magnetically powered) nanomotors functionalized with appropriate reagents. For example, a magnetically-guided fuel-free nanomotor can be functionalized with an enzyme. The enzyme functionalized, fuel-free nanomotor can propel in a solution containing a metal ion and the corresponding enzyme or catalyst that reacts with the enzyme. The localized enzymatic reaction generates a reducing agent that reduces the metal ions into a metal structure deposited over the predetermined path of the fuel-free nanomotor.

In one example, as shown in the process flow diagram 3800 of FIG. 38A, enzyme glucose oxidase is immobilized to generate hydrogen peroxide (in presence of glucose) and to reduced gold ions to gold microstructures. In this and other embodiments, the nanomotor can include a magnetic head, a metallic tail and a flexible joint connected between the head and the tail. The magnetic head can be used to magnetically guide the nanomotor over a controlled path. The path of the nanomotor is controllable (e.g., can be changed) by use of the magnetic guidance, for example. The metallic tail can be conjugated with an enzyme to induce a localized enzymatic reaction, which can create nanoobjects. The flexible joint allows the metallic tail to be moved (e.g., rotated) to create various structural shapes of the generated nanoobjects. For example, rotating the tail can create a helical structure.

Figure 40A:
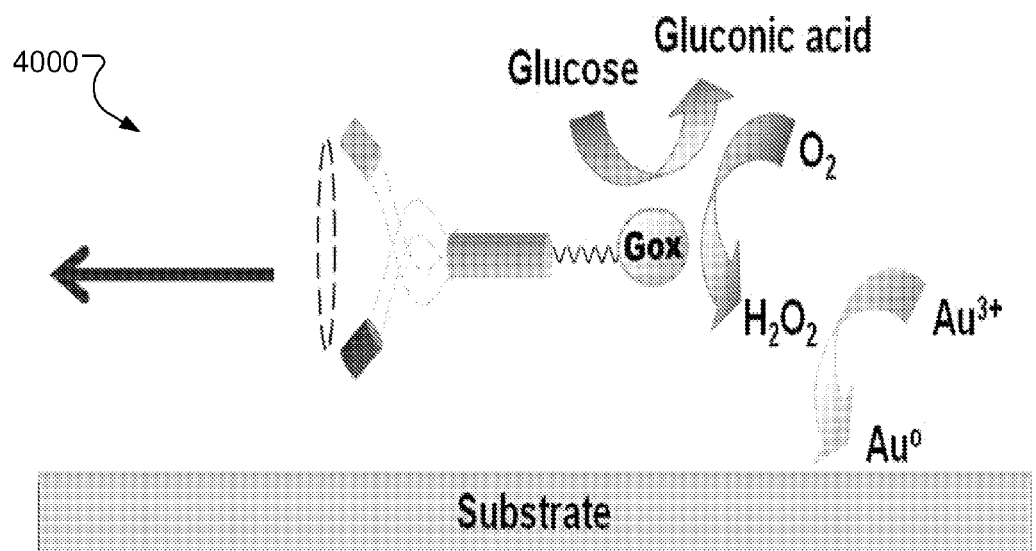
FIGS. 40A and 40B show that the fuel-free nanomotor can be made of a magnetic head (e.g., nickel) and a metallic tail (e.g., gold).
Figure 40B:
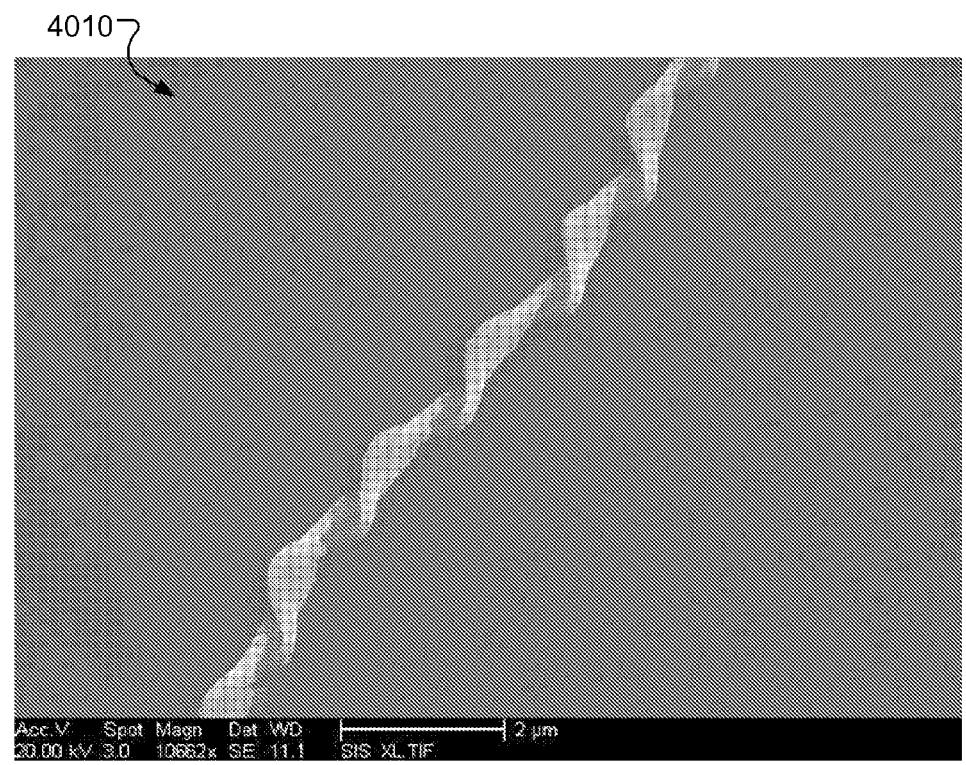

In the example shown in FIGS. 40A and 40B, the fuel-free nanomotor can be made of a magnetic head (e.g., nickel) and a metallic tail (e.g., gold). Glucose oxidase can be immobilized to the metallic tail (e.g., enzyme-conjugated gold tail), and the metallic tail can be rotated through the flexible joint to generate helical microstructures as shown in the image 4010 of FIG. 40B.

Figure 41A:
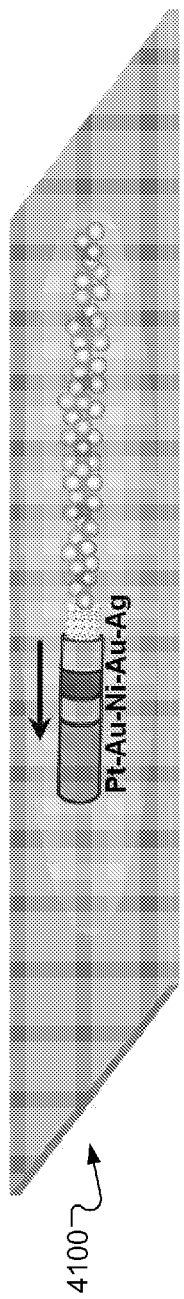
FIG. 41A shows that dissolution of the motor silver segment can be used to create silver microstructures through the reduction of the self generated silver ions by the peroxide fuel.
Figure 41B:
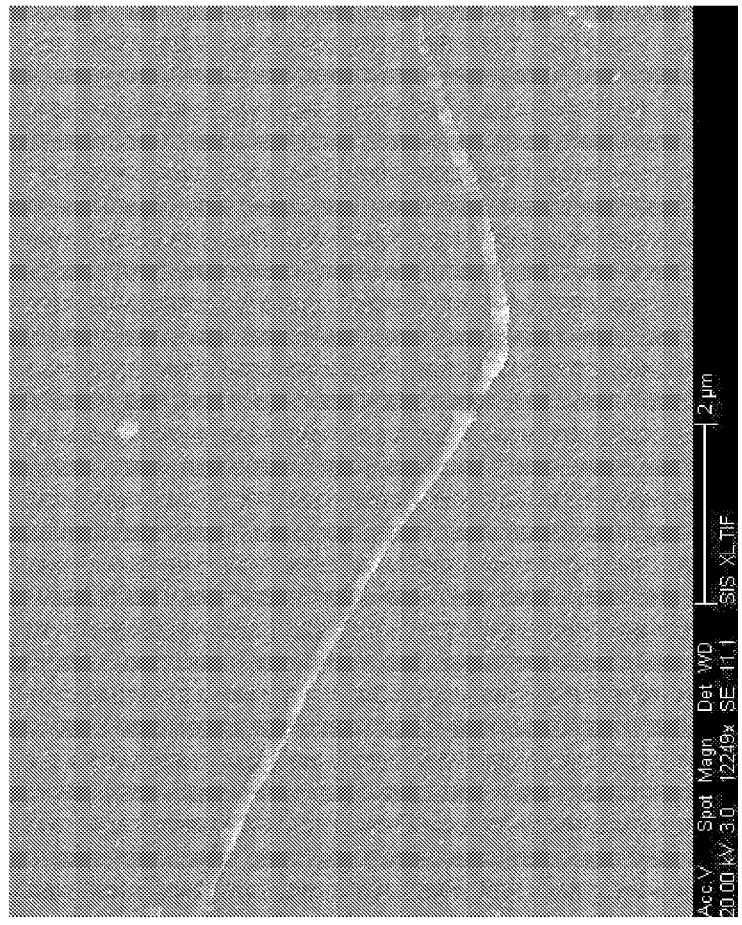
FIG. 41B is an image of the silver microstructures created as described above.

In another aspect, a system for fabricating nanoobjects can include a reagent-functionalized nanomotor whose reaction over a predetermined path leads to localized etching of the surface. For example, as shown in the diagram 4100 of FIG. 41A, dissolution of the motor silver segment can be used to create silver microstructures through the reduction of the self generated silver ions by the peroxide fuel. FIG. 41B is an image 4110 of the silver microstructures created as described above.

Various processes can be implemented to functionalize nanomotors for patterning surface microstructures through a localized material deposition during a predefined motion of the motor.

Figure 42:
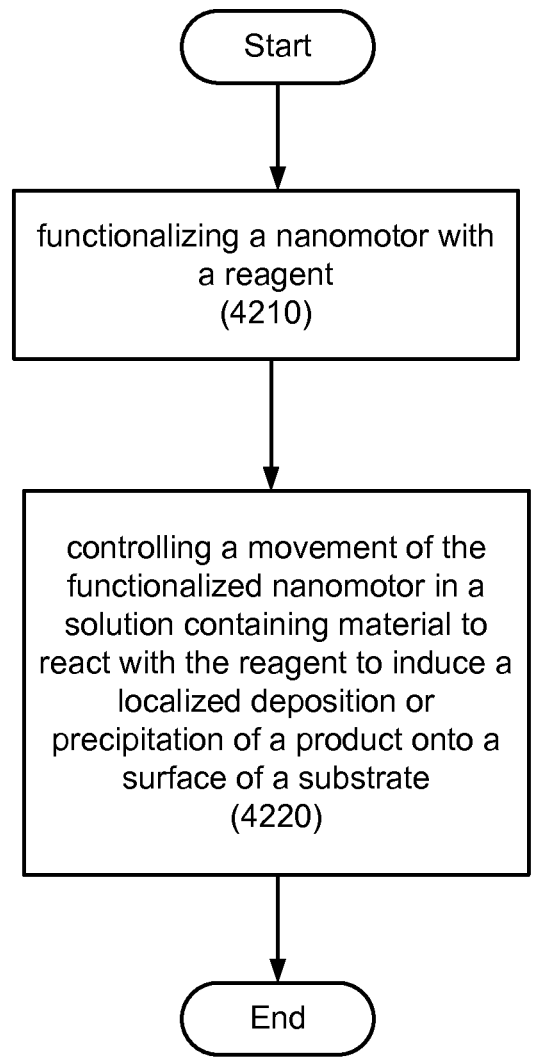
FIG. 42 is a process flow diagram of a process for 4200 fabricating nanoobjects.

FIG. 42 is a process flow diagram of a process for 4200 fabricating nanoobjects. The process for fabricating nanoobjects (4200) include functionalizing a nanomotor with a reagent (4210) and controlling a movement of the functionalized nanomotor in a solution containing material to react with the reagent to induce a localized deposition or precipitation of a product onto a surface of a substrate (4220).

Implementations can optionally include one or more of the following features. The reagent and a specific reaction can be selectively chosen to fabricate different microstructures made of different materials. The nanomotor can include a self-propelled nanomotor. The nanomotor can include a non-fuel based nanomotor. The nanomotor can include a fuel based nanomotor. The nanomotor can be selected from different nanomotors having different shapes comprising a sphere or a cylinder. The nanomotor motion can be accomplished using magnetic or electrical fields.

Figure 43:
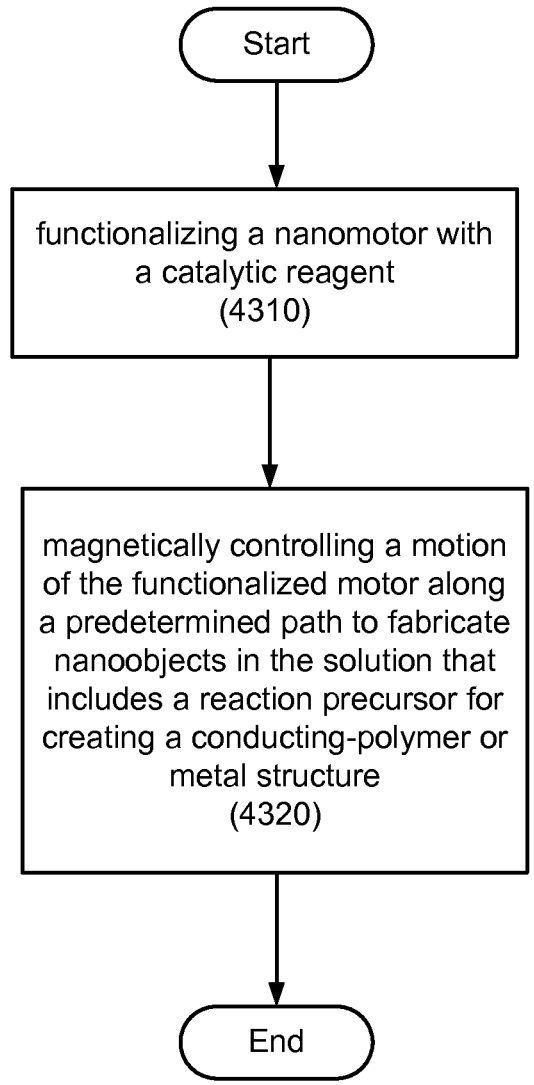
FIG. 43 is another process flow diagram of another process of fabricating nanoobjects.

FIG. 43 is another process flow diagram 4300 of another process of fabricating nanoobjects. The process 4300 can include functionalizing a nanomotor with a catalytic reagent (4310). The nanomotor can include an anode component that includes a metallic oxidizing catalyst to oxidize at least one electron donor substance in a solution. The nanomotor can include a ferromagnetic component connected to the anode component to magnetically control movement of the nanomachine. The nanomotor can include a cathode component connected to the ferromagnetic component that includes a metallic reducing catalyst to reduce at least one electron acceptor substance in the solution. The nanomotor can include a non-metallic redox catalyst functionalized to at least one of the anode component and the cathode component to increase a rate of a redox reaction in the solution. Fabricating nanoobjects can include magnetically controlling a motion of the functionalized motor along a predetermined path to fabricate nanoobjects in the solution that includes a reaction precursor for creating a conducting-polymer or metal structure (4320). The controlled motion of the functionalized nanomotor causes a given localized reaction in select locations along the path of the nanomotor in motion to write a predetermined nanofeature.

Implementations can optionally include one or more of the following features. The reaction precursor can include a monomer or metal ions. The catalytic reagent can include an enzyme. The localized reaction induced by the moving functionalized nanomotor can include polymerization, metal deposition, or precipitation. Also, multiple nanomotors can be functionalized, and the movement of the multiple functionalized nanomotors can be controlled to simultaneously pattern multiple nanoobjects. The movement or speed of the multiple functionalized nanomotors can be controlled and regulated to pattern nanoobjects of different heights.

Figure 44:
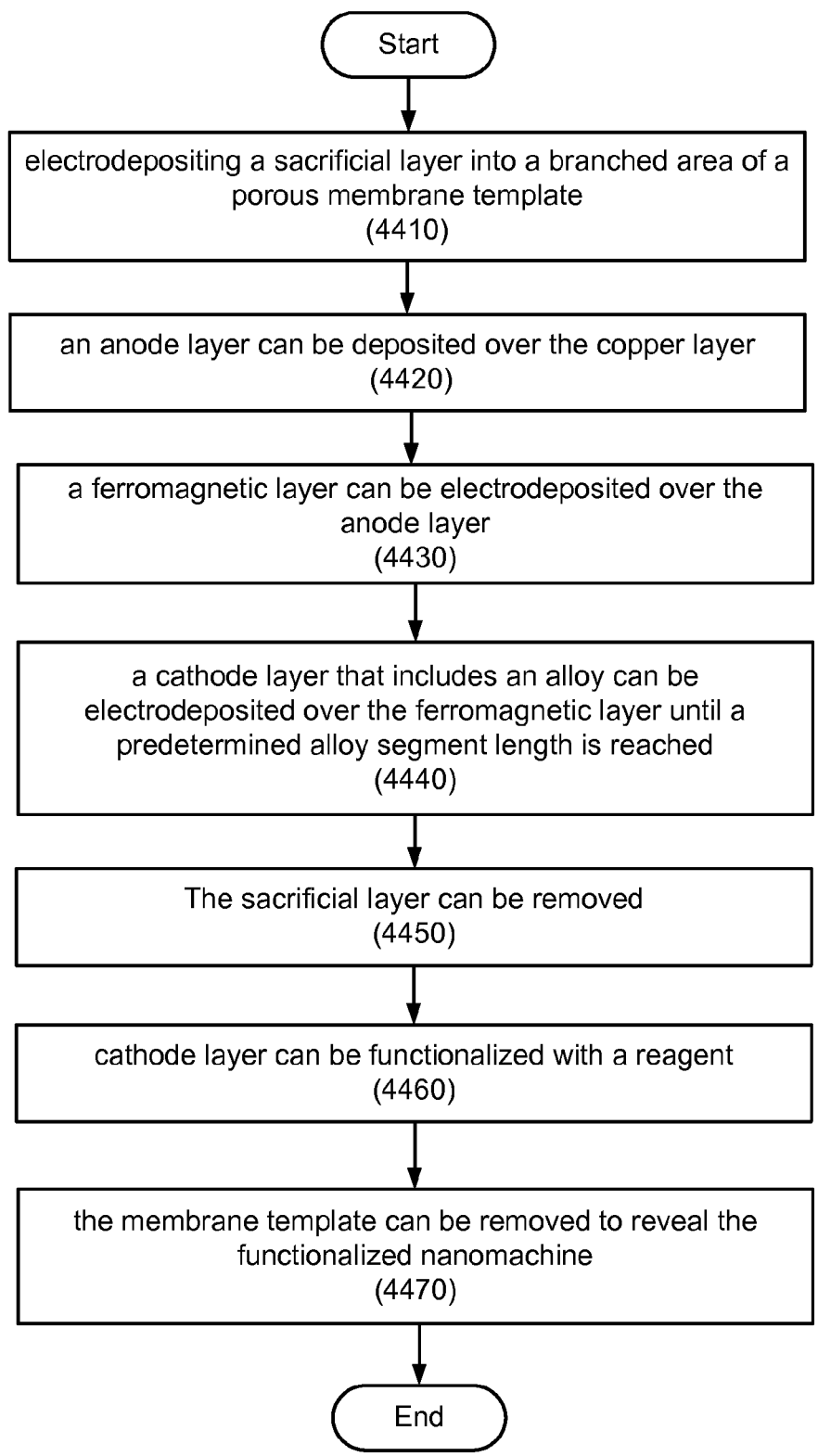
FIGS. 44, 45A and 45B represent yet another process flow diagram 4400 of yet another process of manufacturing a nanomachine.
Figure 45A:
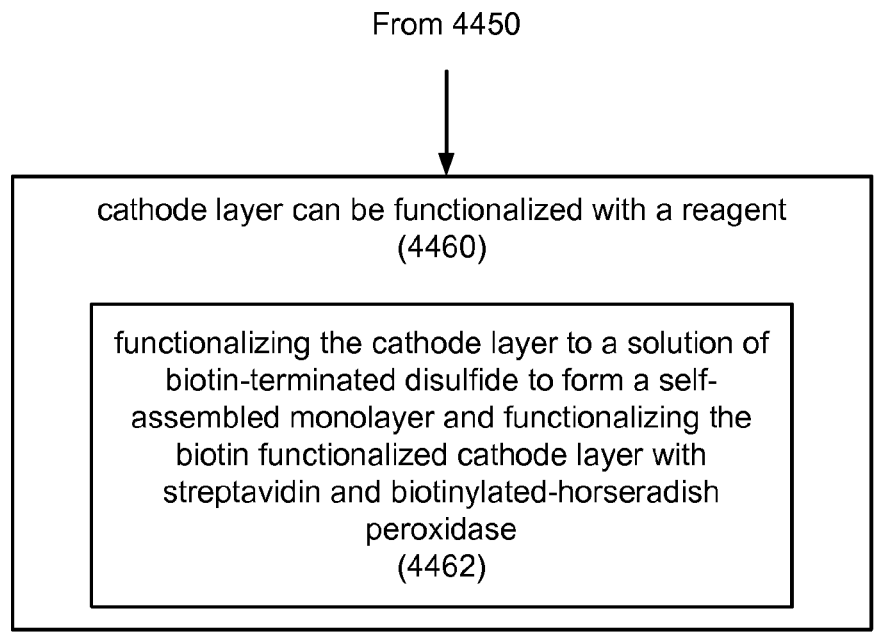
Figure 45B:
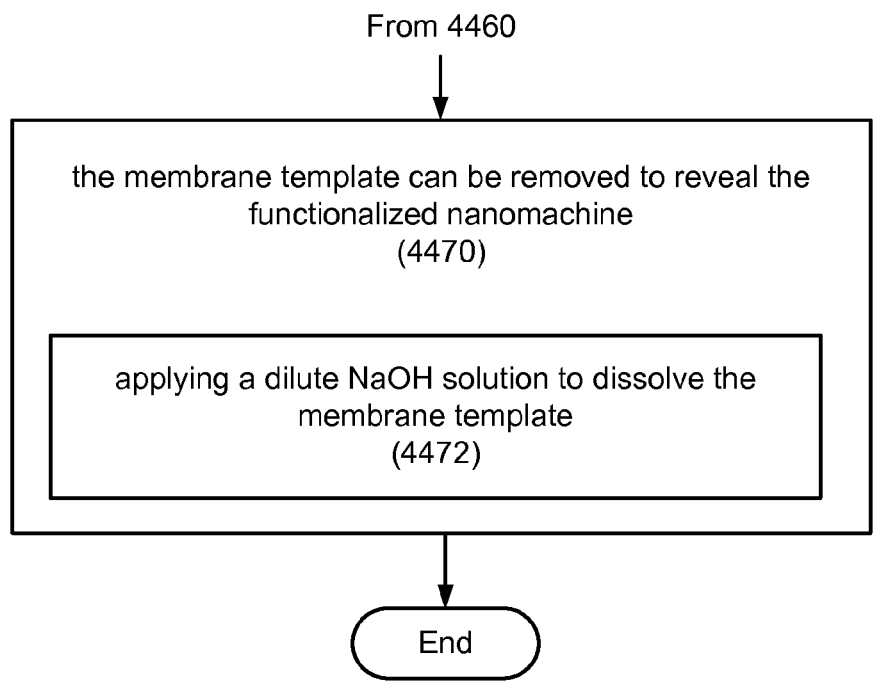
Figure 46:
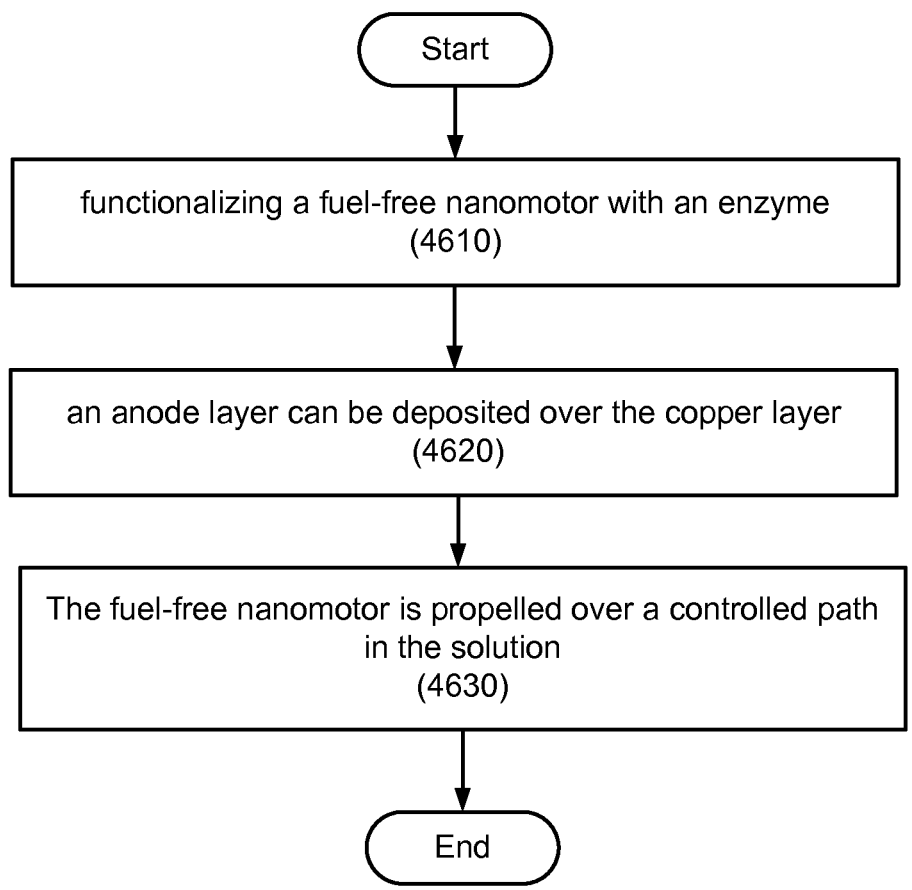
FIGS. 46, 47A, 47B, 47C, 47D and 47E represent another process flow diagram of another process 4600 of manufacturing a nanomachine.
Figure 47A:
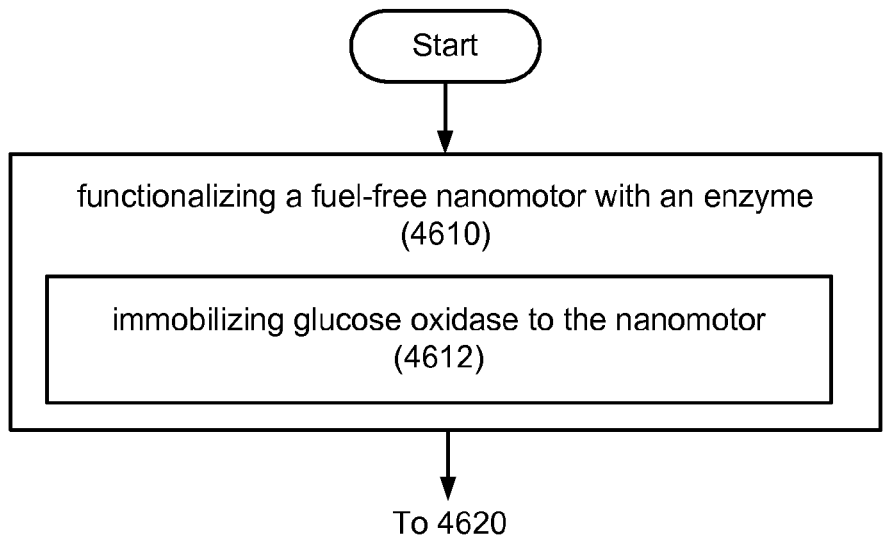
Figure 47B:
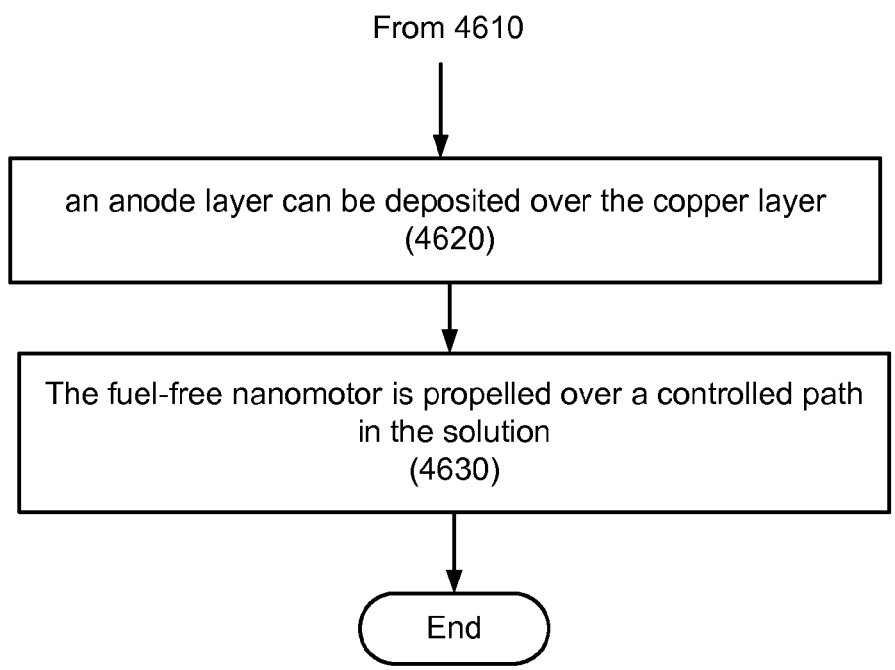
Figure 47C:
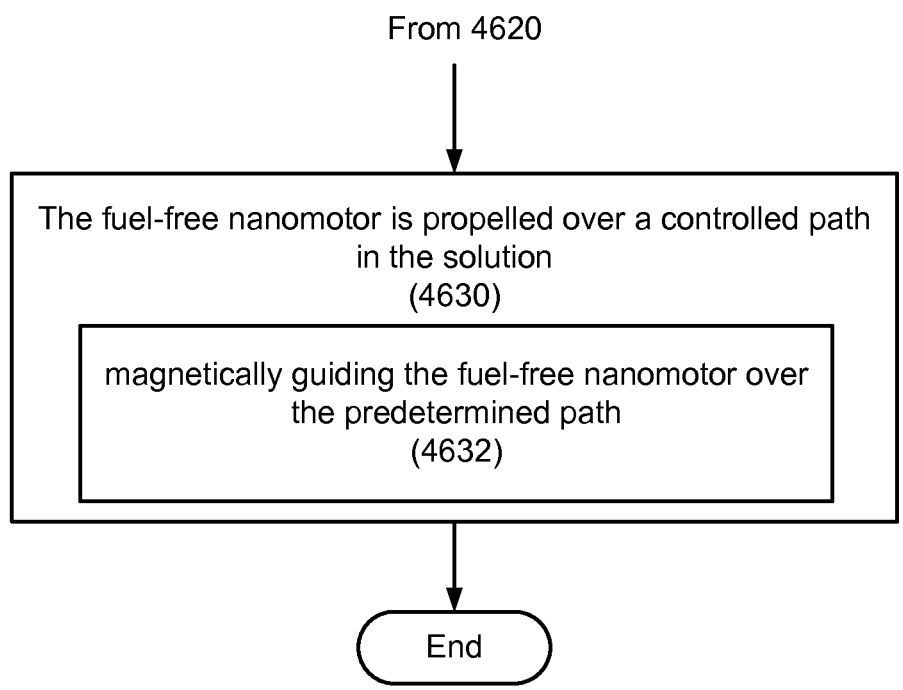
Figure 47D:
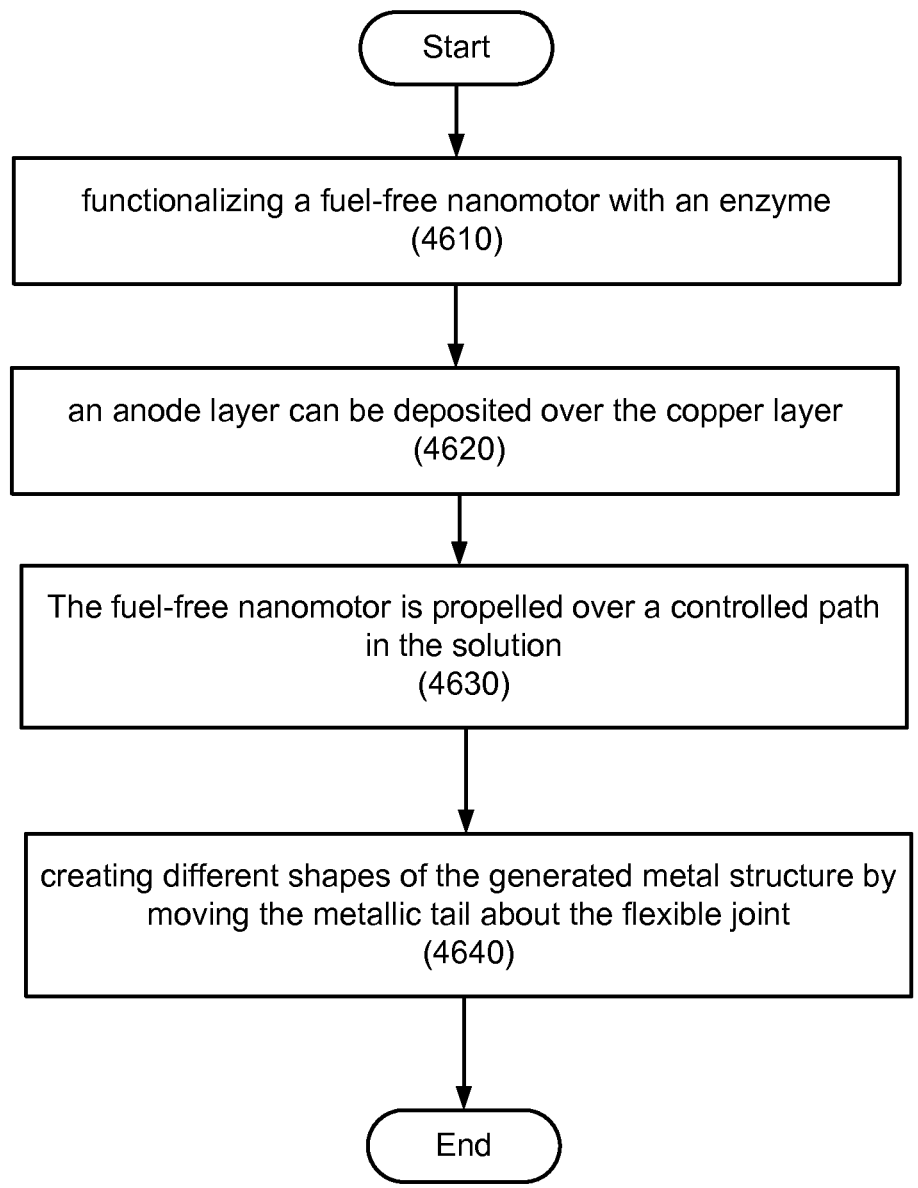
Figure 47E:
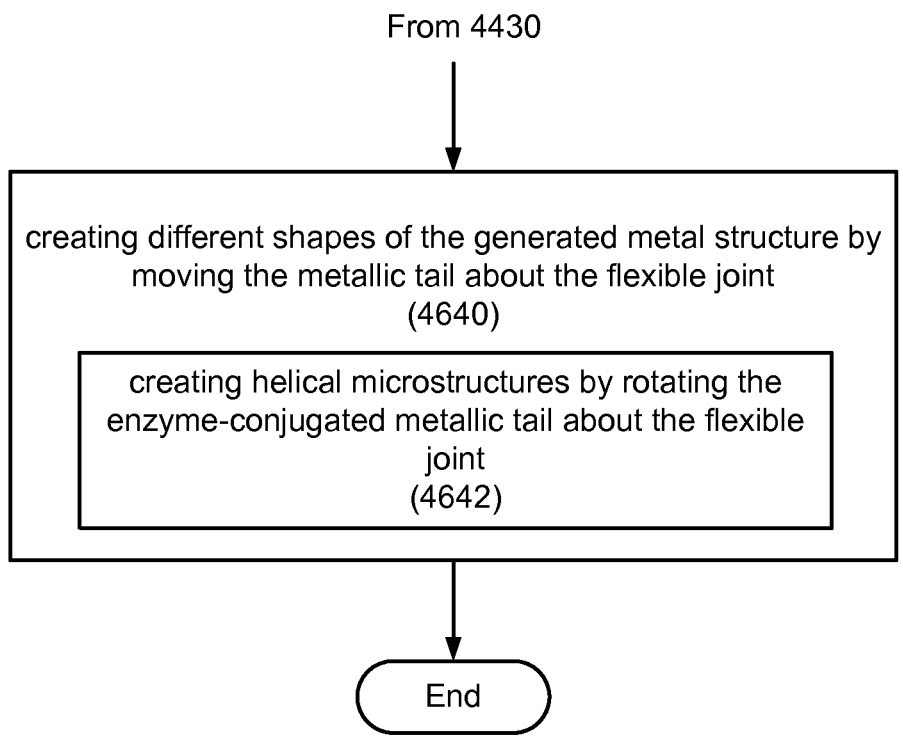

FIGS. 44, 45A and 45B represent yet another process flow diagram 4400 of yet another process of manufacturing a nanomachine. The process 4400 can include electrodepositing a sacrificial layer into a branched area of a porous membrane template (4410). An anode layer can be deposited over the copper layer (4420). Then, a ferromagnetic layer can be electrodeposited over the anode layer (4430). A cathode layer that includes an alloy can be electrodeposited over the ferromagnetic layer until a predetermined alloy segment length is reached (4440). The sacrificial layer can be removed (4450). The cathode layer can be functionalized with a reagent (4460), and then the membrane template can be removed to reveal the functionalized nanomachine (4470).

Implementations can optionally include one or more of the following features. Functionalizing the cathode layer with a reagent (4460) can include functionalizing the cathode layer to a solution of biotin-terminated disulfide to form a self-assembled monolayer and functionalizing the biotin functionalized cathode layer with streptavidin and biotinylated-horseradish peroxidase (4462). Removing the membrane template (4470) can include applying a dilute NaOH solution to dissolve the membrane template (4472).

FIGS. 46, 47A, 47B, 47C, 47D and 47E represent another process flow diagram of another process 4600 of manufacturing a nanomachine. The process 4600 of fabricating nanoobjects can include functionalizing a fuel-free nanomotor with an enzyme (4610) and introducing the functionalized fuel-free nanomotor in a solution containing a metal ion and a reagent that reacts with the enzyme to induce a localized enzymatic reaction (4620). The fuel-free nanomotor is propelled over a controlled path in the solution (4630). The localized enzymatic reaction within the solution generates a reducing agent that reduces the metal ions into a metal structure deposited over the controlled path of the nanomotor.

Propelling the fuel-free nanomotor (4630) can include magnetically guiding the fuel-free nanomotor over the predetermined path (4632). The process 4600 can include changing the path of the nanomotor by magnetically guiding the fuel-free nanomotor. Functionalizing the nanomotor (4610) can include immobilizing glucose oxidase to the nanomotor (4612). The introducing (4620) can include introducing the glucose oxidase immobilized nanomotor to the solution containing glucose to generate hydrogen peroxide and to reduced gold ions to gold microstructures (4622).

The fuel-free nanomotor can include a magnetic head and a metallic tail separated by a flexible joint. The process 4600 can further include creating different shapes of the generated metal structure by moving the metallic tail about the flexible joint (4640). Creating different shapes of the generated metal structure (4640) can include creating helical microstructures by rotating the enzyme-conjugated metallic tail about the flexible joint (4642).

Figure 48:
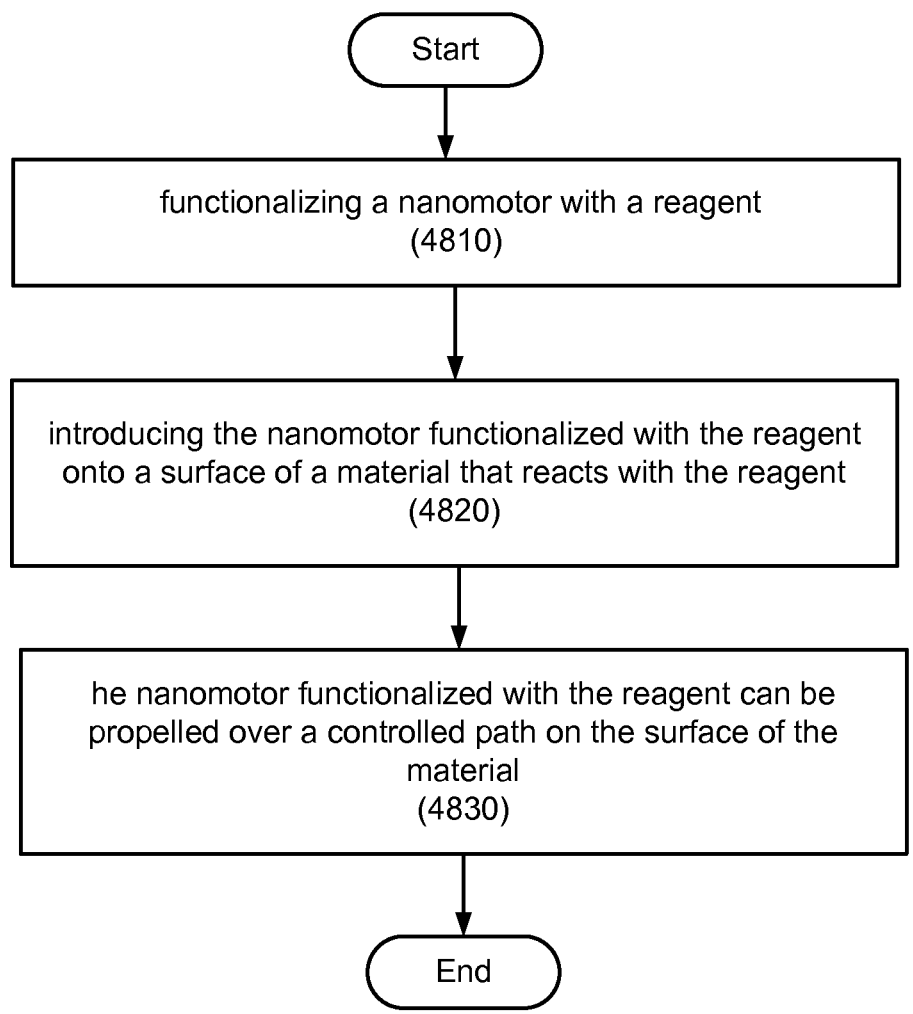
FIG. 48 is another process flow diagram of another process of manufacturing a nanomachine.

FIG. 48 is another process flow diagram of another process 4800 of manufacturing a nanomachine. The process 4800 of fabricating nanoobjects can include functionalizing a nanomotor with a reagent (4810), and introducing the nanomotor functionalized with the reagent onto a surface of a material that reacts with the reagent (4820). The nanomotor functionalized with the reagent can be propelled over a controlled path on the surface of the material (4830). The reagent causes a reaction with the material, while being propelled, and the reaction generates a localized etching of the surface over the controlled path.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the embodiments described above should not be understood as requiring such separation in all embodiments.

Only a few implementations and examples are described and other implementations, enhancements and variations can be made based on what is described and illustrated in this application and the attached Appendix.

What is claimed is:

1. A method of operating nanomotors, comprising:
functionalizing a nanomotor with a reagent; and
controlling a movement of the functionalized nanomotor in a solution containing material to react with the reagent to induce a localized deposition or precipitation of a product onto a surface of a substrate.

2. The method of claim 1, further comprising:
selectively choosing the reagent and a specific reaction to fabricate different microstructures made of different materials.

3. The method of claim 1, wherein the nanomotor comprises a self-propelled nanomotor.

4. The method of claim 1, wherein the nanomotor comprises non-fuel based nanomotor.

5. The method of claim 1, wherein the nanomotor comprises a fuel based nanomotor.

6. The method of claim 1, wherein the nanomotor is selected from different nanomotors having different shapes.

7. The method of claim 6, wherein the different shapes comprises a sphere or a cylinder.

8. The method of claim 1, wherein the nanomotor motion is accomplished using a fuel-based on fuel-less propulsion system.

9. The method of claim 8, wherein the fuel-less propulsion system is driven using magnetic or electrical fields.

10. The method of claim 1, further comprising:
propelling the functionalized nanomotor over a controlled path on the surface of the substrate.

11. The method of claim 10, wherein the reagent includes a peroxidase and the nanomotor includes platinum, nickel, and an alloy comprising gold and silver.

12. The method of claim 11, wherein the solution includes aniline and hydrogen peroxide, and the product includes polyaniline (PANI).

13. The method of claim 11, further comprising:
applying an external magnetic field to steer the functionalized nanomotor over the controlled path.

14. The method of claim 10, wherein the nanomotor is structured to include a multi-segmented nanorod, the nanorod including:
an anode segment including a metallic oxidizing material to oxidize an electron donor substance in the solution, a ferromagnetic segment including a ferromagnetic material and coupled to the anode segment to respond to a magnetic field allowing magnetic control of the movement of the nanomotor, and a cathode segment coupled to the ferromagnetic segment and including a metallic reducing material to reduce at least one electron acceptor substance in the solution.

15. The method of claim 14, wherein the nanorod further includes a non-metallic redox agent coupled to the anode segment, the cathode segment, or both, to increase a rate of a redox reaction in the solution to propel the nanomotor in the solution.

16. The method of claim 14, further comprising:
applying an external magnetic field to steer the functionalized nanomotor over the controlled path.

17. The method of claim 10, wherein the reagent includes a peroxidase and the nanomotor includes platinum and an alloy comprising gold and silver.

18. The method of claim 17, wherein the solution includes aniline and hydrogen peroxide, and the product includes polyaniline (PANI).

19. The method of claim 1, wherein the functionalized nanomotor is operable in basic pH conditions.

20. The method of claim 1, further comprising:
forming a nanometer scale or a micrometer scale pattern of the product onto the surface of the substrate.

* * * * *